(12) United States Patent
Jawerth et al.

(10) Patent No.: US 8,911,165 B2
(45) Date of Patent: Dec. 16, 2014

(54) OVERLOADED TYPING APPARATUSES, AND RELATED DEVICES, SYSTEMS, AND METHODS

(75) Inventors: Bjorn Jawerth, Morrisville, NC (US); Nathan Hall, Apex, NC (US)

(73) Assignee: 5 Examples, Inc., Morrisville, NC (US)

( * ) Notice: Subject to any disclaimer, the term of this patent is extended or adjusted under 35 U.S.C. 154(b) by 401 days.

(21) Appl. No.: 13/012,650

(22) Filed: Jan. 24, 2011

(65) Prior Publication Data
US 2012/0189368 A1 Jul. 26, 2012

(51) Int. Cl.
*B41J 5/10* (2006.01)
*G06F 3/02* (2006.01)
*G06F 3/0488* (2013.01)
*G06F 3/023* (2006.01)

(52) U.S. Cl.
CPC ............ *G06F 3/0237* (2013.01); *G06F 3/0216* (2013.01); *G06F 3/0221* (2013.01); *G06F 3/04883* (2013.01); *G06F 3/04886* (2013.01); *G06F 3/0219* (2013.01); *G06F 3/0231* (2013.01)
USPC ...................................................... 400/489

(58) Field of Classification Search
USPC ...................................................... 400/489
IPC ...................................................... B41J 5/10
See application file for complete search history.

(56) References Cited

U.S. PATENT DOCUMENTS

| D220,233 S | 3/1971 | Schuman |
|---|---|---|
| 3,967,273 A | 6/1976 | Knowlton |
| D250,063 S | 10/1978 | Nishino et al. |
| 4,449,839 A * | 5/1984 | Bleuer .......................... 400/485 |
| 4,852,173 A | 7/1989 | Bahl et al. |
| D330,547 S | 10/1992 | Howe et al. |
| 5,457,453 A | 10/1995 | Chiu et al. |
| 5,660,488 A | 8/1997 | Miller |

(Continued)

FOREIGN PATENT DOCUMENTS

| CA | 2577075 A1 | 2/2006 | |
|---|---|---|---|
| EP | 129996 A2 * | 1/1985 | ................. B41J 5/10 |

(Continued)

OTHER PUBLICATIONS

Lee, E Stewart, "Essays About Computer Security," University of Cambridge Computer Laboratory, Cambridge, 1999 (also available as http://www.cl.cam.ac.uk/~mgk25/lee-essays.pdf).

(Continued)

*Primary Examiner* — Nguyen Ha
(74) *Attorney, Agent, or Firm* — Withrow & Terranova, PLLC

(57) ABSTRACT

Overloaded typing apparatuses, and related devices, systems, and methods are disclosed. In one embodiment, a typing apparatus is provided. The typing apparatus comprises a plurality of overloaded keys in a key layout. The plurality of overloaded keys comprises at least three injectively overloaded keys disposed in a first row of keys. At least one first injectively overloaded key among the at least three injectively overloaded keys is injectively overloaded with a first at least three characters assigned to a first finger in a represented non-overloaded keyboard. The plurality of overloaded keys also comprises at least one second injectively overloaded key disposed outside the first row of keys. The at least one second injectively overloaded key is injectively overloaded with a second at least three characters assigned to the first finger in the represented non-overloaded keyboard. Other embodiments and related methods are also disclosed.

35 Claims, 50 Drawing Sheets

(56) References Cited

U.S. PATENT DOCUMENTS

| | | | |
|---|---|---|---|
| 5,712,760 | A | 1/1998 | Coulon et al. |
| D390,541 | S | 2/1998 | Chiba |
| D394,045 | S | 5/1998 | Iino |
| 5,748,512 | A | 5/1998 | Vargas |
| 5,805,911 | A | 9/1998 | Miller |
| 5,818,437 | A | 10/1998 | Grover et al. |
| 5,995,025 | A | 11/1999 | Sternglass et al. |
| D417,657 | S | 12/1999 | Matsumoto |
| 6,011,554 | A | 1/2000 | King et al. |
| D428,011 | S | 7/2000 | Howe et al. |
| 6,144,358 | A | 11/2000 | Narayanaswamy et al. |
| D448,032 | S | 9/2001 | Talley |
| 6,307,548 | B1 | 10/2001 | Flinchem et al. |
| D457,525 | S | 5/2002 | Olodort et al. |
| 6,407,679 | B1 | 6/2002 | Evans et al. |
| 6,408,092 | B1 | 6/2002 | Sites |
| D470,493 | S | 2/2003 | Tritschler et al. |
| D470,841 | S | 2/2003 | Feierbach |
| 6,525,676 | B2 | 2/2003 | Kisaichi et al. |
| D481,717 | S | 11/2003 | Lewis, Jr. et al. |
| 6,684,201 | B1 | 1/2004 | Brill |
| D486,488 | S | 2/2004 | Olodort et al. |
| 6,798,649 | B1 | 9/2004 | Olodort et al. |
| D499,725 | S | 12/2004 | Lee |
| 6,847,706 | B2 | 1/2005 | Bozorgui-Nesbat |
| 6,885,317 | B1 | 4/2005 | Gutowitz |
| 7,048,456 | B2 | 5/2006 | Keinonen et al. |
| 7,061,403 | B2 | 6/2006 | Fux |
| D524,809 | S | 7/2006 | Alcouloumre et al. |
| 7,081,837 | B2 | 7/2006 | Bollman |
| 7,098,896 | B2 | 8/2006 | Kushler et al. |
| 7,103,534 | B2 | 9/2006 | Goodman |
| 7,120,582 | B1 | 10/2006 | Young et al. |
| 7,202,853 | B2 | 4/2007 | Ng et al. |
| 7,213,991 | B2 | 5/2007 | Chapman et al. |
| 7,230,607 | B2 | 6/2007 | Ono |
| 7,250,938 | B2 | 7/2007 | Kirkland et al. |
| 7,257,528 | B1 | 8/2007 | Ritchie et al. |
| 7,283,065 | B2 | 10/2007 | Scott et al. |
| D554,635 | S | 11/2007 | Chung et al. |
| 7,310,053 | B2 * | 12/2007 | Bollman .................. 341/22 |
| D562,321 | S | 2/2008 | Jawerth et al. |
| 7,362,243 | B2 | 4/2008 | Kandogan et al. |
| 7,378,991 | B2 * | 5/2008 | Dietz et al. .................. 341/22 |
| 7,382,358 | B2 | 6/2008 | Kushler et al. |
| 7,385,591 | B2 | 6/2008 | Goodman |
| 7,387,457 | B2 | 6/2008 | Jawerth et al. |
| 7,656,317 | B2 | 2/2010 | Salman et al. |
| 7,683,885 | B2 | 3/2010 | Fux et al. |
| 7,683,886 | B2 | 3/2010 | Willey |
| 7,712,053 | B2 | 5/2010 | Bradford et al. |
| 7,737,999 | B2 | 6/2010 | Ardhanari et al. |
| 7,758,264 | B2 | 7/2010 | Jawerth et al. |
| 7,869,204 | B2 | 1/2011 | Bair et al. |
| 7,890,492 | B2 | 2/2011 | Weir et al. |
| 7,937,394 | B2 | 5/2011 | Venkataraman et al. |
| 7,956,771 | B2 | 6/2011 | Kling |
| 7,956,844 | B2 | 6/2011 | Fux et al. |
| 8,147,154 | B2 | 4/2012 | Jawerth et al. |
| 2002/0167491 | A1* | 11/2002 | Huang et al. .................. 345/161 |
| 2003/0011574 | A1 | 1/2003 | Goodman |
| 2003/0112277 | A1 | 6/2003 | Shteyn |
| 2003/0156145 | A1 | 8/2003 | Hullender et al. |
| 2004/0013457 | A1 | 1/2004 | Morris |
| 2004/0228076 | A1 | 11/2004 | Clapper |
| 2004/0239533 | A1 | 12/2004 | Bollman |
| 2005/0108001 | A1 | 5/2005 | Aarskog |
| 2005/0168447 | A1 | 8/2005 | Caine et al. |
| 2005/0187754 | A1 | 8/2005 | Suess |
| 2005/0238405 | A1* | 10/2005 | Chapman et al. ............. 400/472 |
| 2005/0270183 | A1 | 12/2005 | Fux et al. |
| 2006/0007128 | A1 | 1/2006 | Fux et al. |
| 2006/0055669 | A1* | 3/2006 | Das .................. 345/156 |
| 2006/0058995 | A1 | 3/2006 | Fux et al. |
| 2006/0066583 | A1 | 3/2006 | Toutonghi et al. |
| 2006/0104013 | A1 | 5/2006 | Sakakibara et al. |
| 2006/0232921 | A1 | 10/2006 | Brandenberg et al. |
| 2007/0080950 | A1 | 4/2007 | Lee et al. |
| 2007/0105606 | A1 | 5/2007 | Yoon et al. |
| 2007/0123322 | A1 | 5/2007 | Mizushina |
| 2007/0287512 | A1 | 12/2007 | Kilpi et al. |
| 2008/0051161 | A1 | 2/2008 | Tashiro |
| 2008/0270897 | A1 | 10/2008 | Jawerth et al. |
| 2009/0213134 | A1 | 8/2009 | Stephanick et al. |
| 2010/0040400 | A1* | 2/2010 | Hirsch .................. 400/489 |
| 2010/0067181 | A1* | 3/2010 | Bair et al. .................. 361/679.3 |
| 2011/0066984 | A1 | 3/2011 | Li |

FOREIGN PATENT DOCUMENTS

| | | | | |
|---|---|---|---|---|
| EP | 1246430 | A2 | 10/2002 | |
| EP | 1396982 | A1 | 3/2004 | |
| JP | 58102785 | A * | 6/1983 | .................. B41J 5/10 |
| WO | 03085505 | A1 | 10/2003 | |
| WO | 2006/020992 | A2 | 2/2006 | |
| WO | 2011073992 | A2 | 6/2011 | |
| WO | 2011113057 | A1 | 9/2011 | |

OTHER PUBLICATIONS

Raskin, Jef, "The Humane Interface: New Directions for Designing Interactive Systems," ACM Press, 2000, ISBN 0-201-37937-6, QA76.9.H85 R37 2000, sixth printing, Aug. 2004.

European Search Report for patent application 05791130.7 mailed Apr. 12, 2012, 41 pages.

International Search Report and Written Opinion for PCT/US2012/020909 mailed Jun. 28, 2012, 19 pages.

International Search Report for PCT/US2005/29139 mailed Feb. 22, 2007, 14 pages.

Derose, S., "Grammatical Category Disambiguation by Statistical Optimization," Computational Linguistics, vol. 14.1, 1988, pp. 31-39.

Marcus, M. et al., "Building a Large Annotated Corpus of English: The Penn Treebank," Computational Linguistics, vol. 19.2, 1994, pp. 313-330, http://citeseer.ist.psu.edu/marcus93building.html.

Och, F. et al., "Discriminative Training and Maximum Entropy Models for Statistical Machine Translation," Proc. of the 40th Annual Meeting of the Association for Computational Linguistics (ACL), 2002. pp. 295-302, http://citeseer.ist.psu.edu/och02discriminative.html.

Abney, S., "Parsing by Chunks," Principle-Based Parsing: Computation and Psycholinguistics, 1991, Kluwer Academic Publishers, Boston, pp. 257-278, http://citeseer.ist.psu.edu/article/abney91parsing.html.

Abney, S., "Partial parsing via finite-state cascades," Natural Language Engineering, 1995, 8 pages, http://citeseer.ist.psu.edu/abney96partial.html.

Baeza-Yates, R. et al., "Fast approximate string matching in a dictionary," String Processing and Information Retrieval, 1998, pp. 14-22, http://citeseer.ist.psu.edu/article/baeza-yates98fast.html.

Baeza-Yates, R. et al., "Faster approximate string matching," Algorithmica, vol. 23.2, 1999, pp. 127-158, http://link.springer.de/link/service/journals/00453/bibs/23n2p127.html.

Berger, A. et al., "A maximum entropy approach to natural language processing," Computational Linguistics, vol. 22.1, 1996, pp. 39-71, http://www-2.cs.cmu.edu/~aberger/maxent.htmlhttp://citeseer.ist.psu.edu/berger96maximum.html.

Brants, T., "Tnt—a Statistical Part-of-Speech Tagger," Proceedings of the 6th Applied NLP Conference, ANLP-2000, Apr. 29-May 3, 2000, Seattle, WA, 2000, 8 pages, http://citeseer.ist.psu.edu/article/brants00tnt.html.

Brill, E., "A simple rule-based part-of-speech tagger," Proceedings of ANLP-92, 3rd Conference on Applied Natural Language Processing, Trento, IT, 1992, pp. 152-155, http://citeseer.ist.psu.edu/brill92simple.html.

Brill, E., "A Report of Recent Progress in Transformation-based Error-driven Learning," Proceedings ARPA Human Language Technology Workshop '94, Princeton, NJ, 1994, 6 pages, http://citeseer.ist.psu.edu/brill94report.html.

(56) References Cited

OTHER PUBLICATIONS

Smith, N., "Log-linear Models," Dec. 2004, 9 pages, http://nip.cs.jhu.edu/~nasmith/loglinearJiandout.pdf.

Brill, E., "Some Advances in Transformation-based Part of Speech Tagging," National Conference on Artificial Intelligence, 1994, pp. 722-727.

Brill, E., "Unsupervised Learning of Disambiguation Rules for Part of Speech Tagging," Proceedings of the Third Workshop on Very Large Corpora, Association for Computational Linguistics, 1995, 13 pages.

Bunt, H. et al., "New Developments in Parsing Technology," 2004, Kluwer Academic Publishers, 407 pages.

Carroll, G. et al., "Two Experiments on Learning Probabilistic Dependency Grammars from Corpora," Mar. 1992, Technical Report CS-92-16, Brown, 15 pages, http://www.cs.brown.edu/publications/techreports/reports/CS-92-16.html.

Chavez, E. et al., "A Metric Index for Approximate String Matching," LATIN, 2002, pp. 181-195, http://citeseer.ist.psu.edu/article/avez02metric.html.

Cutting, D. et al., A Practical Part-of-Speech Tagger, Proceedings of the Third Conference on Applied Natural Language Processing '92, 1992, pp. 133-140.

Davis, M., "MRC CBU Cambridge," World Wide Web, 2003, 5 pages, http://www.mrc-cbu.cam.ac.uk/personal/matt.davis/Cmabrigde/.

Dorr, B., "Machine Translation: A View from the Lexicon," 1993, The MIT Press, pp. 1-39.

Kilgarriff, A., "English word frequency list," World Wide Web, Accessed Oct. 25, 2011, 3 pages, http://www.eecs.mich.edu/~qstout/586/bncfreq.html.

Stergiopoulos, S., ed., "Advanced Signal Processing Handbook," CRC Press, Wolfgang Koch: Target tracking, 2001, pp. 8-3; 8-18.

Garside R. et al., editors. "The Computational Analysis of English," The CLAWS Word-tagging System, 1987, Longman, London, pp. 30-41.

Garside, R. et al., "Corpus Annotation: Linguistic Information from Computer Text Corpora," A hybrid grammatical tagger: CLAWS4, Longman, London, 1997, pp. 102-121, http://www.comp.lancs.ac.uk/ucrel/claws/.

Geman, S. et al., "Stochastic Relaxation, Gibbs Distributions, and the Bayesian Estimation of Images," IEEE Transactions on Pattern Analysis and Machine Intelligence, vol. 6.6, 1984, pp. 721-741.

Grinberg, D. et al., "A Robust Parsing Algorithm for Link Grammars," Proceedings of the Fourth International Workshop on Parsing Technologies, Sep. 1995, 20 pages, http://www.link.cs.cmu.edu/link/papers/index.html.

Hodgson, J.P.E., "A grammar for simple sentences," World Wide Web, 1 page, Accessed Oct. 20, 2011, http://www.sju.edu/~jhodgson/ai/syntax.html.

Hutchins, W. et al., "An Introduction to Machine Translation," 1992, Academic Press, San Diego, 362 pages.

Hyyro, H. "Practical methods for approximate string matching," PhD thesis, University of Tampere, Finland, 2003, 100 pages, http://acta.uta.fi/pdf/951-44-5840-0.pdf.

Ide, N. et al., "Word Sense Disambiguation: The State of the Art," Computational Linguistics, vol. 24.1, 1998, pp. 1-40, http://citeseer.ist.psu.edu/ide98word.html.

Jawerth, B. et al., "Mobile keyboard," Technical Report 20040728b, 5 Examples, Inc., 2004, 11 pages.

Johnson, M., "PCFG Models of Linguistic Tree Representations," Computational Linguistics, vol. 24.4, 1999, pp. 613-632, http://www.cog.brown.edu/~mj/Publications.html.

Kazama, J. et al., "Evaluation and Extension of Maximum Entropy Models with Inequality Constraints," Proceedings of the 2002 Empirical Methods in Natural Language Processing, 2003, pp. 137-144.

Kushler, C., "AAC Using a Reduced Keyboard," Mar. 3, 1998, 4 pages, http://www.dinf.ne.jp/doc/english/Us_Eu/conf/csun_98/csun98_140.html.

Malouf, R., "A Comparison of Algorithms for Maximum Entropy Parameter Estimation," Proceedings of the Sixth Conference on Natural Language Learning (CoNLL-2002),2002, pp. 49-55, http://bulba.sdsu.edu/malouf/papers/conll02.pdf.

Manning, C. et al., "Foundations of Statistical Natural Language Processing," 1999, The MIT Press, 704 page, http://www-nip.Stanford.edu/fsnip/.

Mason, J., "Augmented syntax diagram grammars," World Wide Web, Accessed Oct. 20, 2011, 3 pages, http://www.yorku.ca/jmason/asdgram.htm.

Mason, J. "Augmented syntax diagram homepage," World Wide Web, Accessed Oct. 20, 2011, 1 page, http://www.yorku.ca/jmason/asdindex.htm.

Matias, E. et al., "Half-QWERTY: A One-handed Keyboard Facilitating Skill Transfer from QWERTY,"Proceedings of the INTERCHI '93 Conference on Human Factors in Computing Systems, 1993, pp. 88-94, http://edgarmatias.com/papers/hci96/index.html.

Matias, E. et al., "One-handed Touch-typing on a QWERTY Keyboard," Human Computer Interaction, vol. 11, 1996, pp. 1-27, edgarmatias.com.

McCallum, A. et al., "A conditional random field for discriminatively-trained finite-state string edit distance," Technical report, Jun. 2005, 8 pages, http://www.cs.umass.edu/~mccallum/papers/crfstredit-uai05.pdf.

McCallum, A., "Introduction to Natural Language Processing," Lectures, World Wide Web, 2004, 1 page, http://www.cs.umass.edu/~mccallum/courses/inlp2004/.

Merialdo, B., "Tagging English text with a Probabilistic Model," Computational Linguistics, vol. 20.2, 1994, pp. 155-172.

Miller, G., "The magic number seven, plus or minus two: Some remarks on our capacity for processing information," Psychological Review, vol. 63, 1956, pp. 81-97.

Peshkin, L. et al., "Why Build Another Part-of-Speech Tagger? A Minimalist Approach," RANLP, 2003, 7 pages, citeseer.ist.psu.edu/peshkin03why.html.

Ratnaparkhi, A., "A Maximum Entropy Model Part-of-Speech Tagger," Proceedings of the Empirical Methods in Natural Language Processing Conference, May 17-18, 1996, 10 pages, http://www.cis.upenn.edu~adwait/statnlp.html.

Rozenknop, A., "The Wall Street Journal Experiment (and useful programs)," École Polytechnique Fédérale De Lausanne, School of Computer and Communication Sciences, Mar. 26, 2004, Technical Report IC/2004/32, 34 pages, http://icwww.epfl.ch/publications/docunnents/IC_TECH_REPORT_200432.pdf.

Savova, V. et al., "Part-of-speech tagging with minimal lexicalization," Dec. 27, 2003, 10 pages.

Temerley, D. et al., "Link grammar," World Wide Web, Aug. 2009, 1 page, http://www.link.cs.cmu.edu/link.

Stein, J., "Why did language develop?" International Congress Series 1254, 2003, pp. 207-213, http://www.bapo.org.uk/8th_ESPO/data/pdf/2751.pdf.

Stolcke, A., "An efficient probabilistic context-free parsing algorithm that computes prefix probabilities," Computational Linguistics, vol. 21.2, 1995, pp. 165-201, http://www.icsi.berkeley.edu/~stolcke/papers/c195/paper-html.html.

The Penn Treebank Project, World Wide Web, Feb. 1999, http://www.ldcupenn.edu/doc/treebank2/treebank2.index.html.

Unknown, "IBM Almaden Research Center," 1997, World Wide Web, 1 page, Almaden.ibm.com.

Van Guilder, L., "Automated Part of Speech Tagging: A Brief Overview," Lectures, World Wide Web, 1995, 5 pages, http://www.georgetown.edu/faculty/ballc/ling361/tagging_overview.html.

Vanroose, P., "Part-of-Speech Tagging from an Information-Theoretic point of view," 2001, 6 pages, Accessed Jul. 22, 2011, http://citeseer.ist.psu.edu/646161.html.

Vergne, J., "Tutorial: Trends in Robust Parsing," Coling, 2000, 191 pages, http://users.info.unicaen.fr/~jvergne/tutorialColing2000.html.

Wagner, R. A. et al., "The string-to-string correction problem," Journal of ACM, vol. 21(1), 1974, pp. 168-173.

Wrigley, S., "Speech recognition by dynamic time warping," World Wide Web, 1998, 3 pages, http://www.dcs.shef.ac.uk/~stu/com326/sym.html.

(56) References Cited

OTHER PUBLICATIONS

Zobel, et al., "Finding approximate matches in large lexicons," Software—Practice and Experience, vol. 25.3, 1995, pp. 331-345, http://citeseer.ist.psu.edu/zobel95finding.html.

Winkler, G., "Image Analysis, Random Fields and Dynamic Monte-Carlo Methods," Springer-Verlag, Berlin, 1995, pp. 13-22.

Allen, J., "Natural Language Understanding," The Benjamin/Cummings Publishing Company, Menlo Park, California, 1995, pp. 1-18; 75; 189-219; 612-627.

Erickson, J., "Dynamic Programming," World Wide Web, 2004, 26 pages, http://www-courses.cs.uiuc.edu/~cs473g/cs373u/notes/04-dynprog.pdf.

Lowrance, R. et al., "An Extension of the String-to-String Correction Problem," Journal of ACM, vol. 22.2, 1995, pp. 177-183.

Grenander, U., "Elements of Pattern Theory," The Johns Hopkins University Press, 1996, pp. 8-33; 81-100.

Hoel, P. et al., "Introduction to Stochastic Processes," Waveland Press, 1987, pp. 92-98.

Huang X.D. et al., "Spoken Language Processing," Prentice Hall, New York, 2001, pp. 387-389; 405-409; 545-585; 609; 623-626.

Jelinek, F. "Statistical methods for speech recognition," The MIT Press, 1997, pp. 1-11; 22-35; 219-222; 271-273.

Pearl, J., "Causality: Models, Reasoning, and Inference," Cambridge University Press, 2000, pp. 11-12.

Brants, T., "TNT—Statistical Part-of-Speech Tagging," Accessed Jul. 25, 2011, 2 pages.

Sedgewick, R., "Algorithms in C," Addison-Wesley, 3 edition, 1998, pp. 477-516.

Armstrong, S. et al., "An open architecture for multilingual text-processing," EACL 1995, SIGDAT Workshop, 1995, pp. 30-34.

Kimmig, A. et al., "Probabilistic Context Free Grammars," Lectures, World Wide Web, Apr. 2003, http://www.informatik.uni-freiburg.de/~ml/teaching/ws03/pll/pcfg.pdf.

Office Action for Canadian patent application 2,577,075 mailed Feb. 1, 2013, 2 pages.

International Search Report and Written Opinion for PCT/US2013/028115 mailed May 6, 2013, 17 pages.

International Preliminary Report on Patentability for PCT/US2012/020909, mailed Aug. 8, 2013, 15 pages.

Non-final Office Action for U.S. Appl. 13/348,947 mailed Jun. 4, 2014, 32 pages.

International Preliminary Report on Patentability for PCT/US2013/028115, mailed Sep. 12, 2014, 9 pages.

* cited by examiner

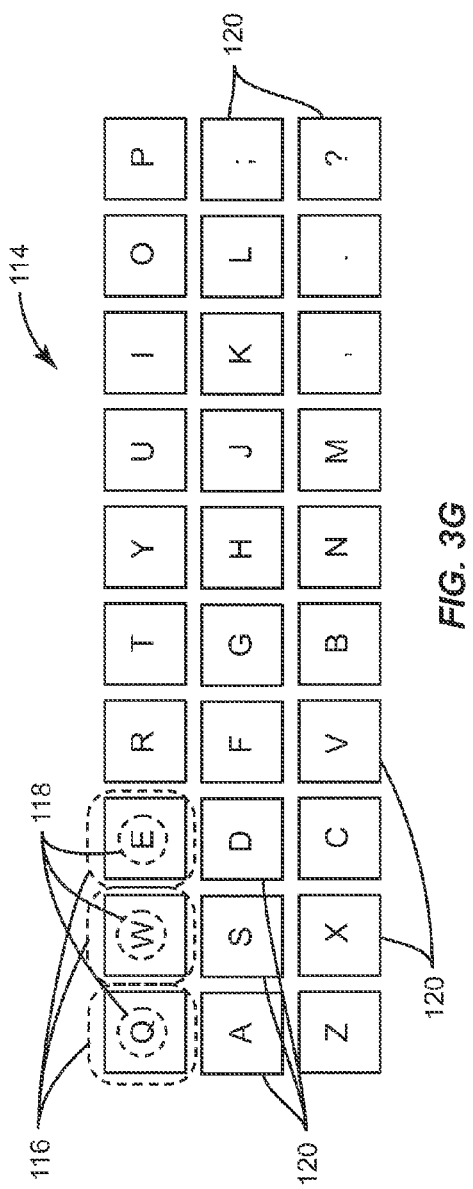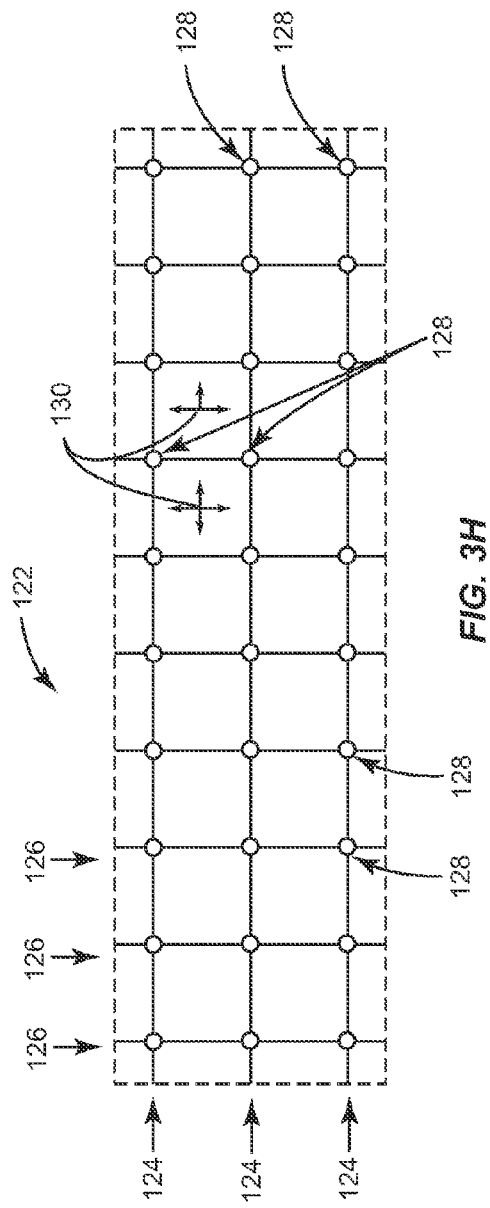

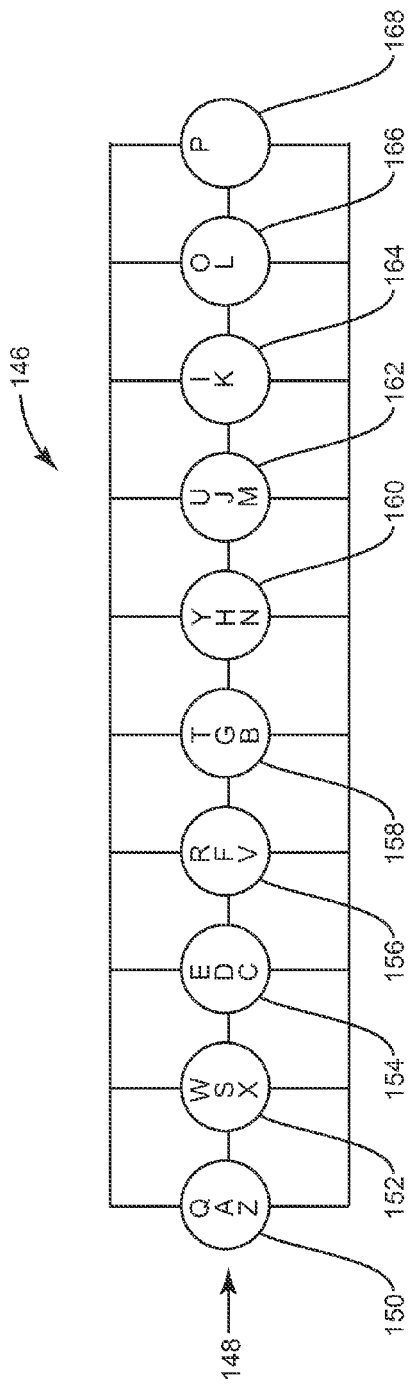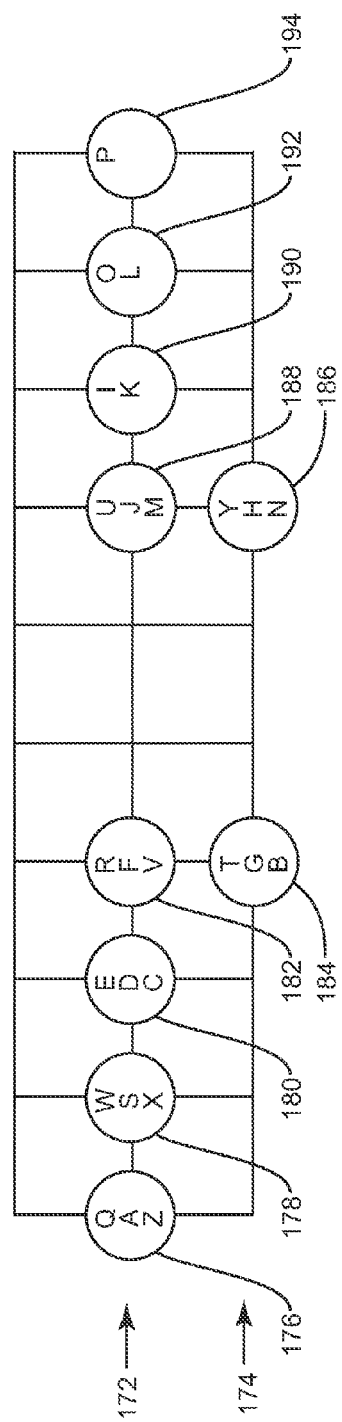
FIG. 5C
FIG. 5D

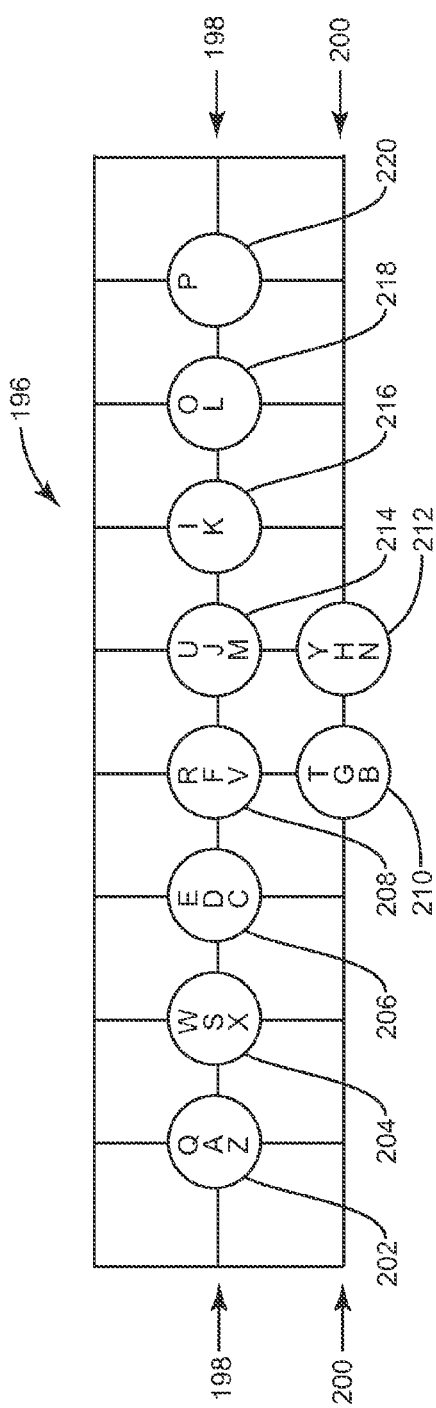
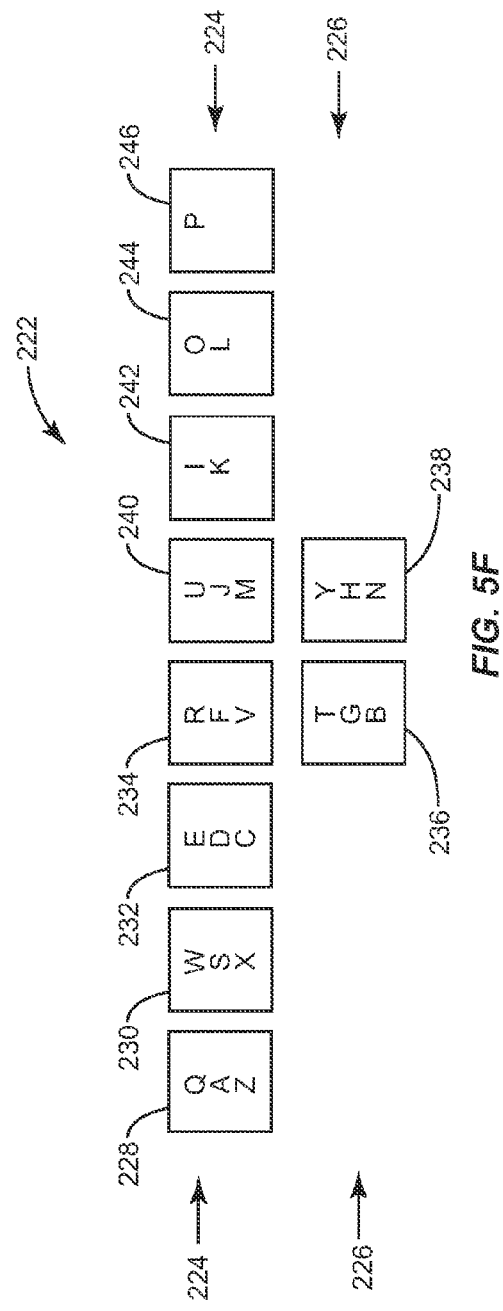

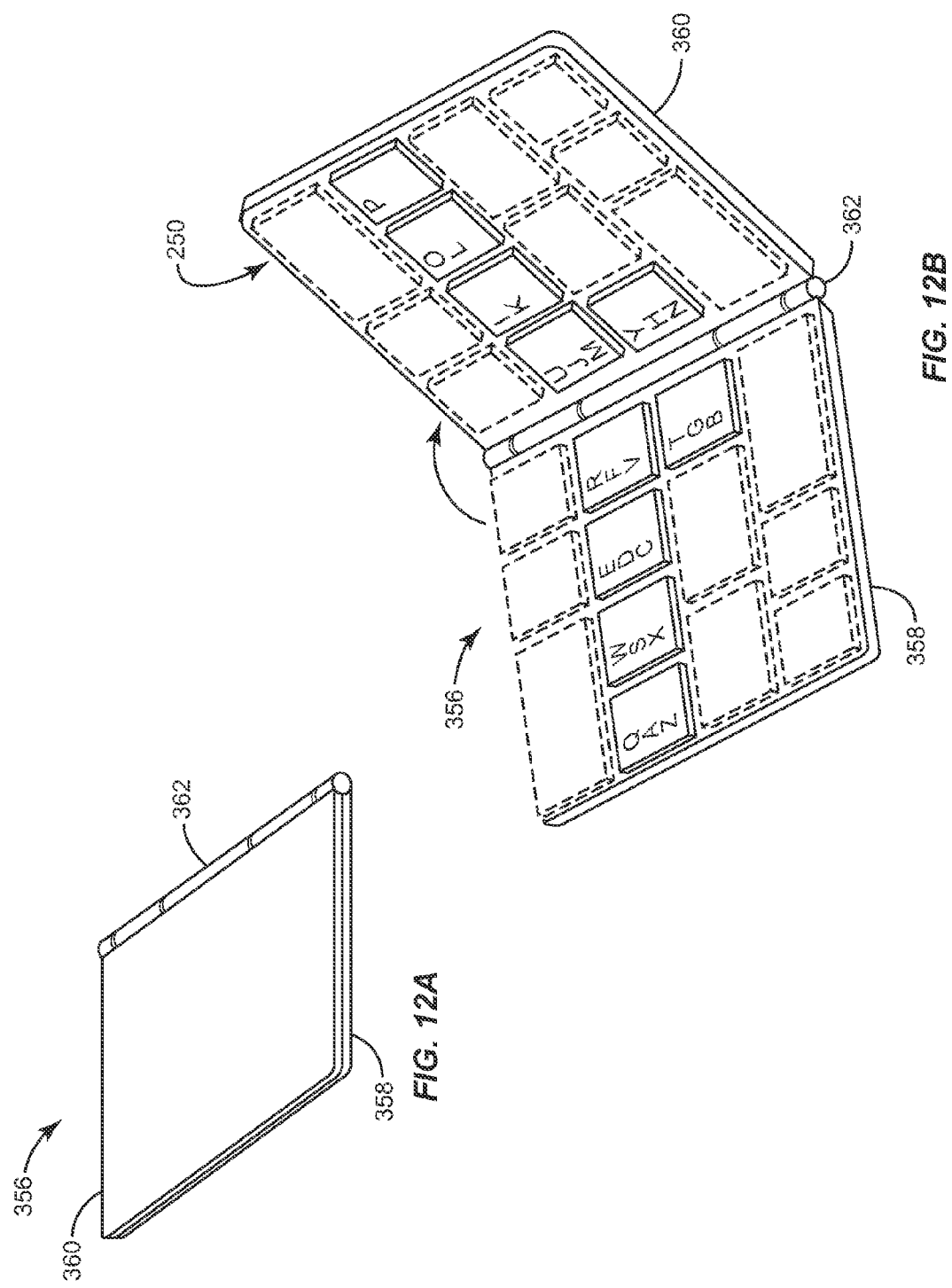

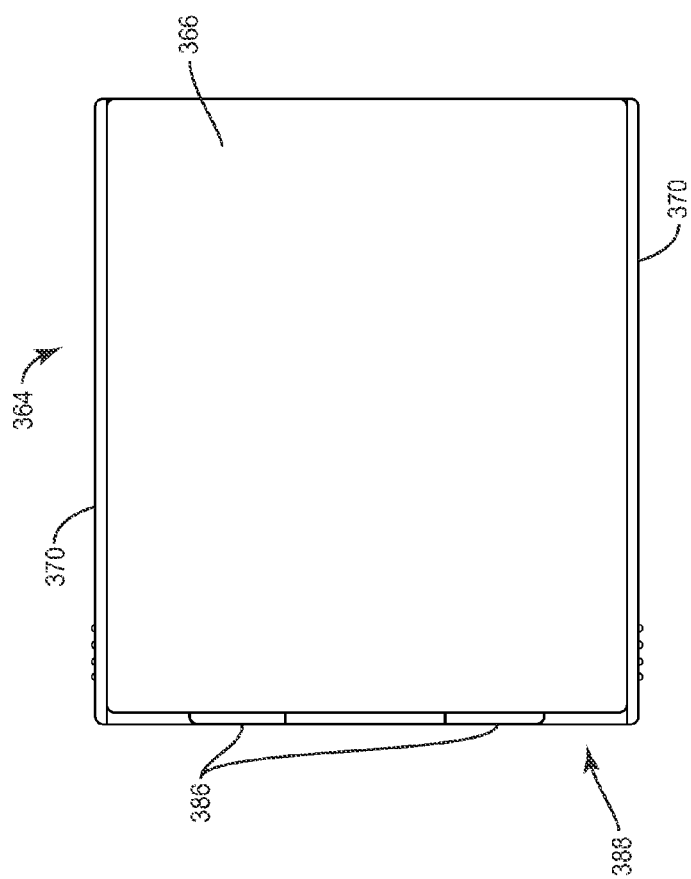
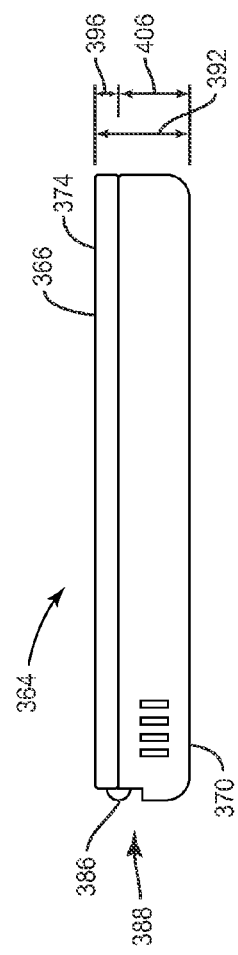
FIG. 13A
FIG. 13B

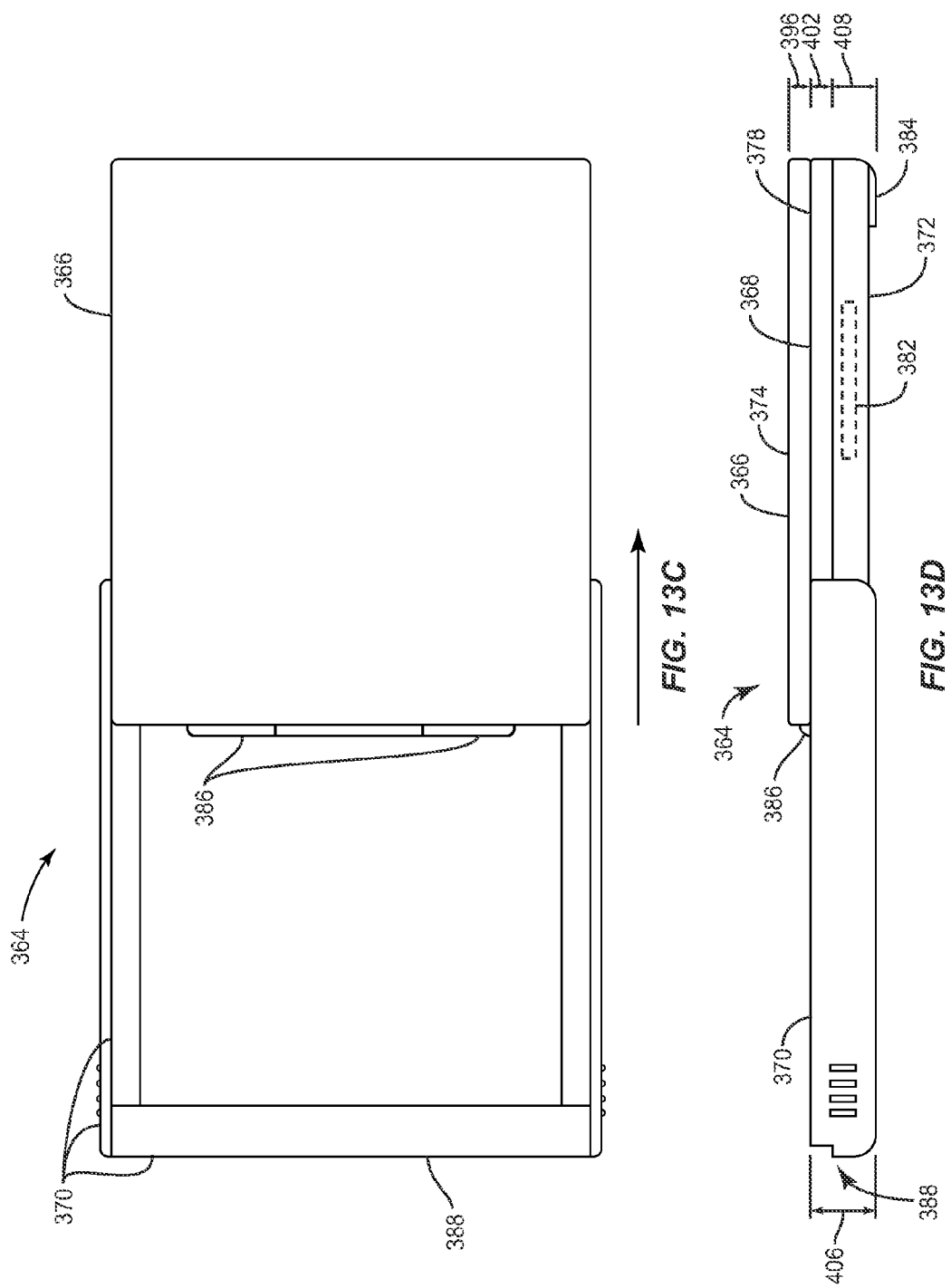

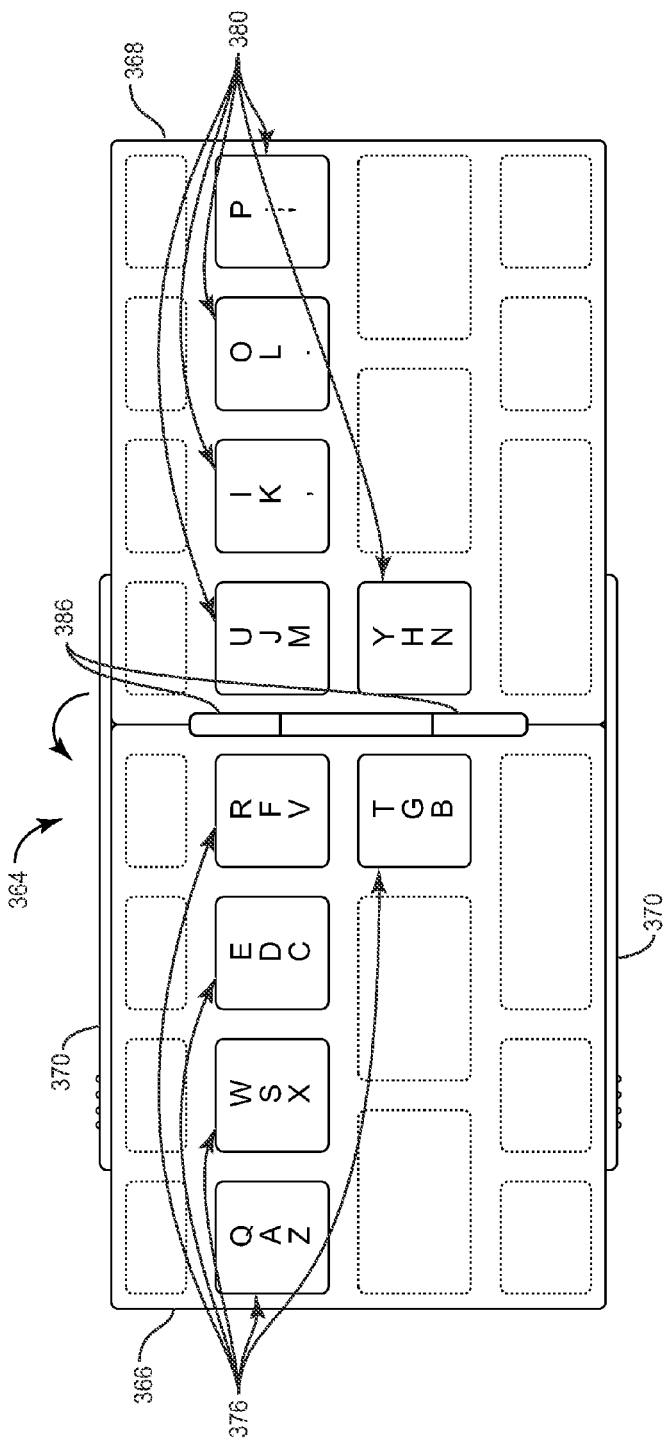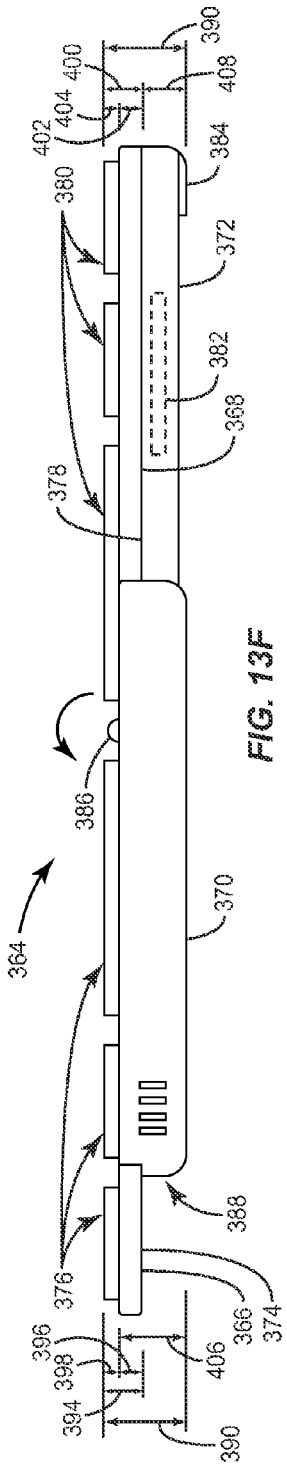
FIG. 13E
FIG. 13F

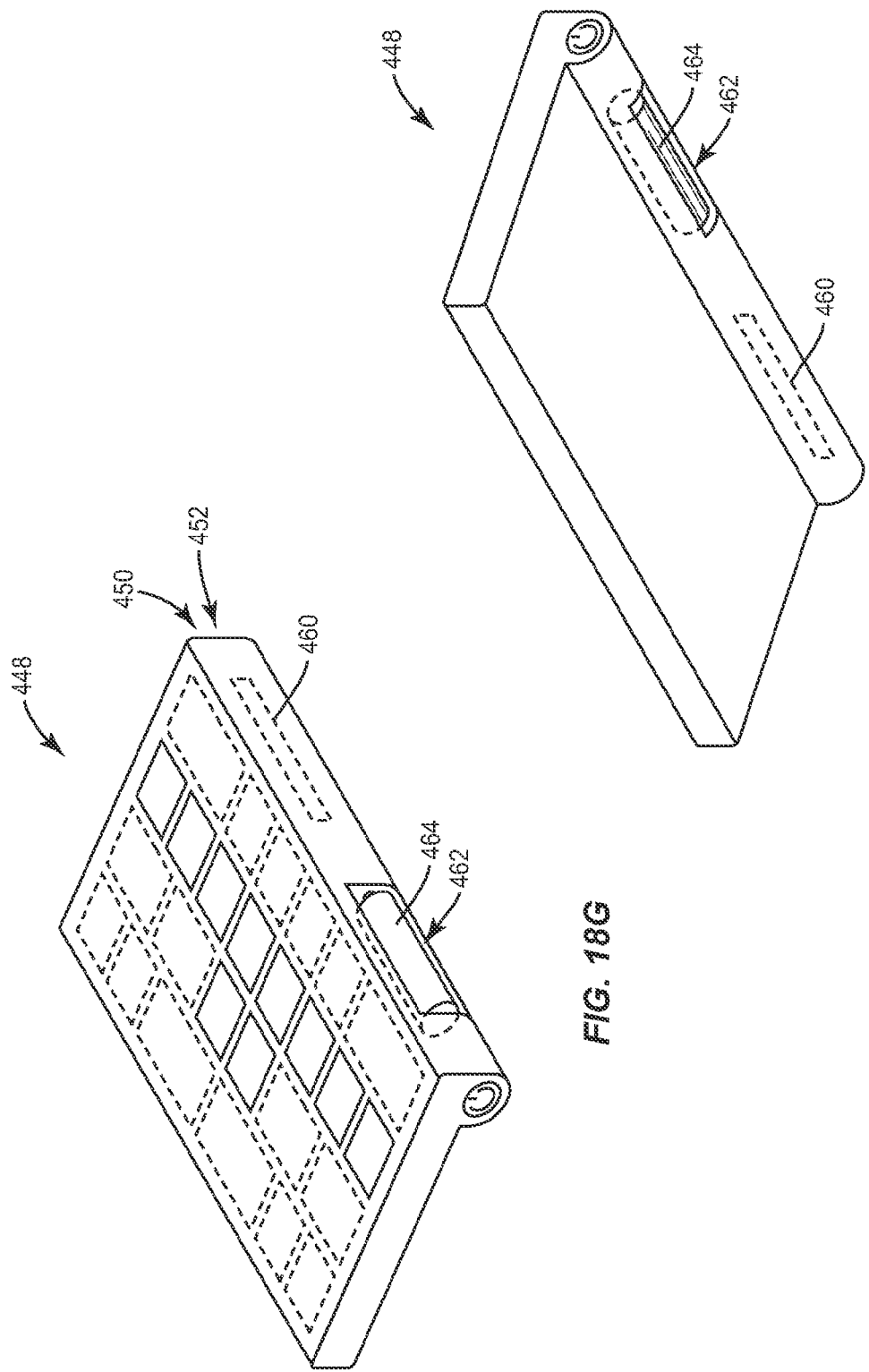

OVERLOADED TYPING APPARATUSES, AND RELATED DEVICES, SYSTEMS, AND METHODS

FIELD OF THE DISCLOSURE

The technology of the disclosure relates generally to typing apparatuses, and more specifically to overloaded typing apparatuses that allow reduced-size typing apparatuses, including keyboards.

BACKGROUND

The key arrangement, or layout, of keyboards used in different geographical areas around the world varies based on language. For example, typists in the United States typically learn to use QWERTY keyboards. In this regard, FIG. 1 illustrates an exemplary physical QWERTY keyboard 10 comprised of physical keys 12, each key 12 corresponding to a character in the English language. FIG. 2 illustrates an exemplary software QWERTY keyboard 22 provided in software to provide virtual keys 24 on a display 26 of an electronic device 28. For example, the electronic device 28 may be a touch-screen computing pad or other computing device where keypresses on the virtual keys 24 are sensed by touch. Similar keyboards can be provided for other languages. For example, a German-speaking typist may use a QWERTZ keyboard. A French-speaking typist may use an AZERTY keyboard.

Through practice, typists may develop typing proficiency and speed with a keyboard having a particular layout. Typists develop "procedural memory" of finger movement patterns associated with typing a vocabulary of phrases, words, and characters. Procedural memory is the type of physiological memory used by humans to perform certain actions without consciously thinking about them, for example, riding a bicycle, driving a manual transmission vehicle, performing a song on a piano or other instrument, or typing a vocabulary of phrases, words, and characters. In this regard, referring to FIG. 1, a typist may be trained to position her fingers on home keys 14, 16 which may be located on a home row 18, 20 of the physical QWERTY keyboard 10. To type an individual character, a typist may learn which finger should be moved to type the character (i.e., which finger should be activated) as well as a direction and distance to move the finger relative to a home finger position. To type a word or phrase, the typist may develop procedural memory associating a pattern of finger activations and movements (relative to home finger positions) to type the word or phrase. Thus, procedural memory aids one in becoming efficient at rapid text and data entry on keyboards whose key layouts conform to one's prior training. Once a certain keyboard's key layout has been learned by a typist and committed to procedural memory, the typist may poorly tolerate switching to a keyboard with an alternative key layout.

To support a more mobile workforce and lifestyle, electronic devices are increasingly becoming more compact and more portable. These electronic devices commonly include a keyboard with either physical keys or virtual keys, such as the physical keys 12 or the virtual keys 24 in FIGS. 1 and 2 as examples, to allow a typist, or user, to input data and provide commands or other inputs. Certain user applications (e.g., email clients) developed for these electronic devices may require extensive text and data entry. A full-size keyboard facilitates rapid text and data entry, but may require a key layout that is too large to incorporate into a compact electronic device. Furthermore, there may be a tradeoff in the amount of area designated for input on an electronic device versus the amount of area designated for a display. Even on virtual keyboards that allow providing virtual keys on the display without providing a separate input area, the size of the keyboard may constrain the area of the screen available for displaying other information, such as other inputs or output.

One approach to reducing keyboard size is to shrink the size of the keys. However, as key sizes are reduced, typists lose the ability to locate all their fingers upon a home row and may resort to using a single finger (such as a thumb or index finger) of one or both hands for data entry. Very small keys may even be difficult to accurately press with a single finger. In addition, when interacting with such miniature keyboards, typists are unable to make use of the procedural memory they previously developed using full-size keyboards. Instead, users must retrain themselves to use different finger patterns to press the keys.

Another approach to reducing keyboard size is to reduce the number of keys of the keyboard by allowing several characters to occupy a same key. Such a key may unambiguously represent the several characters, for example, when pressed in combination with a modifier key (e.g., Ctrl, Alt, Shift, Fn, or Cmd), or when pressed multiple times in succession (to cycle through the several characters). Alternatively, a key may be overloaded to represent several characters ambiguously. In this scenario, when overloaded keys are pressed, disambiguation software can be employed to determine which corresponding characters are intended, for example, based on dictionary matching, word and letter frequencies, and/or grammar rules. However, where the layout of a reduced-size, overloaded keyboard does not readily conform to a user's previously learned typing procedures, user retraining may be difficult or time-consuming, and adoption of such devices may be poorly tolerated by users.

SUMMARY OF THE DETAILED DESCRIPTION

Embodiments disclosed in the detailed description include overloaded typing apparatuses, and related devices, systems, and methods. In this regard, in one embodiment a typing apparatus is provided. The typing apparatus may include, as non-limiting examples, a physical keyboard or a virtual keyboard displayed on an electronic device. In this embodiment, the typing apparatus comprises a plurality of overloaded keys in a key layout, each overloaded key representing at least two characters disposed in a represented non-overloaded keyboard. The plurality of overloaded keys comprises at least three injectively overloaded keys disposed in a first row of keys. The injectively overloaded keys may be overloaded with alphabetic characters of a represented non-overloaded keyboard (e.g., a QWERTY keyboard) such that no alphabetic characters associated with different fingers on the represented non-overloaded keyboard are provided on a same overloaded key. At least one first injectively overloaded key among the at least three injectively overloaded keys is injectively overloaded with a first at least three characters assigned to a first finger in a represented non-overloaded keyboard. The plurality of overloaded keys also comprises at least one second injectively overloaded key disposed outside the first row of keys. The at least one second injectively overloaded key is injectively overloaded with a second at least three characters assigned to the first finger in the represented non-overloaded keyboard. In this manner, this typing apparatus allows a typist to rapidly enter data and text using a reduced-width keyboard, which may, for example, be employed to allow input by a user into a portable or smaller-size electronic device. This typing apparatus also provides a reduced finger travel distance for typing textual phrases. This typing apparatus also provides a reduced reaction time for typing textual phrases.

As a non-limiting example, the at least one first injectively overloaded key among the at least three injectively overloaded keys may be injectively overloaded with {"R", "F", "V"} or {"U", "J", "M"}, which are at least three characters assigned to an index finger (left-hand and right-hand, respectively) in a QWERTY keyboard. By way of further example, the at least one second injectively overloaded key disposed outside the first row of keys may be injectively overloaded with {"T", "G", "B"} or {"Y", "H", "N"}, which are at least three characters also assigned to an index finger (left-hand and right-hand, respectively) in the QWERTY keyboard.

In another embodiment, a further typing apparatus is provided which comprises an arrangement of overloaded keys in a key layout, each overloaded key representing at least two characters disposed in a represented non-overloaded keyboard. The arrangement of the overloaded keys is injective of an arrangement of alphabetic keys of the represented non-overloaded keyboard. The arrangement of the overloaded keys is also order disruptive of the arrangement of alphabetic keys of the represented non-overloaded keyboard.

In another embodiment, a further typing apparatus is provided. The typing apparatus comprises a plurality of overloaded keys in a key layout, each overloaded key representing at least two characters disposed in a QWERTY keyboard. At least one first overloaded key among the plurality of overloaded keys is assigned to a first row of keys of the typing apparatus. The at least one first overloaded key may comprise a first input key overloaded with at least a "q" character, an "a" character, and a "z" character. The at least one first overloaded key may comprise a second input key overloaded with at least a "w" character, an "s" character, and an "x" character. The at least one first overloaded key may comprise a third input key overloaded with at least an "e" character, a "d" character, and a "c" character. The at least one first overloaded key may comprise a fourth input key overloaded with at least an "r" character, an "f" character, and a "v" character. The at least one first overloaded key may comprise a fifth input key overloaded with at least a "u" character, a "j" character, and an "m" character. The at least one first overloaded key may comprise a sixth input key overloaded with at least an "i" character, and a "k" character. The at least one first overloaded key may comprise a seventh input key overloaded with at least an "o" character and an "l" character. The typing apparatus further comprises at least one second overloaded key among the plurality of overloaded keys representing at least two characters. The at least one second overloaded key may comprise an eighth input key overloaded with at least a "t" character, a "g" character, and a "b" character. The at least one second overloaded key may comprise a ninth input key overloaded with at least a "y" character, an "h" character, and an "n" character. The at least one second overloaded key is assigned a position outside the first row of keys. The typing apparatus may further comprise a tenth input key providing at least a "p" character.

In another embodiment, a method of providing a key layout for a typing apparatus is provided. The method comprises providing a plurality of overloaded keys in the key layout, each overloaded key representing at least two characters disposed in a represented non-overloaded keyboard. The method also comprises providing at least three injectively overloaded keys among the plurality of overloaded keys in a first row of keys of the key layout. The method also comprises providing at least one first injectively overloaded key among the plurality of overloaded keys in the key layout, wherein the at least one first injectively overloaded key is injectively overloaded with a first at least three characters assigned to a first finger in a represented non-overloaded keyboard. The method also comprises providing at least one second injectively overloaded key among the plurality of overloaded keys in the key layout, wherein the second injectively overloaded key is injectively overloaded with a second at least three characters assigned to the first finger in the represented non-overloaded keyboard. The at least one second injectively overloaded key is disposed outside the first row of keys of the key layout.

In another embodiment, a method of providing a key layout for a typing apparatus is provided. The method comprises providing an arrangement of overloaded keys in a key layout, each overloaded key representing at least two characters disposed in a represented non-overloaded keyboard. The arrangement of the overloaded keys is injective of an arrangement of alphabetic keys of the represented non-overloaded keyboard. The arrangement of the overloaded keys is order disruptive of the arrangement of alphabetic keys of the represented non-overloaded keyboard.

The aforementioned typing apparatuses allow a typist to rapidly enter data and text using a reduced-width keyboard, which may, for example, be employed to allow input by a user into a portable or smaller-size electronic device. The aforementioned typing apparatuses also provide a reduced finger travel distance for typing textual phrases. The aforementioned typing apparatuses also provide a reduced reaction time for typing textual phrases.

BRIEF DESCRIPTION OF THE DRAWINGS

FIG. 3G is a logical diagram depicting a QWERTY key layout;

FIG. 3H is a schematic diagram which logically depicts a grid layout of keys of the QWERTY key layout of FIG. 3G;

FIG. 5C is a logical diagram depicting an overloaded key layout which is injective of the QWERTY key layout of FIGS. 5A and 5B;

FIG. 5D is a logical diagram depicting an overloaded key layout which is injective and order disruptive of the QWERTY key layout of FIGS. 5A and 5B;

FIG. 5E is a logical diagram depicting a reduced-width key layout with inward shifted left-hand and right-hand portions of the key layout of FIG. 5D;

FIG. 5F is a schematic diagram depicting a reduced-width key layout which is injective and order disruptive of the QWERTY key layout of FIG. 5A;

FIGS. 12A, 12B, and 12C are schematic diagrams of the exemplary key layout of FIG. 6 disposed upon an exemplary physical keyboard having foldable sections in folded, partially opened, and fully opened positions, respectively;

FIG. 13A is a schematic diagram depicting a top view of an exemplary physical keyboard having foldable sections in a folded position;

FIG. 13B is a schematic diagram depicting a front view of the exemplary foldable physical keyboard of FIG. 13A in a folded position;

FIG. 13C is a schematic diagram depicting a top view of the exemplary foldable physical keyboard of FIG. 13A in a slid position;

FIG. 13D is a schematic diagram depicting a front view of the exemplary foldable physical keyboard of FIG. 13A in a slid position;

FIG. 13E is a schematic diagram depicting a top view of the exemplary foldable physical keyboard of FIG. 13A in an unfolded position;

FIG. 13F is a schematic diagram depicting a front view of the exemplary foldable physical keyboard of FIG. 13A in an unfolded position;

FIG. 18G is a schematic diagram depicting a rear perspective view of the exemplary physical keyboards of FIGS. 18A and 18B;

FIG. 18H is a schematic diagram depicting a bottom perspective view of the exemplary physical keyboards of FIGS. 18A and 18B;

DETAILED DESCRIPTION

Figure 1:
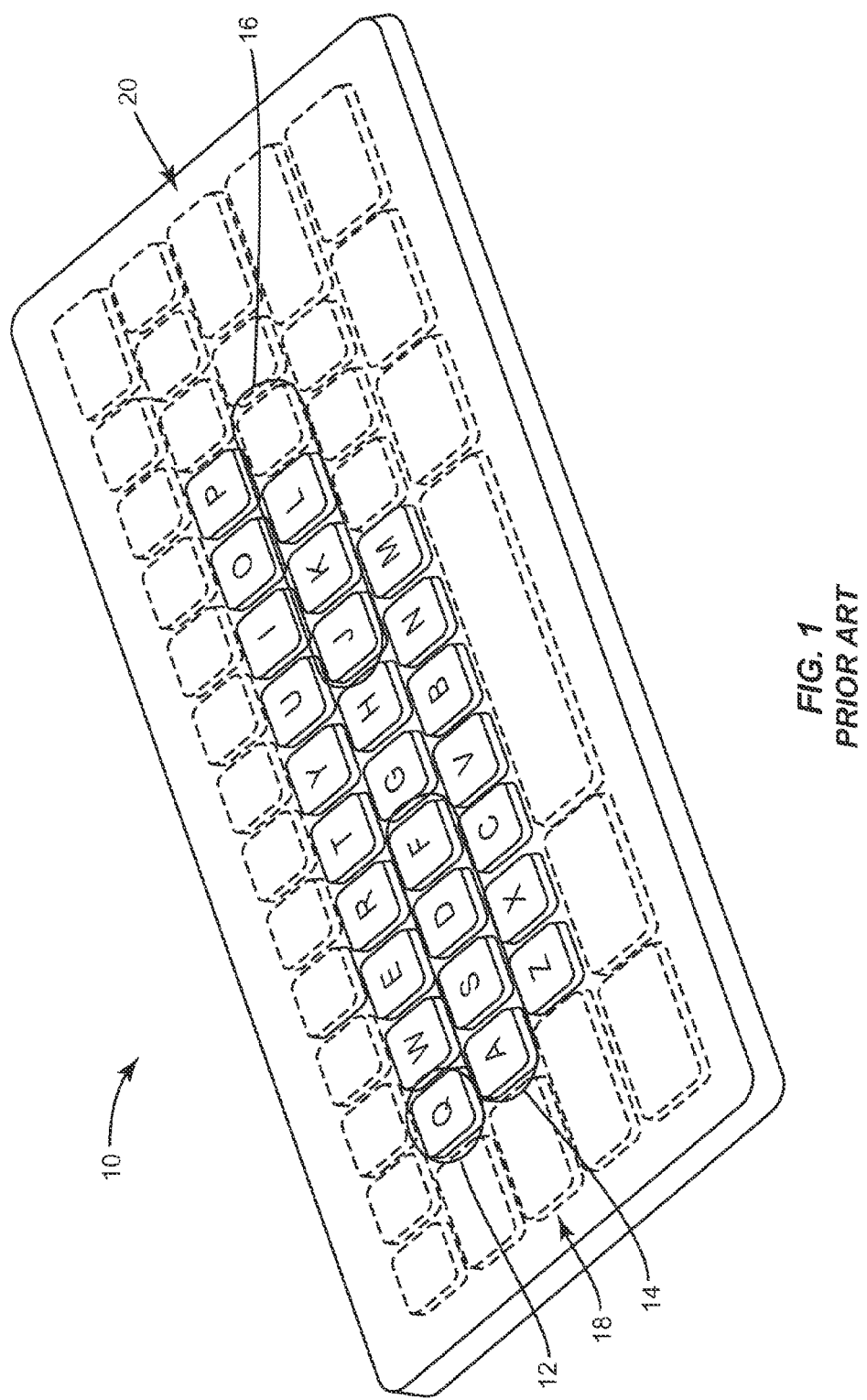
FIG. 1 is a schematic diagram of an exemplary QWERTY keyboard in the prior art.
Figure 2:
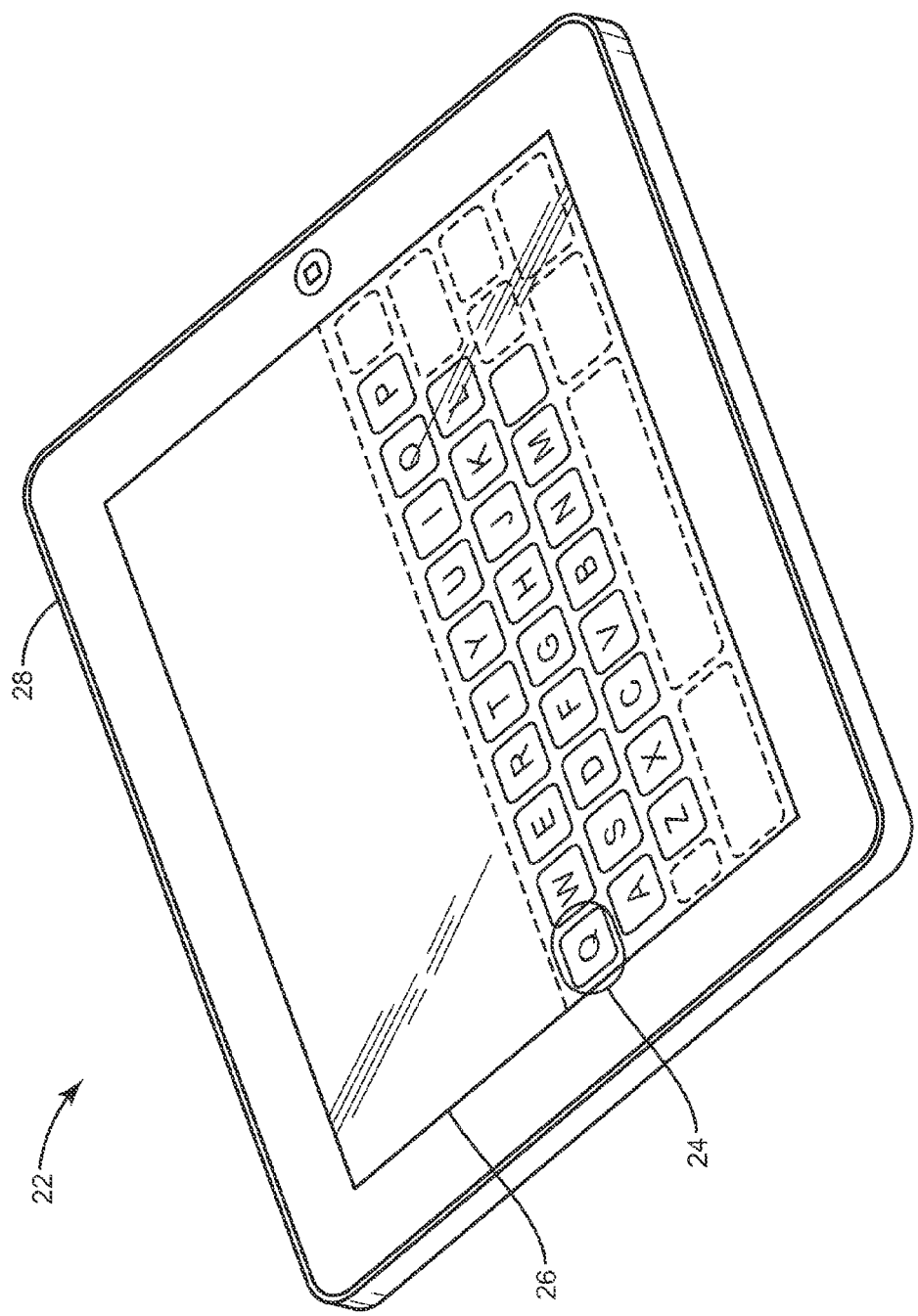
FIG. 2 is a schematic diagram of an exemplary QWERTY keyboard on an electronic touch-screen device in the prior art.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include overloaded typing apparatuses, and related devices, systems, and methods. In this regard, in one embodiment a typing apparatus is provided. The typing apparatus may include, as non-limiting examples, a physical keyboard or a virtual keyboard displayed on an electronic device. In this embodiment, the typing apparatus comprises a plurality of overloaded keys in a key layout, each overloaded key representing at least two characters disposed in a represented non-overloaded keyboard. The plurality of overloaded keys comprises at least three injectively overloaded keys disposed in a first row of keys. The injectively overloaded keys may be overloaded with alphabetic characters of a represented non-overloaded keyboard (e.g., a QWERTY keyboard) such that no alphabetic characters associated with different fingers on the represented non-overloaded keyboard are provided on a same overloaded key. At least one first injectively overloaded key among the at least three injectively overloaded keys is injectively overloaded with a first at least three characters assigned to a first finger in a represented non-overloaded keyboard. The plurality of overloaded keys also comprises at least one second injectively overloaded key disposed outside the first row of keys. The at least one second injectively overloaded key is injectively overloaded with a second at least three characters assigned to the first finger in the represented non-overloaded keyboard. This typing apparatus allows a typist to rapidly enter data and text using a reduced-width keyboard, which may, for example, be employed to allow input by a user into a portable or smaller-size electronic device. This typing apparatus also provides a reduced finger travel distance for typing textual phrases. This typing apparatus also provides a reduced reaction time for typing textual phrases. Note that the typing apparatus examples herein may be provided singly or in any combination together as desired.

As a non-limiting example, the at least one first injectively overloaded key among the at least three injectively overloaded keys may be injectively overloaded with {"R", "F", "V"} or {"U", "J", "M"}, which are at least three characters assigned to an index finger (left-hand and right-hand, respectively) in a QWERTY keyboard. By way of further example, the at least one second injectively overloaded key disposed outside the first row of keys may be injectively overloaded with {"T", "G", "B"} or {"Y", "H", "N"}, which are at least three characters also assigned to an index finger (left-hand and right-hand, respectively) in the QWERTY keyboard.

Figure 3A:
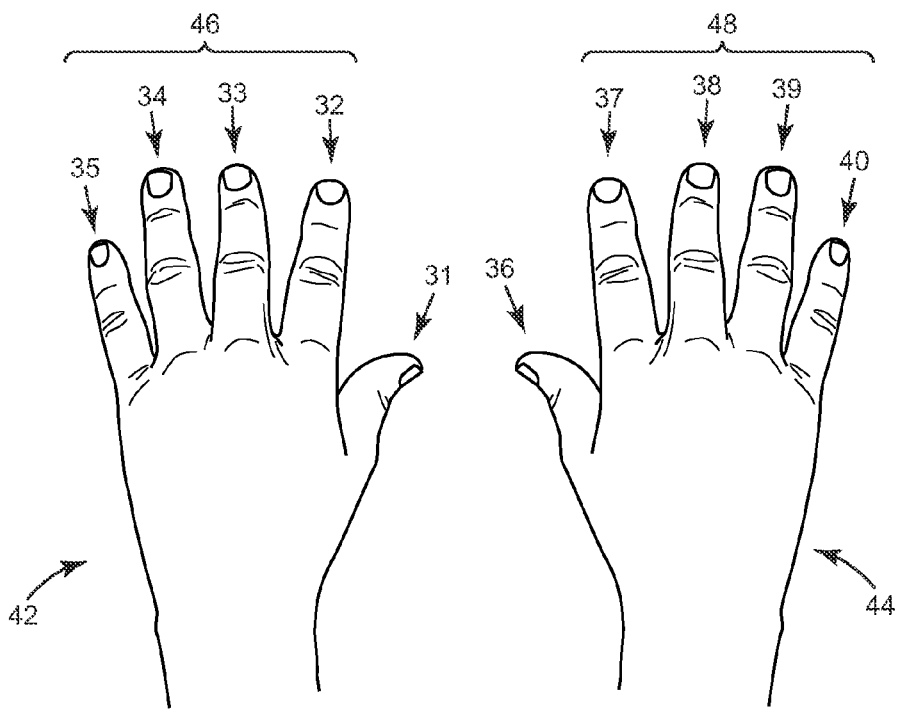
FIG. 3A is a schematic diagram depicting fingers of a left hand and a right hand.

Before discussing particular aspects of overloaded keyboard embodiments described herein, FIGS. 3A through 3F, 4, and 5A through 5F are set forth to illustrate terminology to be used herein and to further illustrate a methodology for providing various overloaded keyboard embodiments which may allow a typist to rapidly enter data and text using a reduced-width keyboard. Referring now to FIG. 3A, fingers 31, 32, 33, 34, 35, 36, 37, 38, 39, 40 of a hand 42, 44 may be referred to as follows: the thumb 31, 36; the index finger 32, 37; the middle finger 33, 38; the ring finger 34, 39; and the little finger 35, 40. Collectively, the index finger 32, 37, middle finger 33, 38, ring finger 34, 39, and little finger 35, 40 may also be referred to as the triphalangeal fingers 46, 48 as these fingers each contain three phalanx bones (proximal, intermediate, and distal) whereas the thumb 31, 36 contains only two phalanx bones (proximal and distal).

Figure 3B:
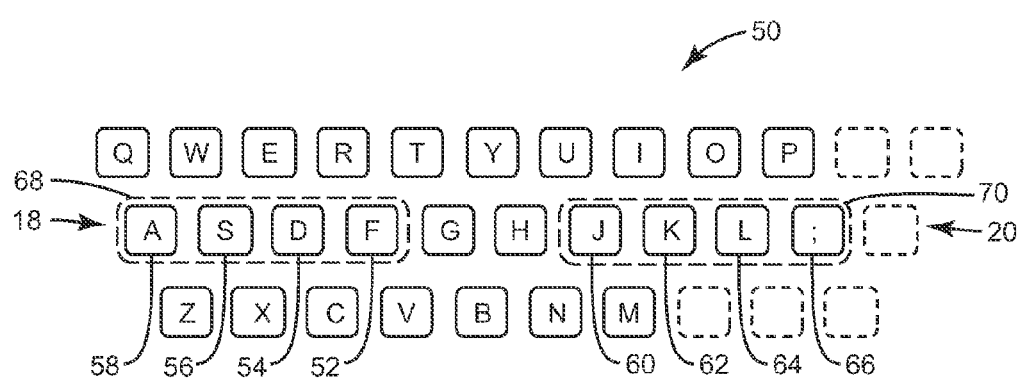
FIG. 3B is a logical diagram depicting home keys of an exemplary QWERTY key layout.
Figure 3C:
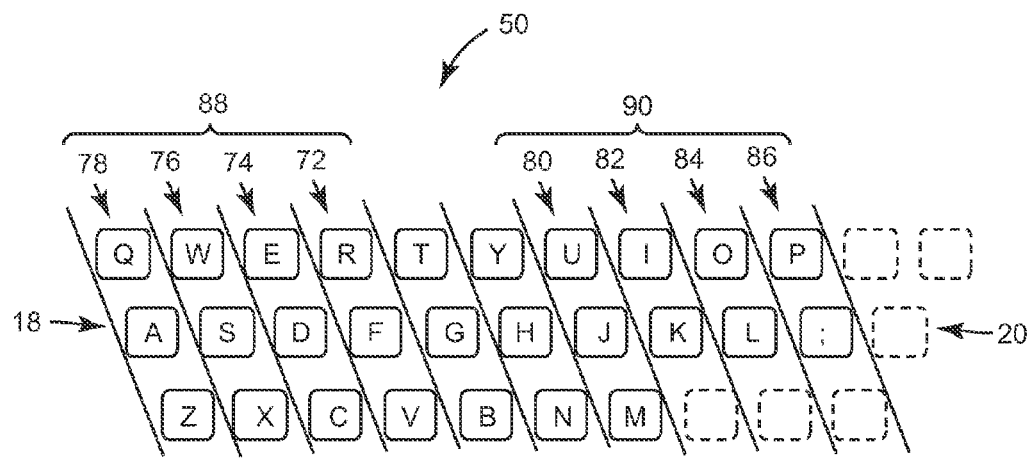
FIG. 3C is a logical diagram depicting home columns of the exemplary QWERTY key layout in FIG. 3B.
Figure 3D:
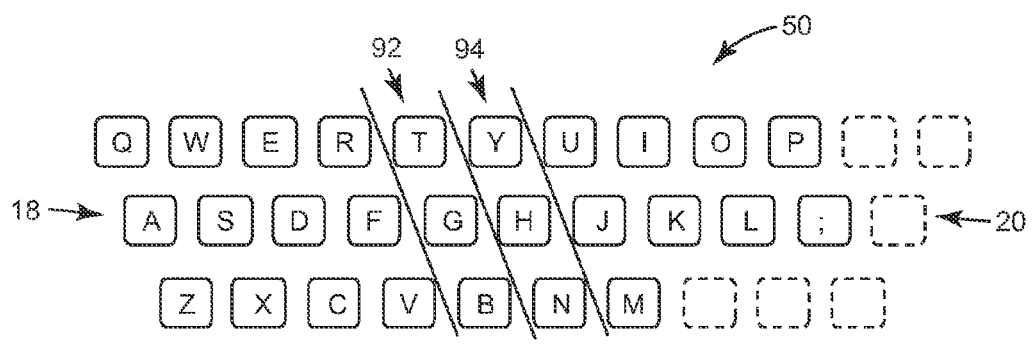
FIG. 3D is a logical diagram depicting non-home columns of the exemplary QWERTY key layout in FIG. 3B.

Referring now to FIG. 3B, regardless of key layout, typists are generally trained to place their triphalangeal fingers 46, 48 on assigned keys 52, 54, 56, 58, 60, 62, 64, 66 in the home row 18, 20 of a keyboard, also known as "home keys" 68, 70, as illustrated in FIG. 3B. A typist is trained to return her fingers to these home keys 68, 70 for reference after pressing any other key that is not among the home keys 68, 70. For example, on a QWERTY key layout 50 illustrated in FIG. 3B, the home keys 52, 54, 56, 58 for the left hand, collectively referred to herein as element 68, are "A", "S", "D", and "F", and the home keys 60, 62, 64, 66 for the right hand, collectively referred to herein as element 70, are "J", "K", "L", and ";". These home keys 68, 70 are located on the home row 18, 20 within home columns 88, 90 (FIG. 3C) of the QWERTY key layout 50. Referring now to FIG. 3C, a typist typically learns to use a same finger to press the keys of a home column 72, 74, 76, 78, 80, 82, 84, 86. For example, on the QWERTY key layout 50, a typist learns to press "R", "F", and "V" with the index finger 32 of her left hand 42 (FIG. 3A). A typist also learns to use certain fingers to type keys on a non-home column 92, 94 of the QWERTY key layout 50, illustrated in FIG. 3D. For example, on the QWERTY key layout 50, a typist learns to also use her left-hand index finger 32 (FIG. 3A) to type keys "T", "G", and "B" in the non-home column 92 of the QWERTY key layout 50.

Figure 3E:
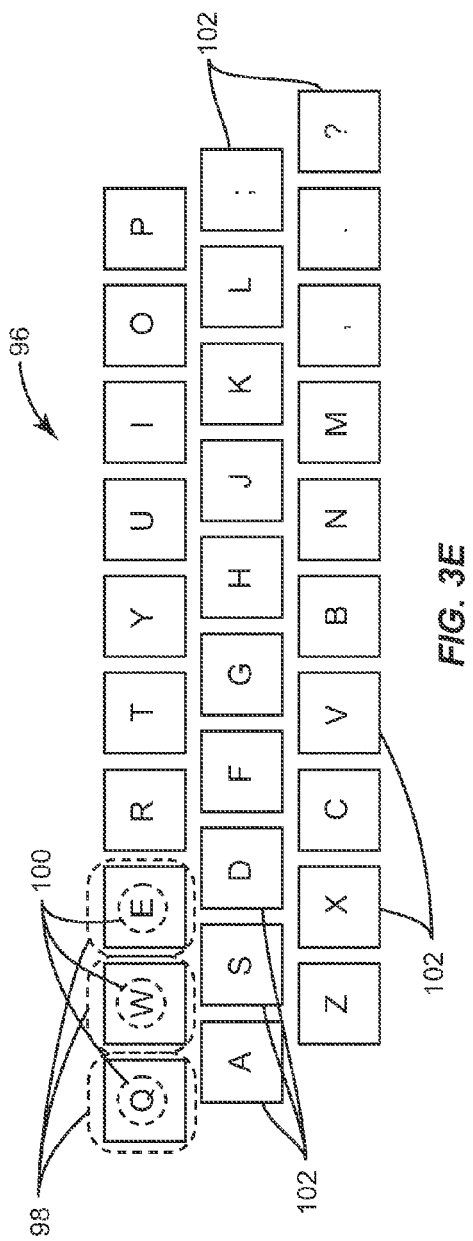
FIG. 3E is a logical diagram depicting a QWERTY key layout.
Figure 3F:
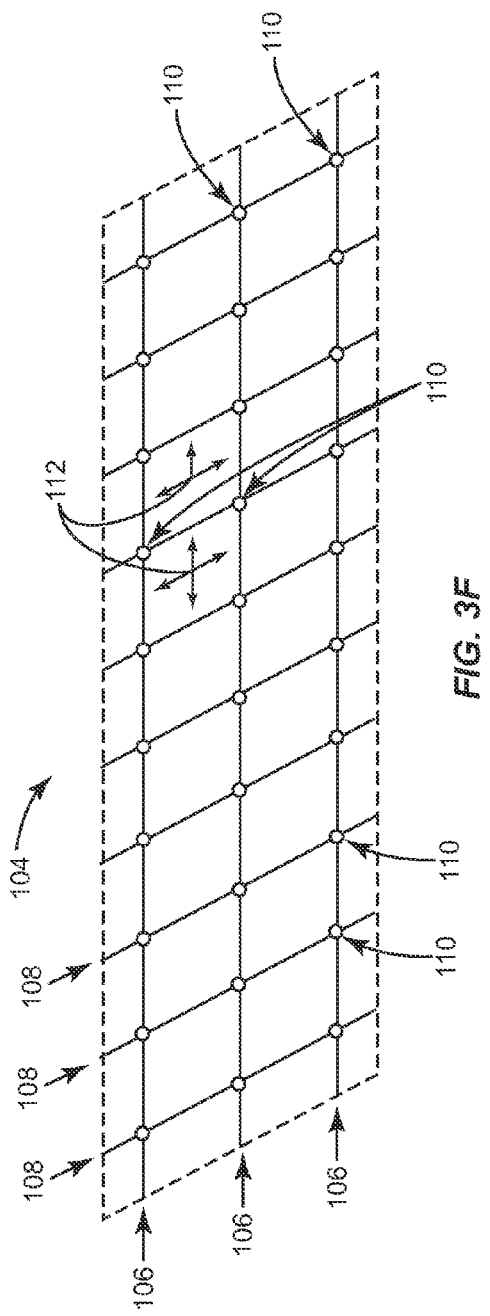
FIG. 3F is a schematic diagram which logically depicts a grid layout of keys of the QWERTY key layout of FIG. 3E.

FIG. 3E illustrates a logical arrangement of keys of a represented QWERTY keyboard. FIG. 3F depicts a grid pattern corresponding to the arrangement of keys of FIG. 3E. Referring now to FIGS. 3E and 3F, keys 98 of a key layout, e.g., a key layout 96, may be arranged in a grid pattern in a grid 104, comprising rows 106 and columns 108. The rows 106 of the grid 104 may be linear or non-linear. For example, linear rows of the grid 104 may run straight. Adjacent linear rows of the grid 104 may run parallel to one another. Non-linear rows of the grid 104 may be curved, and adjacent non-linear rows may not run parallel to one another. The columns 108 of the grid 104 may also be linear or non-linear. For example, linear columns of the grid 104 may run straight. Adjacent linear columns of the grid 104 may run parallel to one another. Non-linear columns of the grid 104 may be curved, and adjacent non-linear columns of the grid 104 may not run parallel to one another. The rows 106 and columns 108 may be orthogonal or non-orthogonal to one another. For example, an intersecting row 106 and column 108 may intersect perpendicularly or non-perpendicularly. Keys corresponding to the left and right hands may be disposed upon a same grid 104. Alternatively, a grid for the left hand may be different and distinct from a grid for the right hand. The exemplary grid 104 of FIG. 3F depicts linear rows 106 and linear columns 108. However, the linear rows 106 and linear columns 108 of the exemplary grid of FIG. 3F are non-orthogonal in relation to one another.

Determining a grid layout associated with a key layout allows one to determine key adjacencies and a relative ordering of keys. For example, in continuing reference to FIG. 3F, a layout for the grid 104 may be determined from the key layout 96 allowing one to determine a left-to-right ordering of keys and a bottom-to-top ordering of keys of the key layout 96. In this regard, FIG. 3F depicts a layout for the grid 104 corresponding to the key layout 96 of a represented QWERTY keyboard. Centerpoints 110 may be denoted for each key 102 of the key layout 96. Gridlines 112 connecting the centerpoints 110 denote adjacent keys. As illustrated in FIG. 3F, the gridlines 112 of the grid 104 may be non-orthogonal. For example, the gridlines 112 in FIG. 3F are skewed and thus non-orthogonal. In this manner, the layout of the grid 104 corresponding to the key layout 96 may be determined.

An exemplary input key layout may represent any one of a plurality of alternative key layouts. For example, characters 100 associated with the key layout 96 of FIG. 3E could be provided from a key layout for a given language and/or geographic region or other key layout. For example, characters 100 associated with the keys 98 of the key layout 96 of FIG. 3E could comprise any one of a QWERTY keyboard, a QWERTZ keyboard, an AZERTY keyboard, or a Dvorak keyboard. Characters assigned to key layouts corresponding to the keyboard of FIG. 3E may be tailored for a particular language or dialect, for example, American English, British English, German, Swiss, French, or Flemish. Characters 100 assigned to the keys 98 of the key layout 96 of FIG. 3E could also be associated with keyboards associated with non-Latin based languages, such as Russian, Arabic, Greek, Japanese, or Mandarin Chinese. Such key layouts may vary, for example, by geographic region. For example, the characters assigned to a French AZERTY keyboard may differ from characters assigned to a Belgian AZERTY keyboard. One of ordinary skill in the art will recognize other variant keyboards, including variants based on region, language, dialect, or other usage.

FIG. 3G illustrates a logical arrangement of keys of another exemplary QWERTY keyboard. FIG. 3H depicts a grid pattern corresponding to the arrangement of keys of FIG. 3G. Referring now to FIGS. 3G and 3H, characters 118 assigned to keys 116, 120 of a key layout 114 correspond to a QWERTY keyboard. The keys 116 of a key layout, e.g., the key layout 114, may be arranged in a grid pattern of a grid 122, comprising rows 124 and columns 126. The exemplary grid 122 of FIG. 3H depicts linear rows 124 and linear columns 126, in orthogonal relation to one another. A layout for the grid 122 may be determined from the key layout 114 allowing one to determine a left-to-right ordering of keys and a bottom-to-top ordering of keys of the key layout 114. In this regard, FIG. 3H depicts a layout for the grid 122 corresponding to the key layout 114 of a represented QWERTY keyboard. Centerpoints 128 may be denoted for each key 120 of the key layout 114. Gridlines 130 connecting the centerpoints 128 denote adjacent keys. As illustrated in FIG. 3H, the gridlines 130 of the grid 122 may be orthogonal. In this manner, the layout of the grid 122 corresponding to the key layout 114 may be determined.

Figure 4:
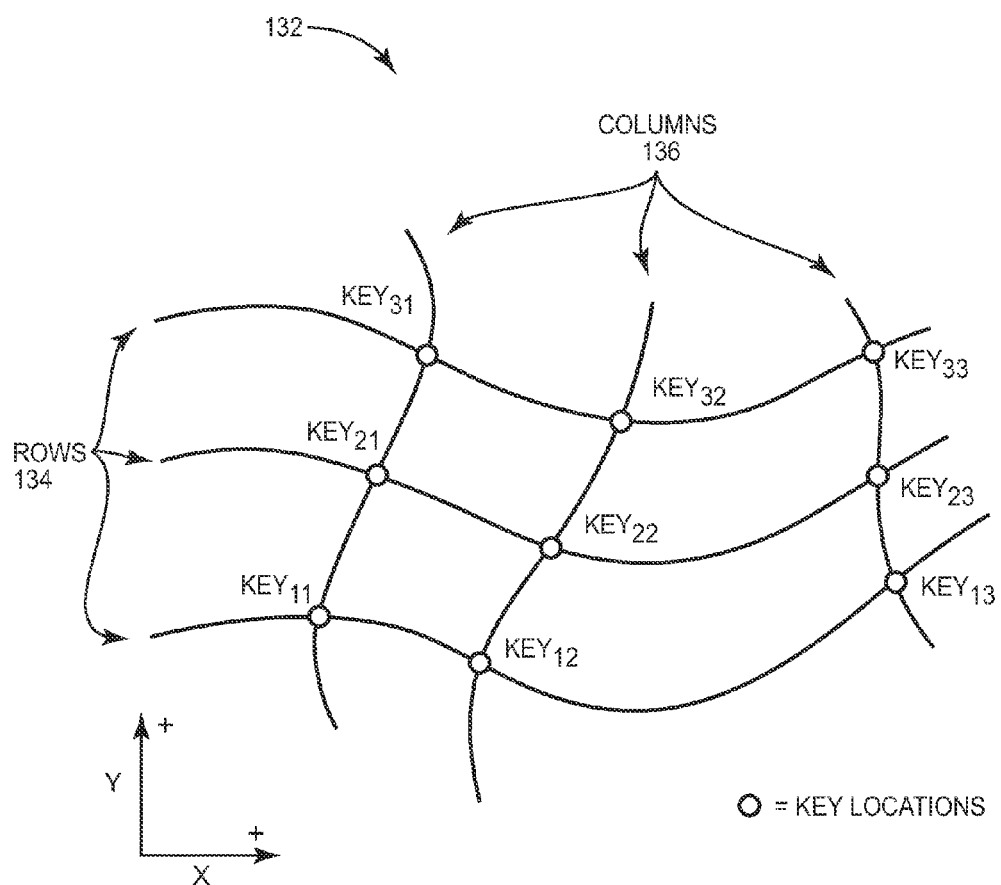
FIG. 4 is a schematic diagram depicting an exemplary keyboard grid layout having non-linear rows and non-linear columns.

Upon determining a grid layout associated with an arrangement of keys, a left-to-right ordering of keys and a bottom-to-top ordering of keys may be determined. For example, FIG. 4 depicts an ordering of a set of keys ($KEY_{11} \ldots KEY_{33}$). The left-to-right ordering of keys of a row may be associated with an x-direction. A relative ordering of any two keys of a row may be compared and denoted with comparison operators, such as $<_x, \leq_x, \geq_x, >_x, =_x$. The bottom-to-top ordering of keys of a column may be associated with a y-direction, and the relative ordering of any two keys of a column may be denoted with comparison operators, such as $<_y, \leq_y, \geq_y, >_y, =_y$. For example, in FIG. 4:

$KEY_{11} <_x KEY_{12}$; $KEY_{11} =_y KEY_{12}$
$KEY_{22} >_x KEY_{21}$; $KEY_{22} =_y KEY_{21}$
$KEY_{22} <_x KEY_{23}$; $KEY_{22} =_y KEY_{23}$
$KEY_{22} =_x KEY_{12}$; $KEY_{22} >_y KEY_{12}$
$KEY_{22} =_x KEY_{32}$; $KEY_{22} <_y KEY_{32}$

The relative left-to-right ordering may also be compared among keys on different rows. In addition, the relative bottom-to-top ordering may also be compared among keys of different columns. For example, in FIG. 4:

$KEY_{31} <_x KEY_{13}$; $KEY_{31} >_y KEY_{13}$
$KEY_{31} \leq_x KEY_{13}$; $KEY_{31} \geq_y KEY_{13}$ A character set associated with an "input" arrangement of a plurality of keys, $L_{IN}$, may be mapped to an "output" arrangement of a plurality of keys, $L_{OUT}$. If the characters associated with a plurality of keys $L_{IN}$ are mapped to one key $L_{OUT}$, then the input key layout, $L_{IN}$, to the output key layout, $L_{OUT}$, is reduced. $L_{OUT}$ may also be denoted a "reduced keyboard" (of $L_{IN}$). Thus, a "map" or "deformation", F, may be defined on the initial logical layout, $L_{IN}$, and with values $F(L_{IN})$ on the output layout, $L_{OUT}$.

For such a map, F, it is determined whether the mapping function preserves a relative logical x-ordering and y-ordering of $L_{IN}$ in $L_{OUT}$. Considering any characters a, b, and c of $L_{IN}$, an x-order and y-order preserving map (an "order-preserving" map) is defined among logical layouts by requiring:

$$a \leq_x b \Rightarrow F(a) \leq_x F(b)$$

$$a \leq_y b \Rightarrow F(a) \leq_y F(b)$$

Figure 5A:
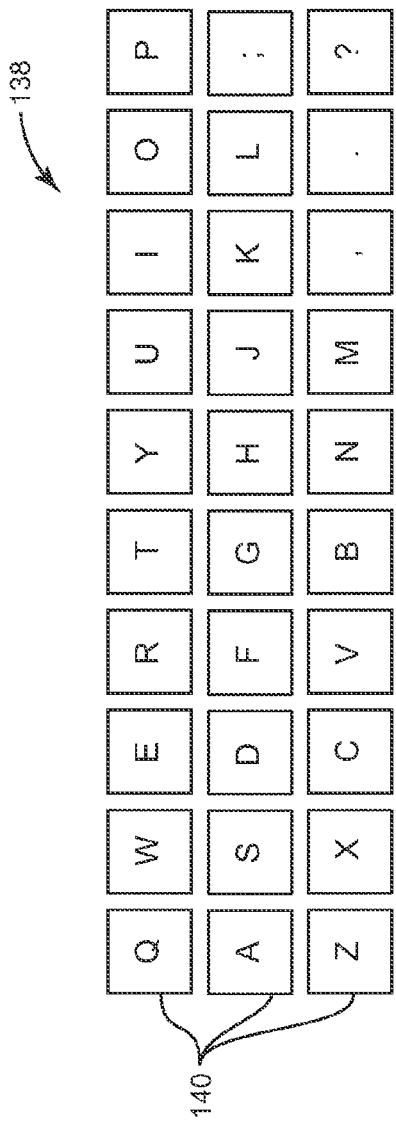
FIG. 5A is a schematic diagram depicting a QWERTY key layout.

A map, F, is called "order disruptive" if it does not preserve either the x-ordering or the y-ordering (or both). Accordingly, an arrangement of overloaded keys, $L_{OUT}$, is "order disruptive" of an input layout, $L_{IN}$, if the arrangement, $L_{OUT}$, does not preserve a row-ordering or a column-ordering of the keys of the input layout, $L_{IN}$. For example, a mapping from the key layout of FIG. 5A to the key layout of FIG. 5F is order disruptive, for at least the reason that $KEY_{'T'} >_y KEY_{'F'}$ in FIG. 5A, whereas $KEY_{'T'} <_y KEY_{'F'}$ in FIG. 5F. Furthermore, a mapping from the key layout of FIG. 5A to the key layout of FIG. 5F is order disruptive, for at least the reason that $KEY_{'H'} >_y KEY_{'M'}$ in FIG. 5A, whereas $KEY_{'H'} <_y KEY_{'M'}$ in FIG. 5F. Similarly, a mapping from the key layout of FIG. 5A to any of the key layouts of FIGS. 7A, 8A, 22, 23, 25A, 26A, 27, 28, 29, 30, 31, 32, 33, 34, 35, 36, and 37 is also order disruptive.

It is desirable that a typist should not need to learn different finger assignments from a represented keyboard when using a new, deformed keyboard. Accordingly, an output layout, $L_{OUT}$, may not have characters on a given key that are associated with different fingers from the input layout, $L_{IN}$, with which the typist is already familiar. In other words, the new output layout may not combine characters on a same key which are associated with different fingers of the input layout, $L_{IN}$. This concept may be formally described as follows. A certain character set of interest of a represented keyboard is defined. For example, the character set may be all lowercase letters (or a subset thereof), all uppercase letters (or a subset thereof), both uppercase and lowercase letters (or a subset thereof), or any of the aforementioned groupings supplemented with symbols (such as punctuation symbols), numbers, or other characters. Number each of the fingers from i=1, . . . 10. Now, given a character set, there will be a certain collection of characters (from the character set) that is associated with a finger i. This is called collection $ch_i$. For example, for a represented QWERTY keyboard and character set, S, consisting of lowercase letters, $ch_{left\ index\ finger}$ = {rfvtgb}. After mapping an input layout, $L_{IN}$, to an output layout, $L_{OUT}$, each character set, $ch_i$, becomes associated with a set of keys, in the output layout, $L_{OUT}$. If characters {rfv} are associated with one key, $k_a$, and characters {tgb} are associated with another key, $k_b$, then $K_{left\,index\,finger}$ consists of two keys, $k_a$ and $k_b$. An output layout, $L_{OUT}$, (or a mapping, F) is called "injective" with respect to finger i if $K_i$ is disjoint from all the other $K_j$'s (j≠i):

$K_i \cap K_j = \emptyset$ whenever i≠j.

If a mapping, F, is injective with respect to the eight triphalangeal fingers (i.e., each of the fingers having three phalangeal bones, which excludes the thumbs), then F is called "injective" and $L_{OUT}$ is "injective" of $L_{IN}$. For example, the layout of FIG. 5F is "injective" of the layout of FIG. 5A. Each of the layouts depicted in FIGS. 7A, 8A, 22, 23, 25A, 26A, 27, 28, 29, 30, 31, 32, 33, 34, 35, 36, and 37 are also "injective" of the layout of FIG. 5A. Injectivity ensures that an output layout, $L_{OUT}$, does not combine characters on a same key which are associated with different fingers of an input layout, L. Thus, for example, the injectivity of an output layout, $L_{OUT}$, with respect to an input layout, $L_{IN}$, of a represented keyboard ensures that characters assigned to different fingers in the represented keyboard (having the input layout, $L_{IN}$) do not end up on a same key in an output layout, $L_{OUT}$.

If F is injective of alphabetic characters of a represented keyboard, F is called "alphabetically injective" of the represented keyboard. For example, the key layouts in FIGS. 5F, 7A, 8A, 22, 23, 25A, 26A, 27, 28, 29, 30, 31, 32, 33, 34, 35, 36, and 37 are all alphabetically injective of a QWERTY keyboard for an alphabet "A" to "Z" (and "a" to "z"). If F is injective of numerical characters of a represented keyboard, F is called "numerically injective" of the represented keyboard. For example, the key layout in FIG. 18B is numerically injective of a QWERTY keyboard. If F is injective of symbolic characters of a represented keyboard, F is called "symbolically injective" of the represented keyboard. For example, the key layout in FIG. 27 is symbolically injective of a QWERTY keyboard.

For example, a set of keys, $S_1$, representing {{QAZ}, {WSX}, {EDC}, {RFV}, {TGB}, {YHN}, {UJM}, {IK}, {OL}, {P}} is alphabetically injective of a QWERTY keyboard. Further, a set of keys, $S_2$, representing {{QAZ1}, {WSX2}, {EDC3}, {RFV4}, {TGB5}, {YHN6}, {UJM7}, {IK8}, {OL9}, {P0}} is alphabetically injective of a QWERTY keyboard and numerically injective of a QWERTY keyboard. A set of keys, $S_3$, representing {{AQW}, {ZSX}, {EDC}, {RFV}, {TGB}, {YHN}, {UJ}, {IK}, {OL}, {PM}} is alphabetically injective of an AZERTY keyboard, whereas a set of keys, $S_4$, representing {{AQW1}, {ZSX2}, {EDC3}, {RFV4}, {TGB5}, {YHN6}, {UJ7}, {IK8}, {OL9}, {PM0}}, is alphabetically injective of an AZERTY keyboard and numerically injective of an AZERTY keyboard. A set of keys, $S_5$, representing {{A}, {OQ}, {EJ}, {PUK}, {YIX}, {FDB}, {GHM}, {CTW}, {RNV}, {LSZ}} is alphabetically injective of an ANSI X4.22-1983 (Dvorak) keyboard. A set of keys, $S_6$, representing {{QAY}, {WSX}, {EDC}, {RFV}, {TGB}, {ZHN}, {UJM}, {IK}, {OL}, {PÖ}, {ÜÄ}} is alphabetically injective of a German QWERTZ keyboard.

Another concept for a deformation, F, is that of "adjacency consistency." A first key is defined to be "adjacent" to a second key if there are no other keys disposed between the first and second key. A deformation, F, is called "adjacency consistent" if for every first character represented in an output layout, $L_{OUT}$, every second character represented on a key adjacent to the key representing the first character on the input layout, $L_{IN}$, is on a same or adjacent key of the output layout, $L_{OUT}$. If a deformation, F, is "adjacency consistent," then an output layout, $L_{OUT}$, resulting from the deformation, F, is "adjacency consistent" with the input layout, $L_{IN}$.

Once a certain keyboard's key layout has been learned by a typist and committed to procedural memory, the typist may poorly tolerate switching to a keyboard with an alternative key layout. Given the above terminology, a plurality of key layouts is provided which provide a reduced keyboard and which also preserve a same mapping of finger activations of a represented keyboard. For each of these reduced keyboards, the injectivity of the key layout ($L_{OUT}$) of the reduced keyboard with respect to a represented keyboard (having an input key layout, $L_{IN}$) ensures that characters assigned to different fingers in the represented keyboard (having the input layout, $L_{IN}$) do not end up on a same key in the reduced keyboard (having an output layout, $L_{OUT}$). For at least this reason, these key layouts may beneficially aid a typist in rapid text and data entry of a vocabulary of words and phrases on a reduced keyboard.

A typing apparatus may also comprise an arrangement of overloaded keys, each overloaded key representing at least two characters disposed in a represented keyboard, wherein the arrangement of the overloaded keys is injective of an arrangement of alphabetic keys of the represented keyboard, and wherein the arrangement of the overloaded keys is order disruptive of the arrangement of alphabetic keys of the represented keyboard. The arrangement of the overloaded keys may be injective of keys associated with an index finger in the arrangement of alphabetic keys of the represented keyboard. Alternatively, the arrangement of the overloaded keys may be injective of keys associated with triphalangeal fingers in the arrangement of alphabetic keys of the represented keyboard. Alternatively, the arrangement of the overloaded keys may be injective of all alphabetic keys of the represented keyboard.

The arrangement of the overloaded keys may be order disruptive of keys associated with an index finger in the arrangement of alphabetic keys of the represented keyboard. Alternatively, the arrangement of the overloaded keys may be order disruptive of keys associated with triphalangeal fingers in the arrangement of alphabetic keys of the represented keyboard. The injective arrangement of overloaded keys may be an arrangement of overloaded keys wherein no alphabetic characters associated with different fingers on a represented keyboard are provided on a same overloaded key. The order-disruptive arrangement of overloaded keys may be an arrangement of the overloaded keys which does not preserve a row-ordering or a column-ordering of the alphabetic keys of the represented keyboard. The order-disruptive arrangement of overloaded keys may include at least one overloaded key arranged in a column different from the columns of corresponding alphabetic keys of the represented keyboard. The order-disruptive arrangement of overloaded keys may include at least one overloaded key arranged in a row different from the rows of corresponding alphabetic keys of the represented keyboard.

The arrangement of the overloaded keys may be adjacency consistent with the arrangement of alphabetic keys of the represented keyboard. The adjacency-consistent arrangement of overloaded keys may be an arrangement of overloaded keys maintaining adjacencies among the overloaded keys corresponding to the adjacencies among keys of the represented keyboard. The adjacency-consistent arrangement of overloaded keys may comprise an arrangement of overloaded keys wherein every first character adjacent to a second character on the represented keyboard is arranged on a same overloaded key as the second character or on an adjacent overloaded key as the second character in the arrangement of overloaded keys.

A physical keyboard may be realized by locating keys of the logical output layout, $L_{OUT}$, according to a particular output grid pattern, $G_{OUT}$. The output grid pattern, $G_{OUT}$, may be a different grid pattern from an input grid pattern, $G_{IN}$ ($G_{IN} \neq G_{OUT}$), or the output grid pattern may be the same grid pattern as the input grid pattern ($G_{IN} = G_{OUT}$). For example, the input grid pattern, $G_{IN}$, may have non-orthogonal linear rows and linear columns, whereas the output grid pattern, $G_{OUT}$, may have orthogonal linear rows and linear columns. By way of further example, the input grid pattern, $G_{IN}$, may have non-split right-hand and left-hand portions, whereas the output grid pattern, $G_{OUT}$, may have split right-hand and left-hand portions. One of ordinary skill in the art will recognize other such permutations that may be made in accordance with the teachings of the present application. Accordingly, for example, an input grid pattern and logical input layout may be reduced to a logical output layout which is mapped to an output grid layout different from the input grid layout.

Figure 5B:
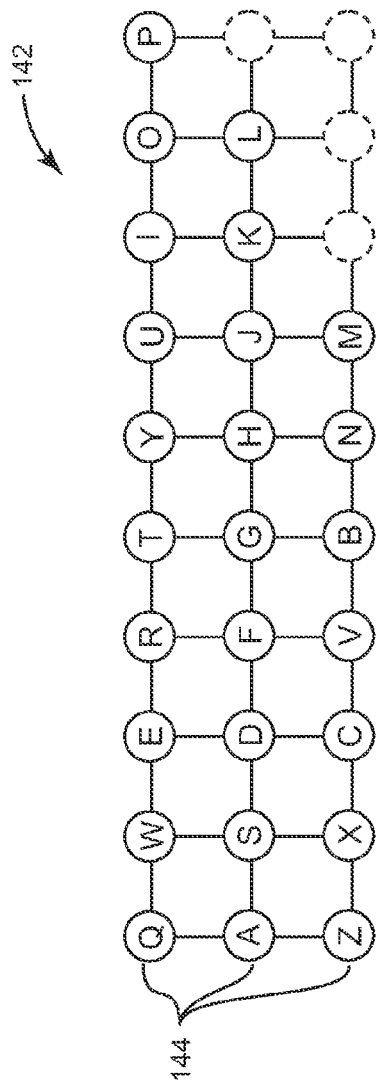
FIG. 5B is a logical diagram depicting a grid layout of keys of the QWERTY key layout of FIG. 5A.

FIGS. 5A through 5F demonstrate a method of deforming a non-overloaded represented keyboard (here, a QWERTY keyboard) to a reduced-width, injectively overloaded keyboard which may allow a typist to rapidly enter data and text using a reduced-width keyboard. FIG. 5A depicts a key layout 138 of a non-overloaded represented keyboard (here, a QWERTY keyboard key layout) of alphabetical, non-overloaded keys 140. The non-overloaded represented keyboard may be a full-size keyboard, for example, a keyboard with key centerpoints spaced a sufficient distance apart for a user to place each of her triphalangeal fingers on a different home key. For example, a keyboard having adjacent alphabetic keys whose centerpoints are spaced at least 15 mm apart is a full-size keyboard. FIG. 5B depicts a grid pattern 142 of alphabetical, non-overloaded keys 144 corresponding to the key layout 138 of FIG. 5A. FIG. 5C depicts a key layout 146 providing an injectively overloaded set of keys 150-168, in other words, a set of keys overloaded with characters ("A" through "Z") such that no alphabetic characters assigned to different fingers 31-40 (FIG. 3A) on the key layout 138 of the represented non-overloaded keyboard (FIG. 5A) are provided on a same overloaded key 150-168. Here, FIG. 5C provides an injectively overloaded set of keys 150-168 overloading characters on the keys 150-168 as follows: {{QAZ}, {WSX}, {EDC}, {RFV}, {TGB}, {YHN}, {UJM}, {IK}, {OL}, {P}}. FIG. 5C provides all of the injectively overloaded keys on a first row 148. A reduced-width, injectively overloaded key layout may be provided by disrupting the order of the keys 150-168 (for example, as shown in FIG. 5D) and shifting the left-hand and right-hand layouts together (for example, as shown in FIG. 5E). Now referring to key layout 170 of FIG. 5D, a {TGB} key 184 and a {YHN} key 186 may be provided outside a first row 172. Here, FIG. 5D provides injectively overloaded keys 176-182 and 188-194 on the first row 172 and injectively overloaded keys 184, 186 on a second row 174. Left-hand injectively overloaded keys 176-184 and right-hand injectively overloaded keys 186-194 may each be shifted inwards to provide a reduced-width, injectively overloaded key layout 196, as illustrated in FIG. 5E. The reduced-width, injectively overloaded key layout 196 is comprised of injectively overloaded keys 202-220. FIG. 5E depicts injectively overloaded keys 202-208 and 214-220 assigned to a first row 198 and injectively overloaded keys 210 and 212 assigned outside the first row 198. As depicted in FIG. 5E, injectively overloaded keys 210 and 212 may be assigned to a second row 200. As depicted in FIG. 5F, physical keys 228-246 may be positioned in a key layout 222 at locations corresponding to the logical key layout 196 in FIG. 5E. FIG. 5F provides a plurality of overloaded keys comprising at least three injectively overloaded keys 228-234 and 240-246 in a first row 224. First injectively overloaded keys 234, 240 are overloaded with at least three characters ({RFV} and {UJM}, respectively) assigned to a first finger (a left-hand index finger 32 (FIG. 3A) and a right-hand index finger 37 (FIG. 3A), respectively) in the key layout 138 of the represented non-overloaded keyboard (FIG. 5A). Second injectively overloaded keys 236, 238 are disposed outside the first row 224 (here, in a second row 226) overloaded with at least three characters ({TGB} and {YHN}, respectively) assigned to the first finger (a left-hand index finger 32 (FIG. 3A) and a right-hand index finger 37 (FIG. 3A), respectively) in the key layout 138 of the represented non-overloaded keyboard (FIG. 5A). Further, FIG. 5F provides an arrangement of overloaded keys 228-244 each representing at least two characters disposed in the key layout 138 of the represented non-overloaded keyboard (FIG. 5A). The arrangement of overloaded keys 228-244 is injective of an arrangement of alphabetic keys of the key layout 138 of the represented non-overloaded keyboard (FIG. 5A). The arrangement of overloaded keys 228-244 is also order disruptive of the arrangement of alphabetic keys of the key layout 138 of the represented non-overloaded keyboard (FIG. 5A).

Figure 6:
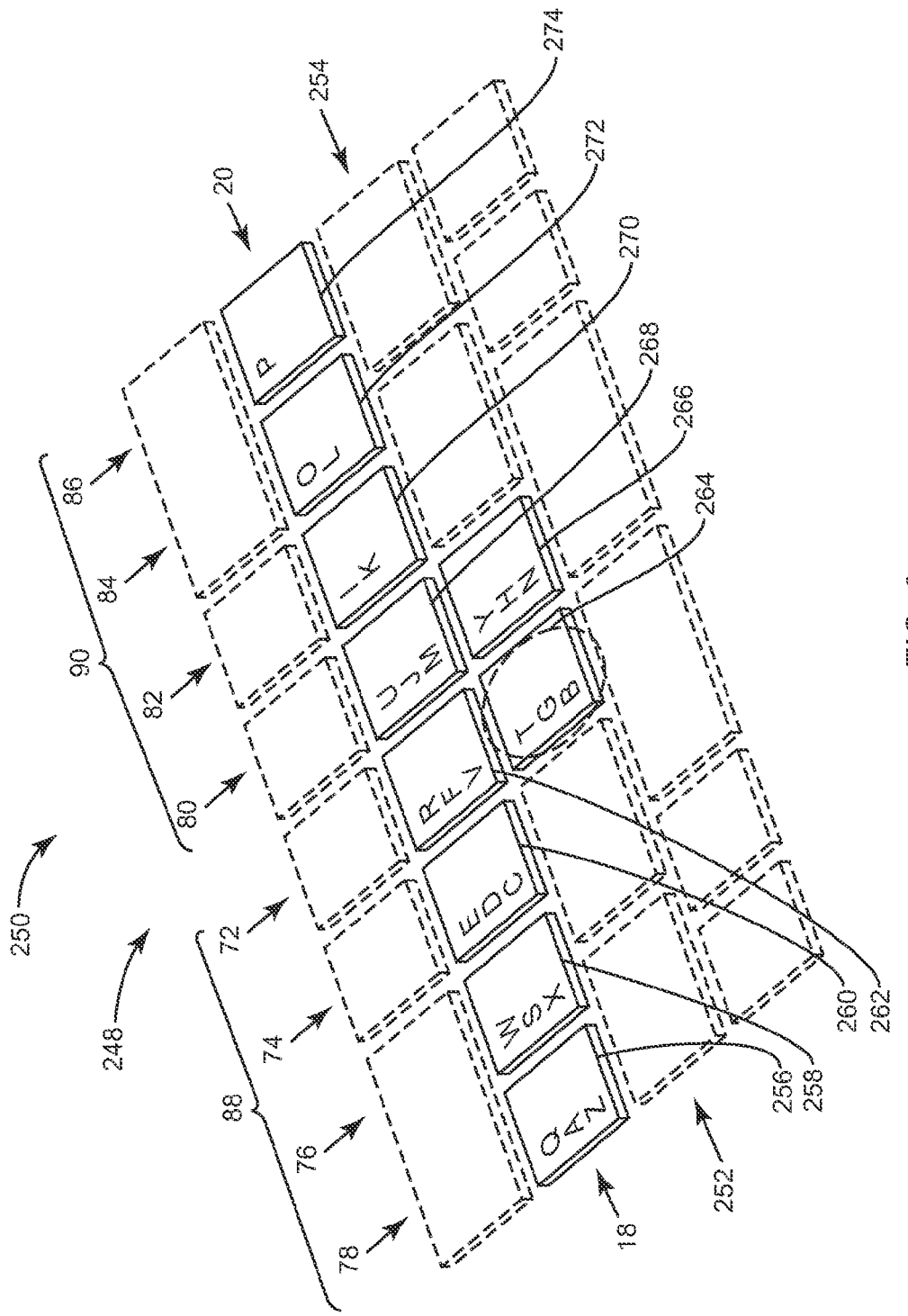
FIG. 6 is a schematic diagram of an exemplary typing apparatus in the form of a physical keyboard containing overloaded keys.

Referring now to FIG. 6, a key may be overloaded to represent several characters. Overloading one or more keys may beneficially reduce the number of keys required to represent a set of characters. An "overloaded key" is a key which represents multiple characters and which results in at least some ambiguity in the output character when the key is pressed. An overloaded key may be simultaneously overloaded with alphabetic characters (e.g., "A" through "Z" and "a" through "z"), numerical characters (e.g., "0" through "9"), punctuation symbols, and other symbols. Alternatively, an overloaded key may be overloaded with a particular subset of characters (such as alphabetical characters). When overloaded keys are pressed, disambiguation software can be employed to determine which corresponding characters are intended, for example, based on dictionary matching, beginning-of-word matching, phrase frequencies, word frequencies, character frequencies, grammar rules, error-correction algorithms, pattern-matching algorithms, and/or pattern-approximation algorithms. However, where the layout of a reduced-size, overloaded keyboard does not easily conform to a user's previously learned typing procedures, user retraining may be difficult or time-consuming, and adoption of such devices may be poorly tolerated by users.

A key layout 250 provided in FIG. 6 provides one exemplary embodiment to this problem. As will be described in more detail below, the key layout 250 includes the home, or first, rows 18, 20 of keys (in this example, eight keys wide) upon which a typist's fingers may concurrently rest and providing a row of four home keys 256, 258, 260, 262 for the left hand 42 (FIG. 3A) and four home keys 268, 270, 272, 274 for the right hand 44 (FIG. 3A). As shown in FIG. 6, these keys may be provided in home columns 72-78, collectively referred to herein as element 88, and home columns 80-86, collectively referred to herein as element 90. The overloaded home key 256, 258, 260, 262, 268, 270, 272, 274 for each finger is assigned characters that would be pressed by that same finger on a represented non-overloaded QWERTY keyboard. The remaining alphabetic characters are placed on additional overloaded keys (e.g., 264, 266) such that all characters placed on an additional overloaded key (e.g., 264, 266) will be pressed by a same finger as the finger that would press those characters on a represented non-overloaded keyboard. Positioning these additional (non-home) overloaded keys (e.g., 264, 266) outside the first row (e.g., on a second (non-home) row 252, 254) provides a reduced first-row layout width (eight keys wide). For example, positioning the additional keys (such as an overloaded "TGB" key 264 or an overloaded "YHN" key 266) outside the first row (e.g., on the second row 252, 254 above or below the first row 18, 20) such that the key (e.g., 264, 266) may still be pressed by a finger (e.g., 32, 37) which would have been activated to press that key in a represented non-overloaded QWERTY keyboard reduces the first-row layout width (to eight keys) while maintaining a typist's procedural memory of which fingers are activated to press keys for all characters of an alphabet. In this manner and discussed below in more detail, the key layout 250 in FIG. 6 may maintain a home row of keys for each triphalangeal finger 46, 48 of each hand 42, 44 (FIG. 3A), and thus a typist's procedural memory for typing a vocabulary of phrases, words, and letters may be used to type the vocabulary of phrases, words, and letters. Thus, this typing apparatus may allow a typist to rapidly enter data and text using a reduced-width keyboard, which may, for example, be employed to allow input by a user into a portable or smaller-size electronic device.

In continuing reference to FIG. 6, the key layout 250 comprises a plurality of overloaded keys 256-272 each representing at least two characters disposed in a QWERTY keyboard. The keys 256-272 are injectively overloaded with alphabetic characters of a QWERTY keyboard such that no characters assigned to different fingers of a QWERTY keyboard are represented on a same key. First injectively overloaded keys 262, 268 are injectively overloaded with a first at least three characters assigned to a first finger in a QWERTY keyboard (here, {RFV} and {UJM}, respectively). The first injectively overloaded keys 262, 268 are provided in the first row 18, 20 of the key layout 250. The first row 18, 20 may be a home row of the key layout 250. Second injectively overloaded keys 264, 266 are injectively overloaded with a second at least three characters assigned to the first finger in a QWERTY keyboard (here, {TGB} and {YHN}, respectively). The second injectively overloaded keys 264, 266 are provided outside the first row 18, 20 of the key layout 250. As shown in FIG. 6, the second injectively overloaded keys 264, 266 may be provided in a second row 252, 254 of the key layout 250 which may be a non-home row. In FIG. 6, the at least two ambiguously represented characters of each of the plurality of overloaded keys 256, 258, 260, 262, 264, 266, 268, 270, 272 are alphabetic characters.

In further reference to FIG. 6, an exemplary typing apparatus 248 provides an arrangement of overloaded keys 256-272 in the key layout 250 with each overloaded key 256-272 representing at least two characters disposed in a represented non-overloaded keyboard (in this example, a QWERTY keyboard). The arrangement of overloaded keys is injective of an arrangement of alphabetic keys of the represented non-overloaded (QWERTY) keyboard. For example, the keys 256-274 are injectively overloaded with alphabetic characters of a QWERTY keyboard such that no characters assigned to different fingers of a QWERTY keyboard are represented on a same key. The arrangement of overloaded keys is also order disruptive of the arrangement of alphabetic keys of the represented non-overloaded keyboard. For example, the arrangement of overloaded keys of FIG. 6 does not preserve a row-ordering of the keys of a QWERTY keyboard (e.g., FIG. 3G) for at least the reason that the "T" key is above the "F" key ($KEY._T >_y KEY._F$) in a QWERTY keyboard (FIG. 3G), whereas the "T" key (264) is below the "F" key (262) ($KEY._T <_y KEY._F$) in FIG. 6. By way of further example, the arrangement of overloaded keys of FIG. 6 does not preserve a row-ordering of the keys of a QWERTY keyboard (FIG. 3G) for at least the reason that the "H" key is above the "M" key ($KEY._H >_y KEY._M$) in a QWERTY keyboard (FIG. 3G), whereas the "H" key (266) is below the "M" key (268) ($KEY._H <_y KEY._M$) in FIG. 6. Accordingly, in FIG. 6, the arrangement of overloaded keys is order disruptive of the arrangement of alphabetic keys of the represented non-overloaded (QWERTY) keyboard. The arrangement of overloaded keys of FIG. 6 is also adjacency consistent of the alphabetic characters of a represented non-overloaded (QWERTY) keyboard. For example, for every first character on the keys 256-274, every second character adjacent to the first character on a QWERTY keyboard is on a same or adjacent key in FIG. 6. For example, the "T" and "R" characters are on adjacent keys on a QWERTY keyboard (FIG. 3G) (because no other keys are disposed between the "T" and "R" keys on the QWERTY keyboard) and the "T" and "R" characters are on the same or adjacent (here, adjacent) keys in FIG. 6 (because no other keys are disposed between the "T" and "R" keys in FIG. 6). By way of further example, the "T" and "G" characters are on adjacent keys on a QWERTY keyboard (FIG. 3G) (because no other keys are disposed between the "T" and "G" keys on the QWERTY keyboard) and the "T" and "G" characters are on the same or adjacent (here, same) keys in FIG. 6 (because no other keys are disposed between the "T" and "G" keys in FIG. 6). In FIG. 6, this adjacency-consistent property holds for every pairing of alphabetic characters ("A" through "Z") on the keys 256-274.

With continuing reference to FIG. 6, the exemplary typing apparatus 248 provides the plurality of overloaded keys 256-272 each representing at least two characters disposed in a QWERTY keyboard. Among the plurality of overloaded keys 256-272, first overloaded keys 256, 258, 260, 262 and 268, 270, 272, 274 are assigned to the first row 18, 20. In this example, the overloaded key 256 comprising "Q", "A", and "Z" is assigned to the first row 18. The overloaded key 256 may be assigned to the little finger 35 of the left hand 42 (FIG. 3A). The overloaded key 258 comprising "W", "S", and "X" is assigned to the first row 18. The overloaded key 258 may be assigned to the ring finger 34 of the left hand 42 (FIG. 3A). The overloaded key 260 comprising "E", "D", and "C" is assigned to the first row 18. The overloaded key 260 may be assigned to the middle finger 33 of the left hand 42 (FIG. 3A). The overloaded key 262 comprising "R", "F", and "V" is assigned to the first row 18. The overloaded key 262 may be assigned to the index finger 32 of the left hand 42 (FIG. 3A). The overloaded key 268 comprising "U", "J", and "M" is assigned to the first row 20. The overloaded key 268 may be assigned to the index finger 37 of the right hand 44 (FIG. 3A). The overloaded key 270 comprising "I" and "K" is assigned to the first row 20. The overloaded key 270 may be assigned to the middle finger 38 of the right hand 44 (FIG. 3A). The overloaded key 272 comprising "O" and "L" is assigned to the first row 20. The overloaded key 272 may be assigned to the ring finger 39 of the right hand 44 (FIG. 3A). The key 274 comprising "P" is provided in the first row 20. The key 274 may be assigned to the little finger 40 of the right hand 44 (FIG. 3A). Among the plurality of overloaded keys 256-272, second overloaded keys 264 (comprising "T", "G", and "B") and 266 (comprising "Y", "H", and "N") are assigned outside the first row 18, 20. As depicted in FIG. 6, the overloaded keys 264 and 266 are assigned to the second row 252, 254 below the first row 18, 20. The overloaded key 264 may be assigned to the index finger 32 of the left hand 42 (FIG. 3A). The overloaded key 266 may be assigned to the index finger 37 of the right hand 44 (FIG. 3A). Note that key 274 may or may not be an overloaded key. For example, the key 274 may represent a "P" character and no other alphabetic characters. However, the key 274 may also be overloaded with other symbols (in addition to the "P" character) such as punctuation symbols (for example, semicolon (;), colon (:), apostrophe ('), and/or question mark (?)).

The exemplary key layout 250 results in a reduced-width keyboard which spans as few as eight keys in width and as few as two keys in length and which also conforms to a QWERTY typist's procedural memory for typing a vocabulary of words and phrases. The exemplary key layout 250 may provide keys of sufficient size and shape that a typist may place each of her fingers on the home keys. In this regard, the exemplary key layout 250 conforms to a QWERTY typist's procedural memory for typing a vocabulary of words and phrases in that, for each alphabetical character ("a" through "z" and/or "A" through "Z"), a QWERTY typist will use a same finger to type the character on the exemplary key layout 250 as the typist would have used to type that character on a represented QWERTY keyboard.

Accordingly, a typist's procedural memory for typing a QWERTY typist's vocabulary of words and phrases may be reused, and a result may be achieved of allowing a QWERTY typist to rapidly enter data and text on a reduced-width keyboard. In addition, the exemplary key layout 250 results in less device area being occupied for input of a typist's vocabulary of words and phrases, which results in more device area being available for other uses. For example, the additional device area could be used to display additional screen output. In this regard, a user typing messages in an email application on the device may be able to view additional lines of typed text than she would otherwise have been able to view using an alternative keyboard. This typing apparatus also provides a reduced finger travel distance for typing textual phrases. This typing apparatus also provides a reduced reaction time for typing textual phrases.

As described above, FIG. 6 depicts one embodiment providing a reduced-width key layout that may provide a home row of keys for each triphalangeal finger 46, 48 of each hand 42, 44 (FIG. 3A), so a typist's procedural memory for typing a vocabulary of phrases, words, and letters may be used to type the vocabulary of phrases, words, and letters. Thus, this typing apparatus may allow a typist to rapidly enter data and text using a reduced-width keyboard, which may, for example, be employed to allow input by a user into a portable or smaller-size electronic device. Other embodiments are also possible. Concepts which allow such other embodiments to be determined are now introduced. The key layouts of the additional embodiments may also beneficially aid a typist in rapid text and data entry of a vocabulary of words and phrases on a reduced keyboard.

Figure 7A:
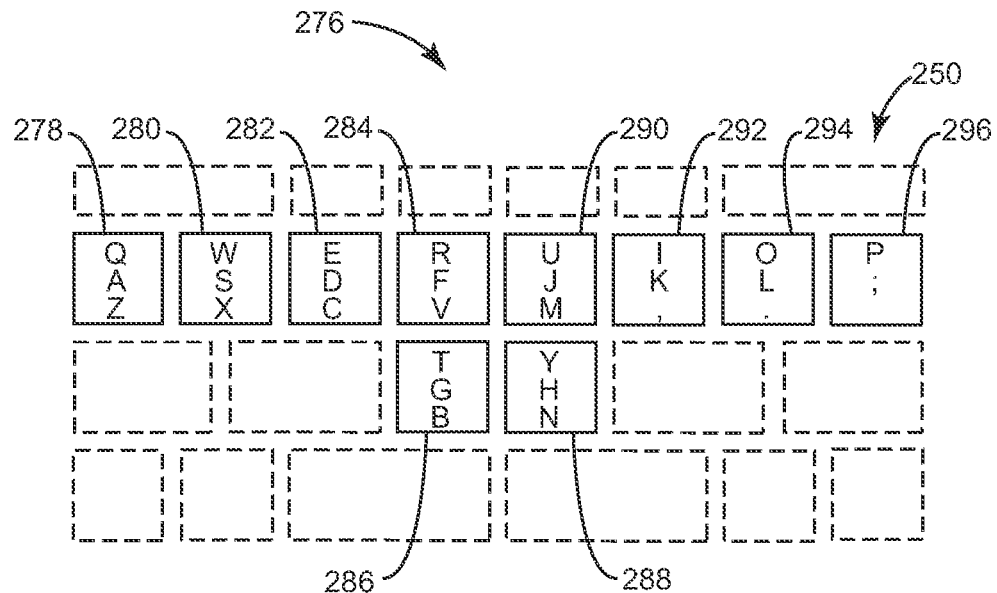
FIG. 7A is a logical diagram of an exemplary key layout in FIG. 6.
Figure 7B:
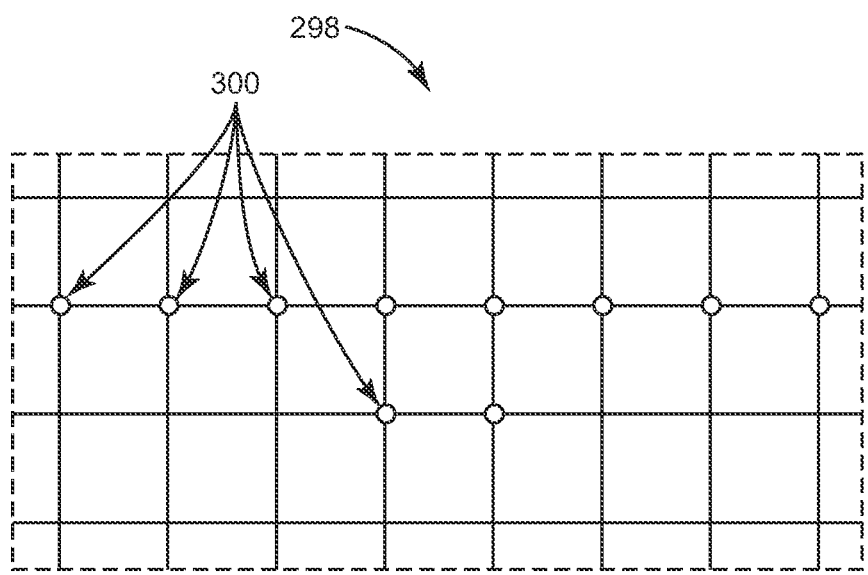
FIG. 7B is a schematic diagram which logically depicts a grid layout of keys in the exemplary key layout of FIG. 7A.

Referring now to FIGS. 7A and 7B, FIG. 7A depicts an exemplary diagram of a logical key arrangement 276 corresponding to the exemplary key layout 250 in FIG. 6. FIG. 7B logically depicts a grid layout 298 of keys corresponding to the exemplary key layout 250 in FIG. 6. Each circled lattice point 300 on the grid layout 298 denotes a centerpoint of a key 278, 280, 282, 284, 286, 288, 290, 292, 294, 296 of FIG. 7A.

Figure 8A:
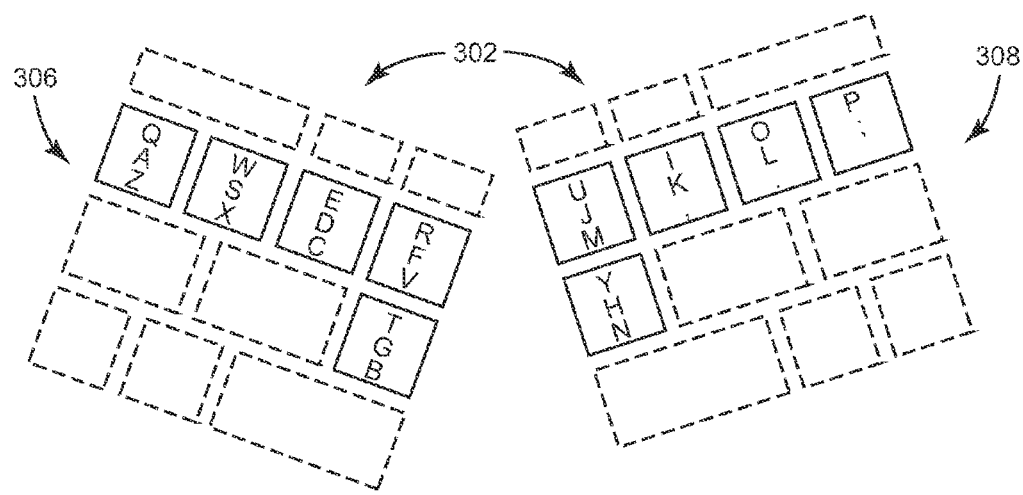
FIG. 8A is a logical diagram of split left-hand and right-hand portions of an exemplary keyboard containing overloaded keys.
Figure 8B:
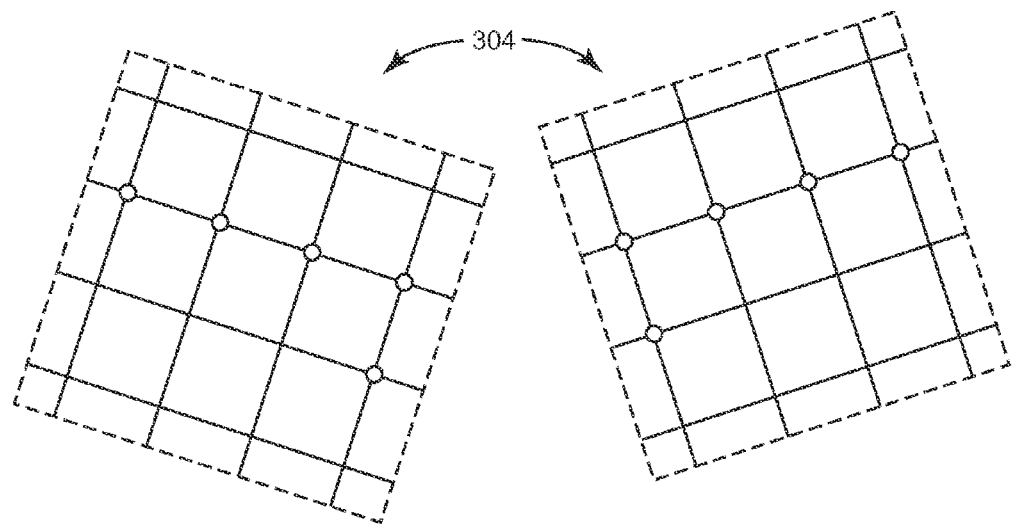
FIG. 8B is a schematic diagram which logically depicts a left-hand grid layout and a right-hand grid layout for keys of the exemplary keyboard of FIG. 8A.

Referring now also to FIGS. 8A and 8B, a variation upon a given key layout may be realized by mapping the key layout to an alternative grid layout. For example, FIG. 8B depicts alternative grid layouts 304 for a left hand and right hand corresponding to the left-hand and right-hand portions of the key layout of FIG. 7A which are split. Mapping the keys 278, 280, 282, 284, 286, 288, 290, 292, 294, 296 of FIG. 7A to the exemplary grid layouts 304 of FIG. 8B results in exemplary key layouts 302 as depicted in FIG. 8A.

As shown by the exemplary grid layouts 298, 304 of FIGS. 7B and 8B, an exemplary grid layout of keys may be split and rotated. Grid arrangements may also be non-orthogonal, for example, or skewed. Furthermore, the rows of a grid layout may be non-linear (i.e., not straight lines). For example, rows may be curved. Furthermore, adjacent rows may or may not run parallel to one another. Similarly, columns may be non-linear (i.e., not straight lines). For example, columns may be curved. Furthermore, adjacent columns may or may not run parallel to one another. In this regard, returning to FIG. 4, FIG. 4 depicts a grid layout 132 with non-linear rows 134 and non-linear columns 136. In FIG. 4, $KEY_{11}$, $KEY_{12}$, and $KEY_{13}$ are located in a first non-linear row 134; $KEY_{21}$, $KEY_{22}$, and $KEY_{23}$ are located in a second non-linear row 134; and $KEY_{31}$, $KEY_{32}$, and $KEY_{33}$ are located in a third non-linear row 134. In FIG. 4, $KEY_{11}$, $KEY_{21}$, and $KEY_{31}$ are located in a first non-linear column 136; $KEY_{12}$, $KEY_{22}$, and $KEY_{32}$ are located in a second non-linear column 136; and $KEY_{13}$, $KEY_{23}$, and $KEY_{33}$ are located in a third non-linear column 136.

Accordingly, various other embodiments of providing reduced-width key layouts that maintain a typist's ability to rapidly enter text and data have been and are further provided below. These key layouts may beneficially aid a typist in rapid text and data entry of a vocabulary of words and phrases on a reduced keyboard.

Figure 9A:
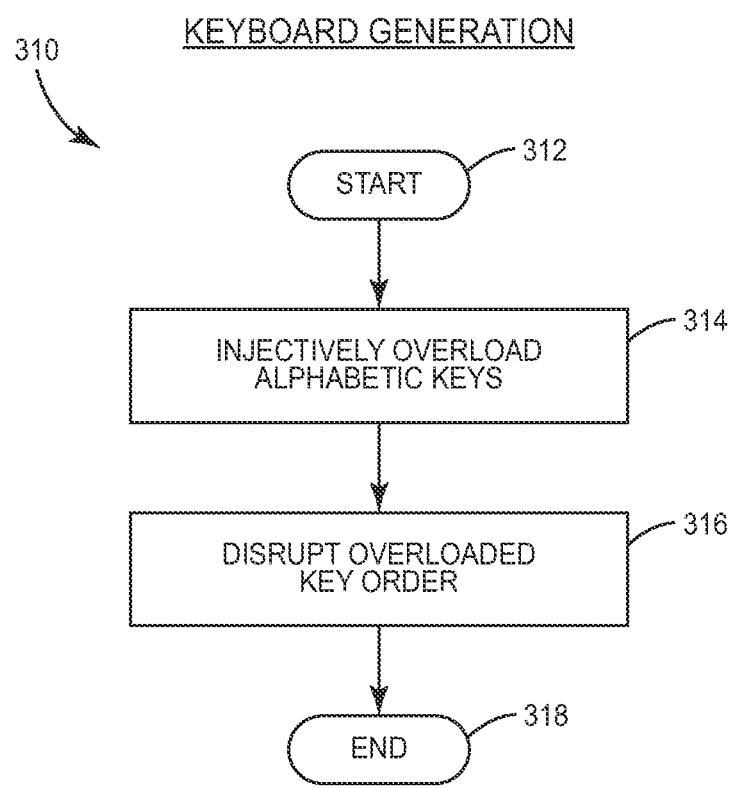
FIG. 9A is a flowchart depicting an exemplary method of generating overloaded key layouts for an overloaded keyboard.

FIG. 9A provides a method 310 of generating an overloaded keyboard. The process starts (step 312), and, given a represented keyboard, injectively overloads alphabetic keys of the keyboard (step 314). Then, the overloaded key order is disrupted (step 316). The process then ends (step 318). The method 310 may provide a reduced-size, overloaded keyboard which conforms to portions of a user's previously learned typing procedures. Accordingly, the method 310 may provide an overloaded keyboard which allows a typist to rapidly enter data and text.

Figure 9B:
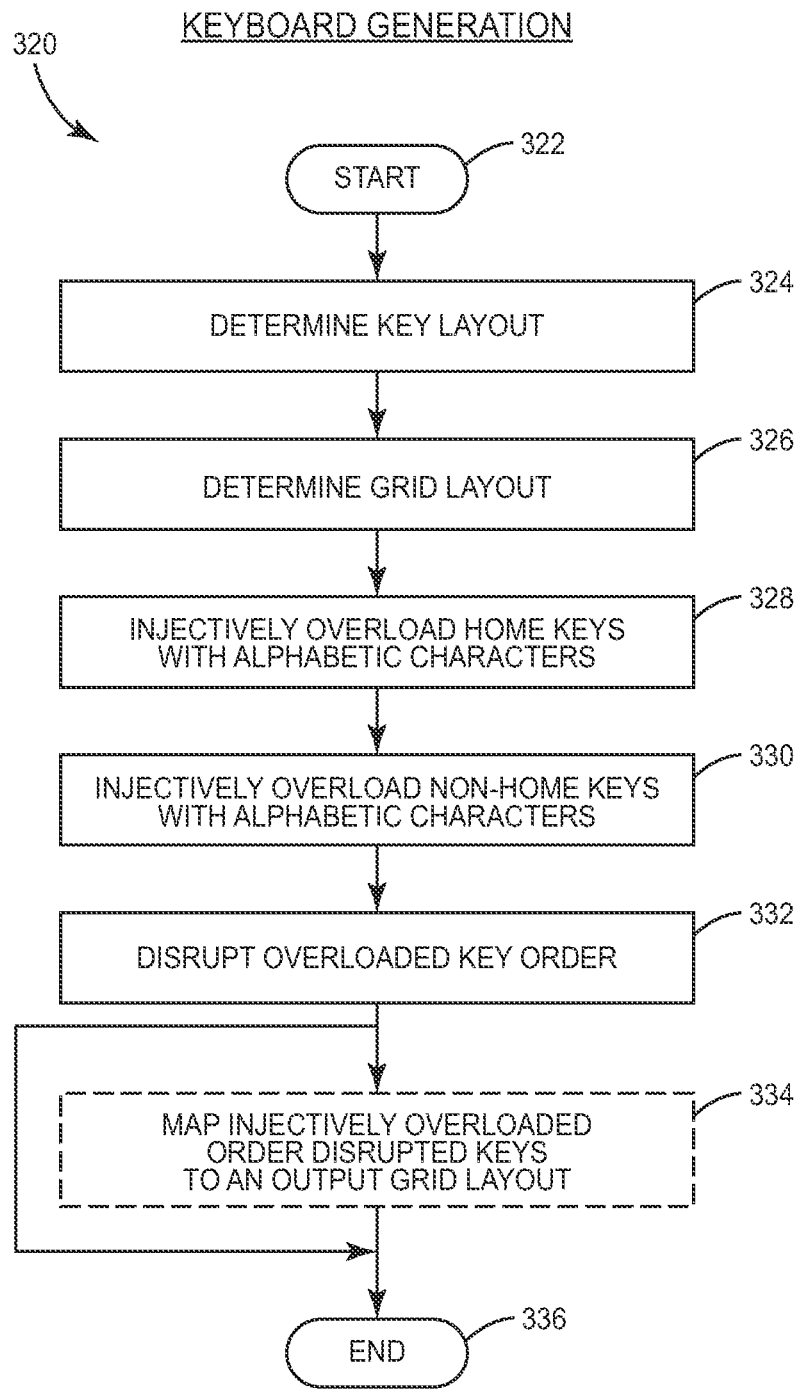
FIG. 9B is a flowchart depicting an alternate exemplary method of generating overloaded key layouts for an overloaded keyboard.

FIG. 9B provides another method 320 of generating an overloaded keyboard. The process starts (step 322), and, given a represented keyboard, determines a key layout corresponding to the represented keyboard (step 324). Next, a grid layout corresponding to the key layout is determined (step 326). Then, home keys are injectively overloaded with alphabetic characters (e.g., for an English language keyboard, characters "A" through "Z") for each triphalangeal finger (step 328). Next, non-home keys are injectively overloaded with alphabetic characters (step 330). Then, the order of the overloaded keys is disrupted (step 332). For example, non-home overloaded alphabetic keys can be located outside of the home row. Optionally, the injectively overloaded, order-disruptive keys can be mapped to an output grid layout (step 334). Finally, the process ends (step 336). The method 320 may provide a reduced-size, overloaded keyboard which conforms to portions of a user's previously learned typing procedures. Accordingly, the method 320 may provide an overloaded keyboard which allows a typist to rapidly enter data and text.

Figure 10A:
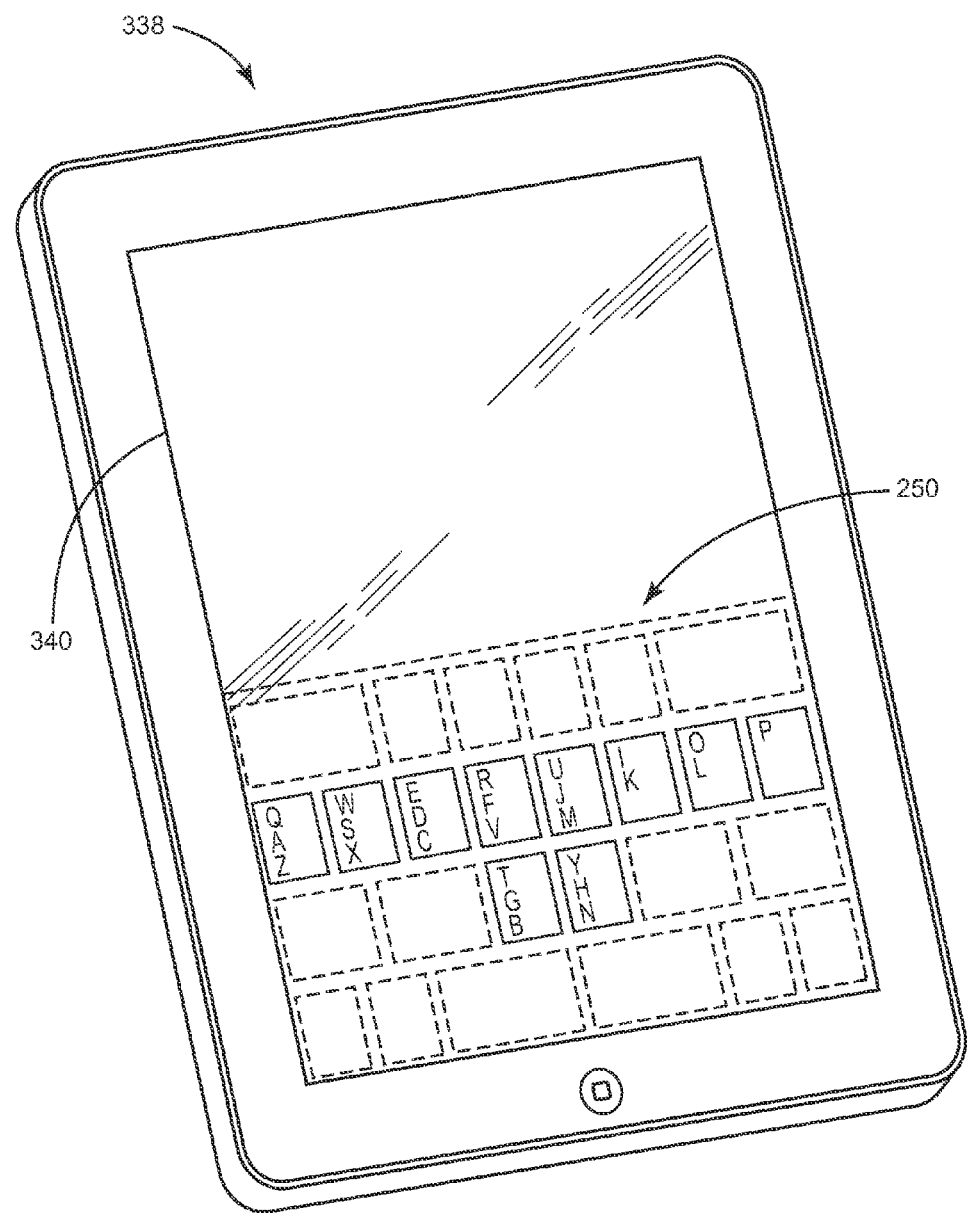
FIG. 10A is a schematic diagram of the exemplary key layout in FIG. 6 displayed on an electronic touch-screen device in a portrait orientation.
Figure 10B:
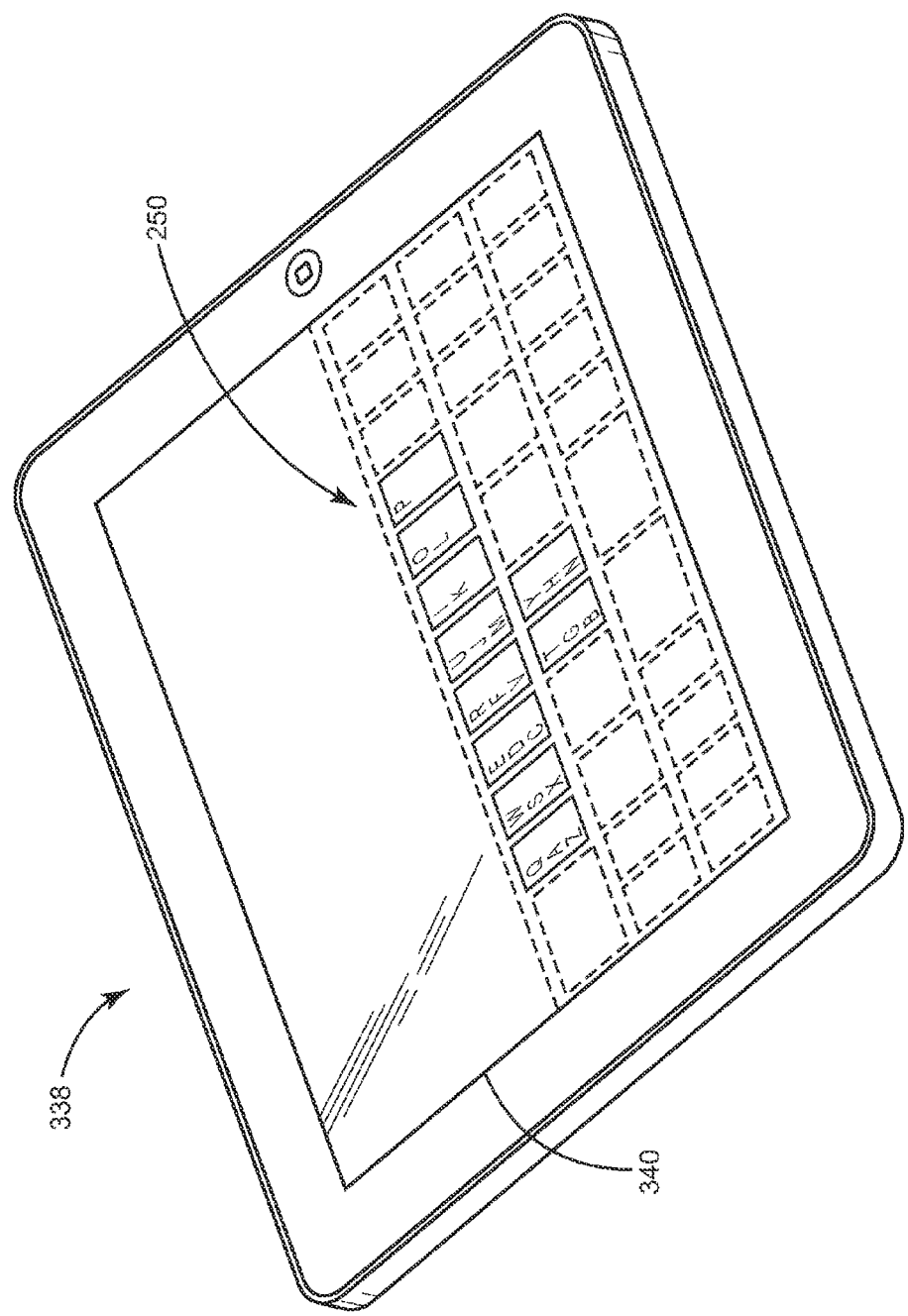
FIG. 10B is a schematic diagram of the exemplary key layout in FIG. 6 displayed on an electronic touch-screen device in a landscape orientation.

The key layouts described herein may be provided in a wide variety of devices and systems. Various non-limiting examples of such devices are provided. Referring now to FIGS. 10A and 10B, FIG. 10A illustrates the exemplary key layout 250 in FIG. 6 displayed in a keyboard in a portrait orientation on an exemplary screen or display 340 of an exemplary electronic touch-screen device 338. The exemplary key layout 250 may be similarly provided on a touchpad or other touch-sensitive surface. The exemplary screen or display 340 may be configured to render characters corresponding to interpreted overloaded-key keystrokes. FIG. 10B illustrates the exemplary key layout 250 in FIG. 6 displayed in a landscape orientation on the exemplary screen or display 340 of the exemplary electronic touch-screen device 338. The exemplary key layout 250 may be similarly provided on a touch-pad or other touch-sensitive surface. As illustrated in FIG. 10B, the additional device area could be used for additional input. For example, as illustrated in FIG. 10B, due to a reduced footprint of the reduced-width key layout 250, there is available space to provide a numeric keypad on the screen or display 340 of the electronic touch-screen device 338.

Figure 11A:
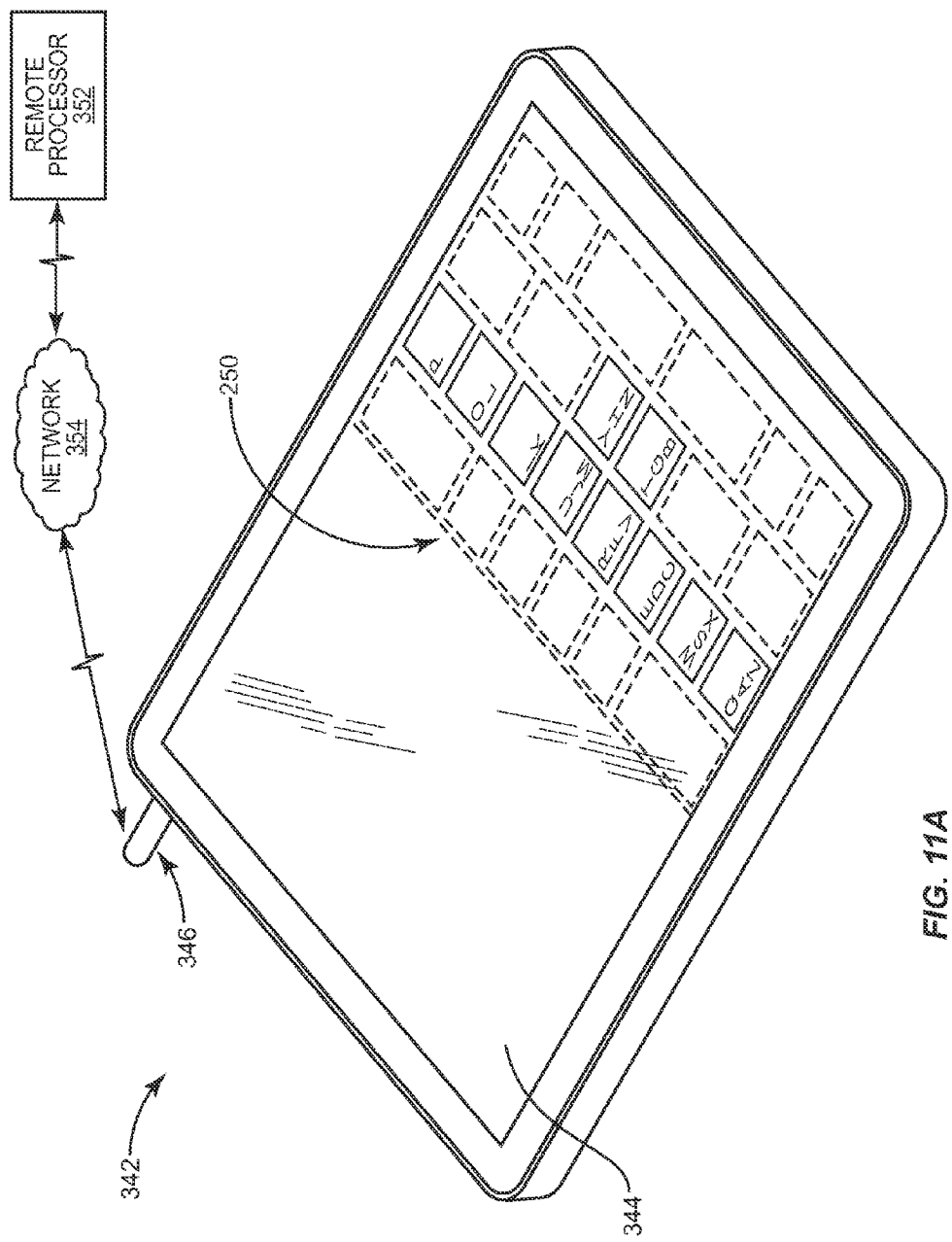
FIG. 11A is a schematic diagram of the exemplary key layout in FIG. 6 displayed on a screen of an exemplary wireless mobile device.
Figure 11B:
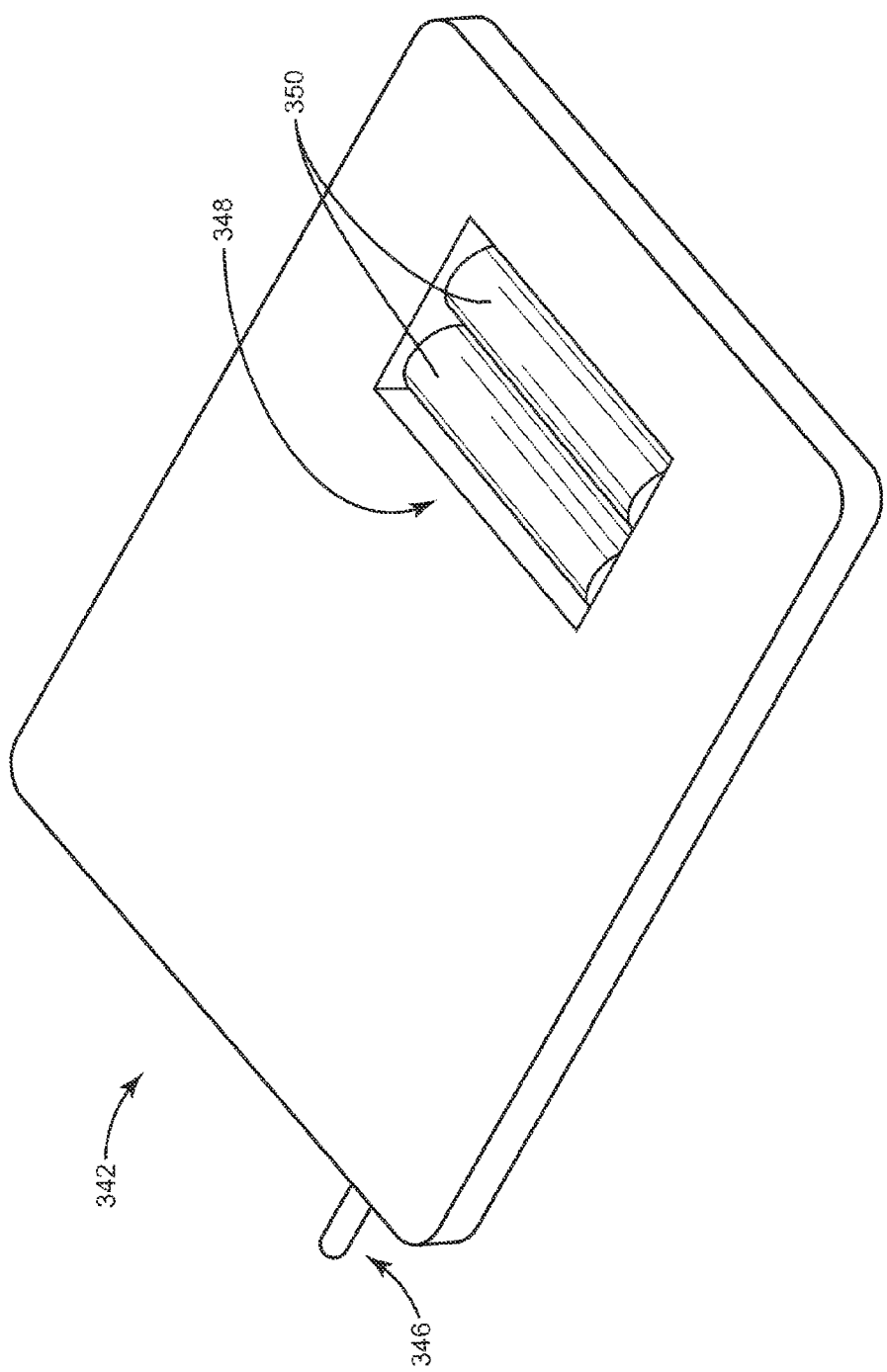
FIG. 11B is a schematic diagram illustrating a back view of the exemplary wireless mobile device of FIG. 11A.

FIG. 11A illustrates the exemplary key layout 250 in FIG. 6 disposed upon a screen 344 of an exemplary wireless mobile device 342. The exemplary wireless mobile device 342 may include a wireless communication interface 346, such as a cellular communication interface (for example, a code division multiple access (CDMA) communication interface or a Global System for Mobile Communications (GSM) communication interface), a broadband wireless communication interface (for example, a 3G or 4G wireless communication interface), a WiMax communication interface, or a wide-area or metropolitan area wireless communication interface. The wireless communication interface 346 may include an 802.11 communication interface (such as an 802.11a, b, g, or n communication interface). The wireless communication interface 346 may include a Bluetooth communication interface. As shown in FIG. 11B, the exemplary wireless mobile device 342 may include a mobile power source 348, such as a battery 350. The mobile power source 348 of the exemplary wireless mobile device 342 may be configurable to energize the wireless communication interface 346. Furthermore, as shown in FIG. 11A, the wireless communication interface 346 may be configured to communicate an overloaded key selection for interpretation and display by a remote processor 352 over a network 354.

With continuing reference to FIG. 11A, the exemplary key layout 250 of overloaded keys may be disposed upon a reduced area of the wireless mobile device 342, which is consistent with thumb-typing. As non-limiting examples, the reduced area consistent with thumb-typing may be an area of approximately 14 cm×4 cm, for a small mobile device, or 50 cm×15.2 cm for a larger mobile device. The reduced area may include two or more rows, or smaller or larger areas if more than two or more rows are included that allow for thumb typing. A user typing on the reduced-area, overloaded keyboard may use a single finger of one or both hands to press the keys. For example, a user may use both thumbs 31, 36 of both hands 42, 44 (FIG. 3A) to type on the exemplary reduced-area, overloaded keyboard. Alternatively, a user may use both index fingers 32, 37 of both hands 42, 44 (FIG. 3A) to type on the exemplary reduced-area, overloaded keyboard. Furthermore, a user may use a single thumb 31 or 36 to type on the exemplary reduced-area, overloaded keyboard. Alternatively, a user may use a single index finger 32 or 37 to type on the exemplary reduced-area, overloaded keyboard.

Figure 12C:
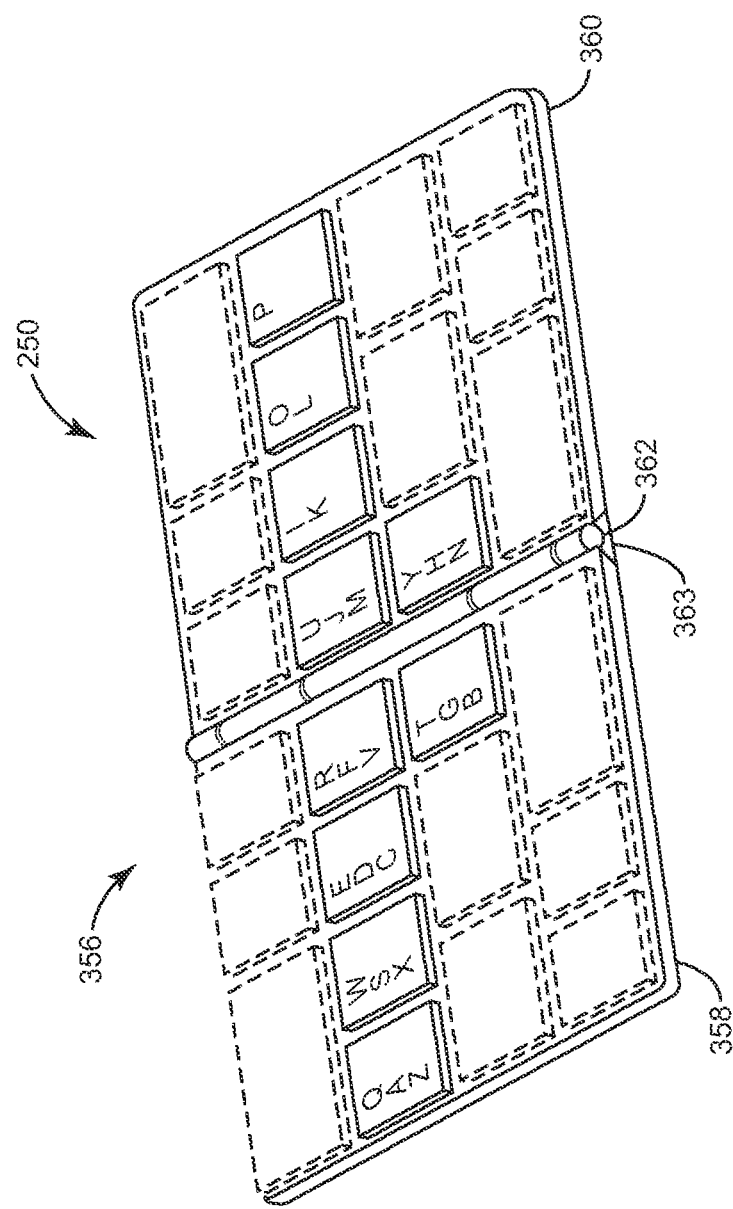

FIGS. 12A, 12B, and 12C illustrate a series of schematic diagrams of the exemplary key layout 250 of FIG. 6 disposed upon an exemplary physical keyboard 356 having foldable sections 358, 360. The foldable sections 358, 360 may be joined, for example, by a hinge 362. The foldable, overloaded keyboard 356 may be unfolded, for example, through a progression from FIG. 12A to 12B to 12C. Alternatively, the foldable, overloaded keyboard 356 may be folded, for example, through a progression from FIG. 12C to 12B to 12A. The foldable keyboard 356 may include a stop 363 or other mechanism that prevents the keyboard from extending farther than is depicted in FIG. 12C. Alternatively, the foldable keyboard 356 may be unfolded to an even greater angle than depicted in FIGS. 12A through 12C. For example, the foldable keyboard 356 may be unfolded to an extent that back portions of the foldable sections 358, 360 face one another.

FIGS. 12A through 12C depict the exemplary physical keyboard 356 having two sections. However, the exemplary key layout 250 of FIG. 6 may also be disposed upon a foldable physical keyboard having additional sections. Also note that the physical keyboard 356 may include other overloaded key arrangements disclosed herein or other arrangements that are consistent with the teachings provided herein.

FIGS. 13A through 13F are a series of schematic diagrams illustrating an embodiment of a typing apparatus 364 providing a reduced-height, folded configuration. The typing apparatus 364 may include the overloaded key arrangements disclosed herein or other arrangements that are consistent with the teachings provided herein. With reference to FIGS. 13A through 13F, the typing apparatus 364 comprises a first keyboard 366, a second keyboard 368, a primary housing 370, and a secondary housing 372. The first keyboard 366 comprises a first keyboard base 374 and first keyboard keys 376. The second keyboard 368 comprises a second keyboard base 378 and second keyboard keys 380. The secondary housing 372 may be a battery housing. Accordingly, the secondary housing 372 may comprise a battery 382 configured to power the typing apparatus 364. The battery 382 may occupy a portion of the secondary housing 372. Alternatively, the battery 382 may substantially occupy the entirety of the secondary housing 372. The secondary housing 372 may comprise at least one secondary housing foot 384. The first keyboard 366 is hingedly attached to the second keyboard 368, for example, by a hinge 386. The typing apparatus 364 has an opened configuration (FIGS. 13E-13F) and a folded configuration (FIGS. 13A-13B). In the folded configuration (FIGS. 13A-13B), the primary housing 370 functions to house, enclose, and protect the secondary keyboard 368, the secondary housing 372, and their contents. In the opened configuration (FIG. 13E-13F), the primary housing 370 is configured to support a bottom portion of the unfolded first keyboard 366 in its opened position, and the secondary housing 372 is configured to support a bottom portion of the second keyboard 368.

With continuing reference to FIGS. 13A through 13F, the typing apparatus 364 may be opened from a folded configuration (FIGS. 13A and 13B) to an opened configuration (FIGS. 13E and 13F) by pulling the secondary housing 372 away from the primary housing 370 (as illustrated in FIGS. 13C and 13D) and then folding the first keyboard 366 over and onto a recessed portion 388 of the primary housing 370 such that the primary housing 370 supports the first keyboard 366. The typing apparatus 364 may be closed from an opened configuration (FIGS. 13E and 13F) to a folded configuration (FIGS. 13A and 13B) by folding the first keyboard 366 away from the primary housing 370 over the second keyboard 368 so that the first keyboard 366 and the second keyboard 368 are substantially parallel (as illustrated in FIGS. 13C and 13D) and thereafter by pushing the secondary housing 372 into the primary housing 370. The first keyboard keys 376 (FIGS. 13E and 13F) may be recessible keys, configurable to completely recess into the first keyboard base 378. The second keyboard keys 380 may also be recessible keys, configurable to completely recess into the second keyboard base 374. In the folded configuration (FIGS. 13A and 13B), the primary housing 370 may hold the first keyboard base 374 and the second keyboard base 378 together such that the recessible first keyboard keys 376 completely recess within the first keyboard base 374 and the recessible second keyboard keys 380 completely recess within the second keyboard base 378. As depicted in FIG. 13E, the exemplary key layout 250 in FIG. 6 may be disposed upon the typing apparatus 364. For example, a left-hand portion 306 (FIG. 8A) of the exemplary key layout 250 may be disposed on the first keyboard 366 and a right-hand portion 308 (FIG. 8A) of the exemplary key layout 250 may be disposed on the second keyboard 368.

In continuing reference to FIGS. 13A through 13F, in the opened configuration (FIGS. 13E and 13F), the typing apparatus 364 has an opened typing apparatus height 390. In the folded configuration (FIGS. 13A-13B), the typing apparatus 364 has a folded typing apparatus height 392. The first keyboard 366 has a first keyboard height 394. The first keyboard base 374 has a first keyboard base height 396. The first keyboard keys 376 have a first keyboard keys height 398. The second keyboard 368 has a second keyboard height 400. The second keyboard base 378 has a second keyboard base height 402. The second keyboard keys 380 have a second keyboard keys height 404. The primary housing 370 has a primary housing height 406. The secondary housing 372 has a secondary housing height 408. The primary housing height 406 may equal or substantially equal the second keyboard base height 402 plus the secondary housing height 408. Thus, the first keyboard 366 and second keyboard 368 may be balanced in height so that the opened typing apparatus 364 (FIGS. 13E and 13F) provides a uniform typing plane for typing, which may not wobble. Accordingly, the opened typing apparatus height 390 may equal or substantially equal the secondary housing height 408 plus the secondary keyboard base height 402 plus the secondary keyboard keys height 404, which may also equal or substantially equal the primary housing height 406 plus the first keyboard keys height 398. In the folded configuration (FIGS. 13A and 13B), the folded typing apparatus height 392 may equal or substantially equal the primary housing height 406 plus the first keyboard base height 396, thus providing a reduced-height, folded-configuration typing apparatus.

Figure 14:
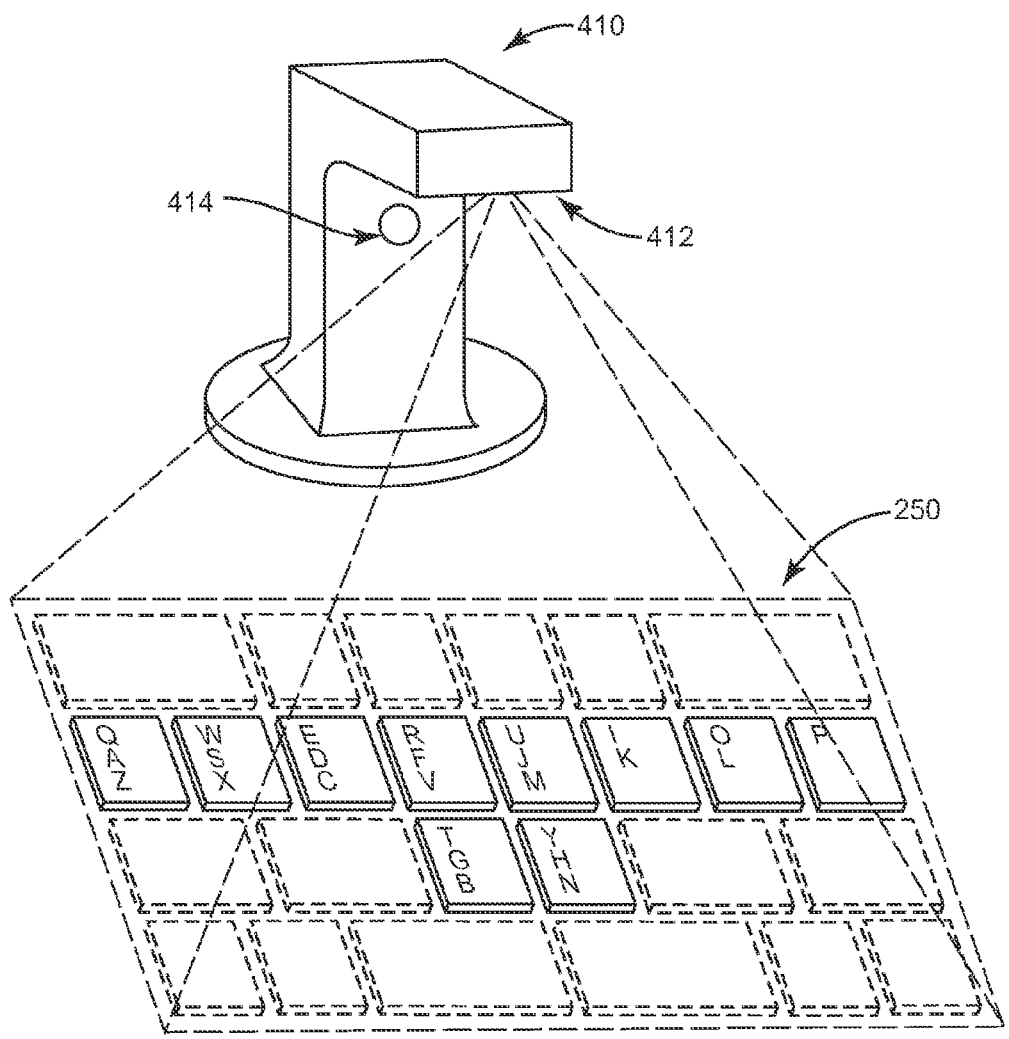
FIG. 14 is a schematic diagram of the exemplary key layout in FIG. 6 projected by an exemplary projection device.

FIG. 14 depicts an exemplary diagram of the exemplary key layout 250 in FIG. 6 projected by an exemplary projection device 410. The exemplary projection device 410 projects an image of a key layout, for example, the exemplary key layout 250 in FIG. 6, from a projector 412 onto a surface. A user may place her fingers on the keys of the projected keyboard. A camera 414 of the exemplary projection device 410 detects a user's interaction with the keyboard. The camera 414 may capture one or more images, for example, showing one or more fingers of a user in the keyboard field. The exemplary projection device 410 may determine from the one or more images that a user has pressed an overloaded key.

Figure 15:
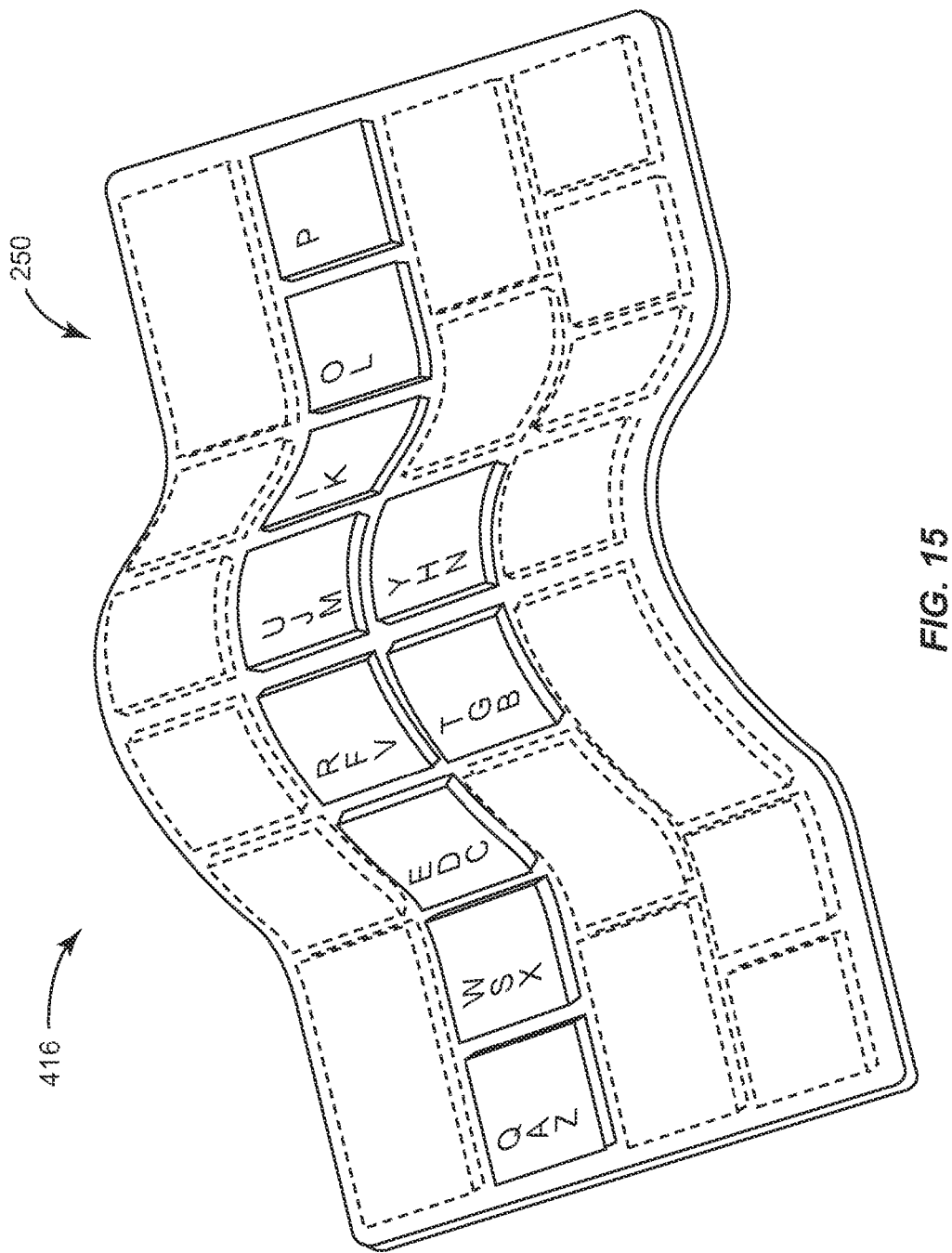
FIG. 15 is a schematic diagram of the exemplary key layout in FIG. 6 disposed upon an exemplary physical keyboard having a flexible membrane.

FIG. 15 depicts a diagram of the exemplary key layout 250 of FIG. 6 disposed upon an exemplary physical keyboard 416 having a flexible membrane. The flexible keyboard 416 may be bent, folded, flexed, rolled, convolved, or otherwise contorted, and may be operable by a user while bent, folded, flexed, rolled, convolved, or otherwise contorted. For example, the flexible keyboard 416 may be operable while contoured to a non-flat surface. Furthermore, the flexible keyboard 416 may be operable while contoured to a flat surface. The flexible keyboard 416 may also be bent, folded, flexed, rolled, convolved, or otherwise contorted for storage.

Figure 16:
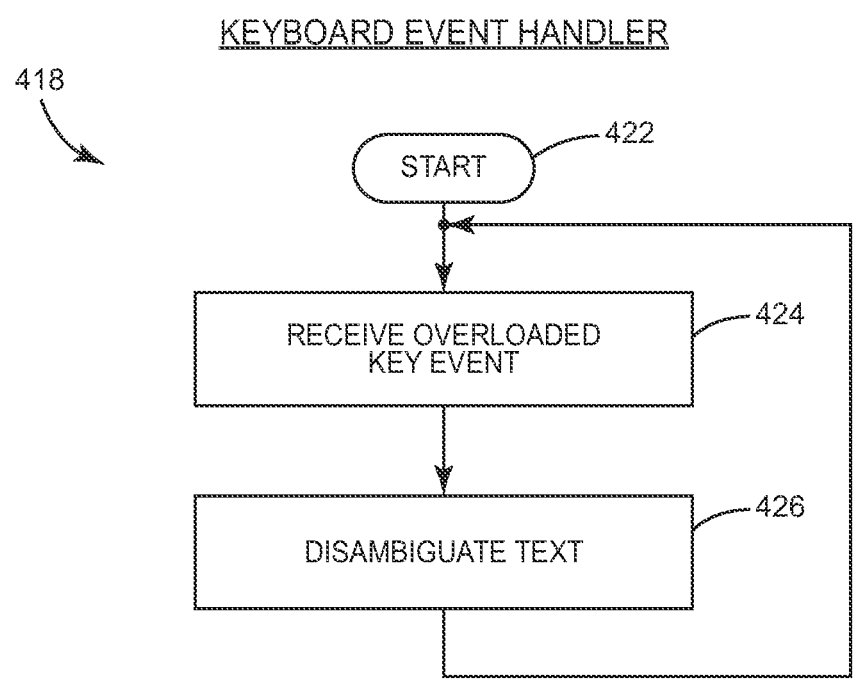
FIG. 16 is a flowchart depicting an exemplary method of handling keyboard events from key actions on a keyboard containing overloaded keys.

FIG. 16 is a flowchart depicting an exemplary process 418 of handling keyboard events (also referred to herein as a keyboard event handler 418) generated as a result of key actions on a keyboard containing overloaded keys. For example, the process 418 starts by pressing or releasing an overloaded key, which may result in a keyboard device interrupt comprising a scan code being generated, as an example (step 422). The scan code corresponds to an overloaded key that was pressed or released. The keyboard device interrupt may be signaled on a system bus 420 (FIG. 38) and received by the keyboard event handler 418.

In continuing reference to FIG. 16, the keyboard event handler 418 may receive an interrupt comprising the scan code indicating which overloaded key was pressed (step 424). The keyboard event handler 418 may execute keypress disambiguating instructions 434 (FIG. 17A) (step 426) to determine which character corresponding to the overloaded keypress was intended. The keypress disambiguating instructions 434 (FIG. 17A) may determine which corresponding character was intended, for example, based on one or more of the following: dictionary matching, beginning-of-word matching, phrase frequencies, word frequencies, character frequencies, grammar rules, error-correction algorithms, pattern-matching algorithms, and/or pattern-approximation algorithms. Upon selecting a disambiguated character corresponding to the overloaded keypress event, the disambiguated character is further processed as would a keypress event of a non-overloaded character. The keypress disambiguating instructions 434 may also present a user with a plurality of alternatives corresponding to the overloaded keypress event, from which the user may select one of the alternatives. These alternatives may comprise alternative letters, alternative words, and/or alternative phrases corresponding to the overloaded keypress event or corresponding to a buffered series of keypresses comprising the overloaded keypress event. Accordingly, the keypress disambiguating instructions 434 may provide disambiguated text, for example, a character, a word, or a series of words, to an application for display. This text could be provided for any application 438 (FIG. 17A) running on an electronic device, for example, to an email client, a texting application, a word processor, or a spreadsheet.

Figure 17A:
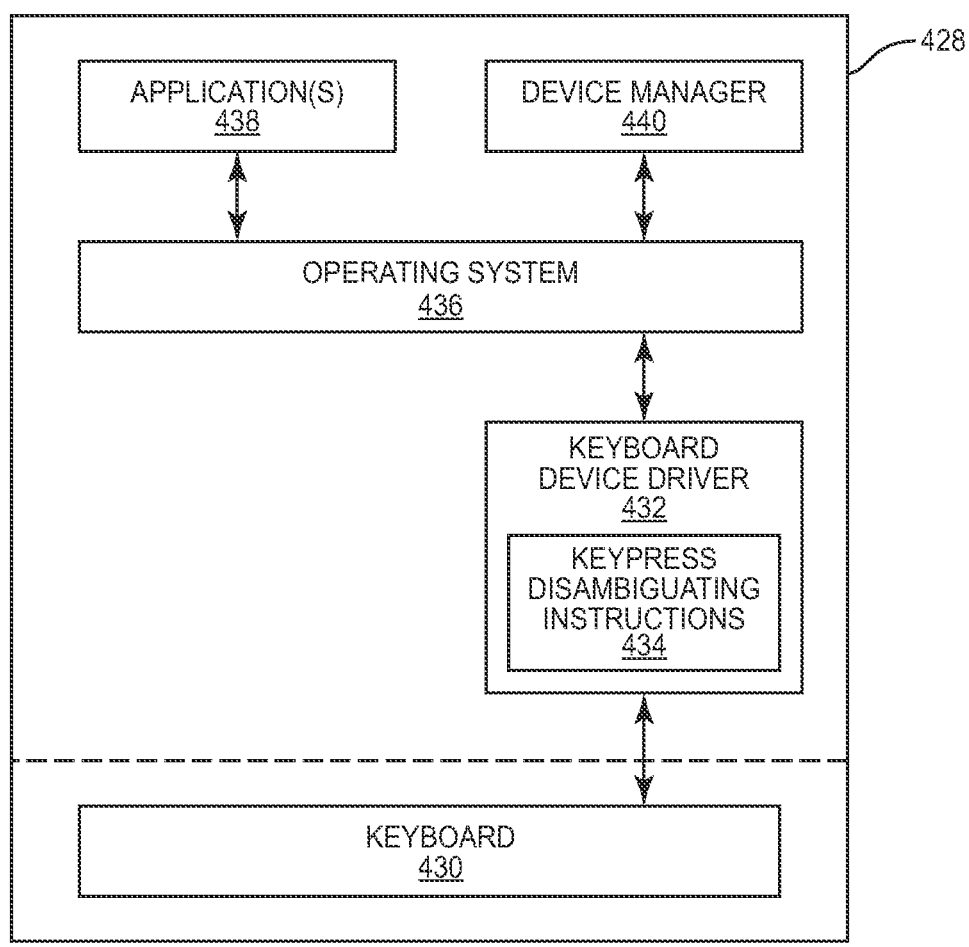
FIG. 17A is a block diagram of exemplary software components that include an exemplary keyboard device driver providing keypress disambiguating instructions.

The overloaded keyboard event handler 418 may be provided in a software component of an electronic device 428 (FIG. 17A). For example, as depicted in FIG. 17A, the overloaded keyboard event handler 418 may be provided as part of an overloaded keyboard device driver 432. Upon receiving an overloaded key event (such as an overloaded keypress or overloaded key release) from a keyboard 430, keypress disambiguating instructions 434 of the keyboard device driver 432 may be executed to disambiguate which character corresponding to the overloaded key event was intended. The keyboard device driver 432 may thereafter provide the disambiguated character to an operating system 436. The operating system 436 may provide the disambiguated character to one or more applications 438 which are configured to receive keyboard input. In this manner, the electronic device 428 may provide input from an overloaded keyboard to one or more applications 438 configured to receive non-overloaded key input without requiring any modifications to the source code of the one or more applications 438 to receive the overloaded key input.

Figure 17B:
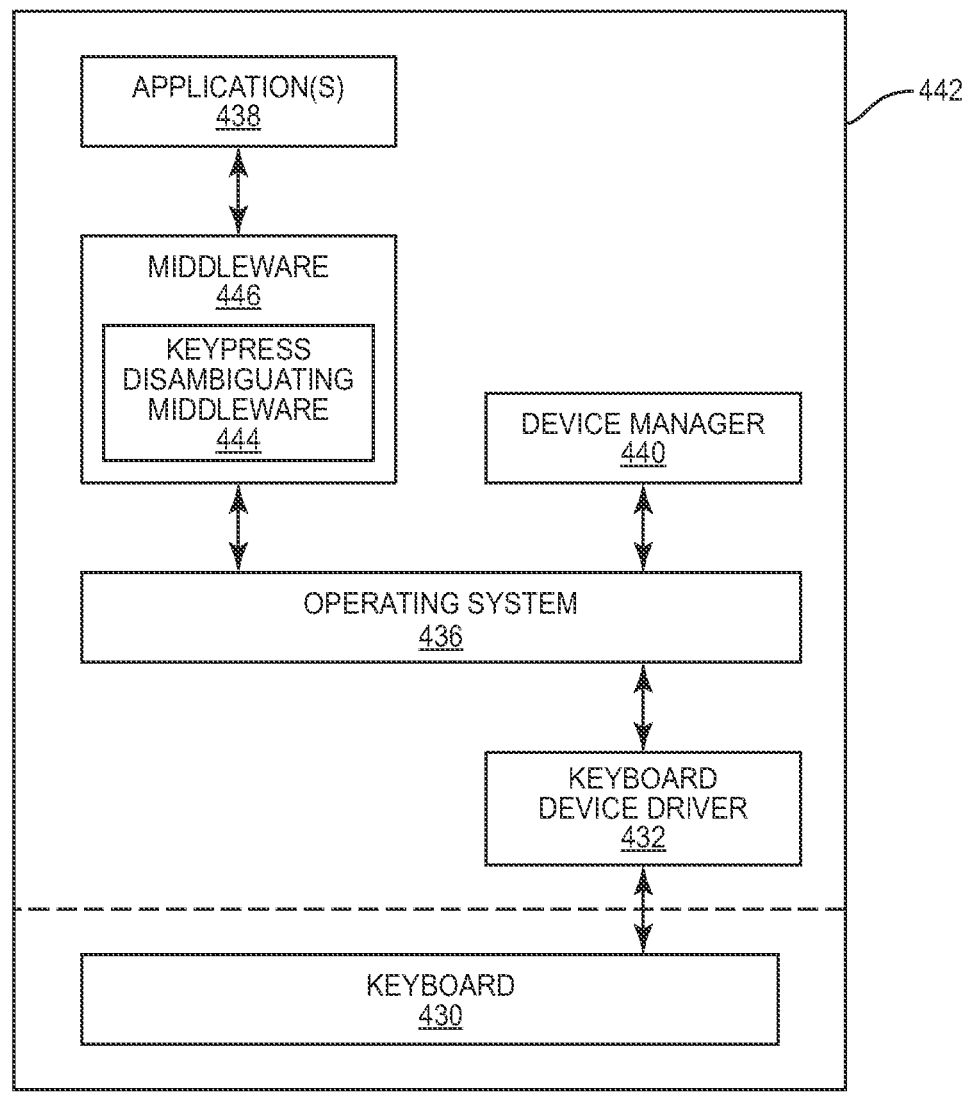
FIG. 17B is a block diagram of software components that provide keypress disambiguating instructions in middleware.

Alternatively, as illustrated in FIG. 17B, the overloaded keyboard event handler 418 may be provided in middleware 446 of an electronic device 442. In this configuration, upon receiving an overloaded key event from the keyboard 430, the keyboard device driver 432 may provide the overloaded key event to the operating system 436. The operating system 436 may provide the overloaded key event to the middleware 446 which is configured to receive keyboard input. Upon receiving an overloaded key event (such as an overloaded keypress or overloaded key release) from the operating system 436, keypress disambiguating middleware 444 of the middleware 446 may be executed to disambiguate which character corresponding to the overloaded key event was intended. The middleware 446 may thereafter provide the disambiguated character to one or more applications 438 which are configured to receive keyboard input.

The overloaded keyboard event handler 418 could also be provided as a part of a particular application 438. An overloaded key event aware application 438 could provide supplemental functionality to a user, for example, by prompting a user to select among a plurality of possible overloaded key character, key word, or key phrase selections upon receiving an overloaded key event. The plurality of possible overloaded key character selections may be provided based on dictionary matching, beginning-of-word matching, character frequencies, word frequencies, phrase frequencies, grammar rules, error-correction algorithms, pattern-matching algorithms, and/or pattern-approximation algorithms. The dictionary-based matching and other overloaded keyboard configuration features and options may be manageable. For example, a device manager 440 or application 438 may allow a user to customize such overloaded keyboard configuration features and options.

Furthermore, portions of the overloaded keyboard event handler 418 could be provided collectively as multiple components. For example, portions of the overloaded keyboard event handler 418 could be provided in the keyboard device driver 432 and further portions of the overloaded keyboard event handler 418 could be provided in the middleware 446 and/or the one or more applications 438.

Figure 18A:
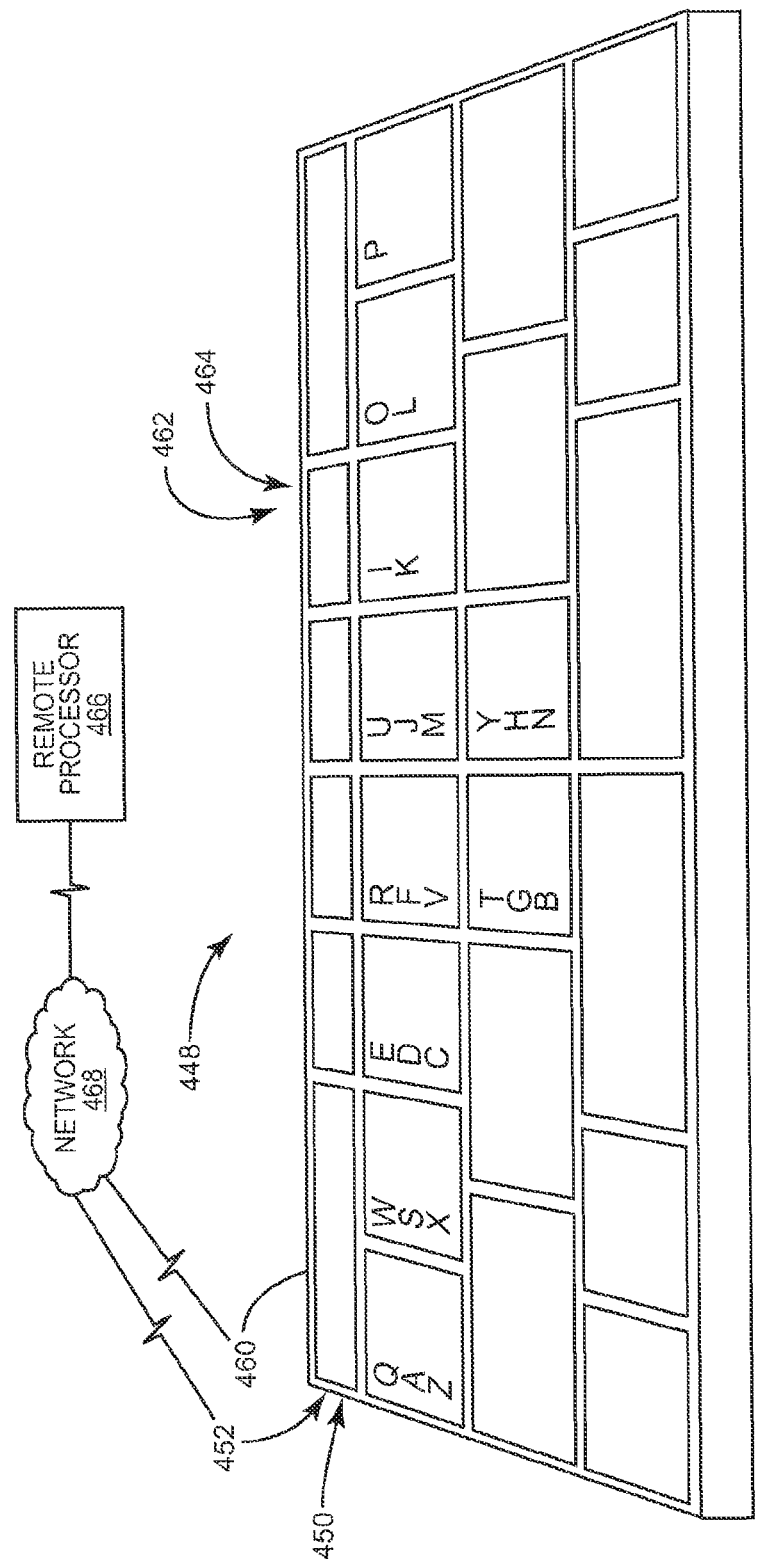
FIG. 18A is a schematic diagram of an embodiment of another exemplary physical keyboard containing overloaded keys.
Figure 18B:
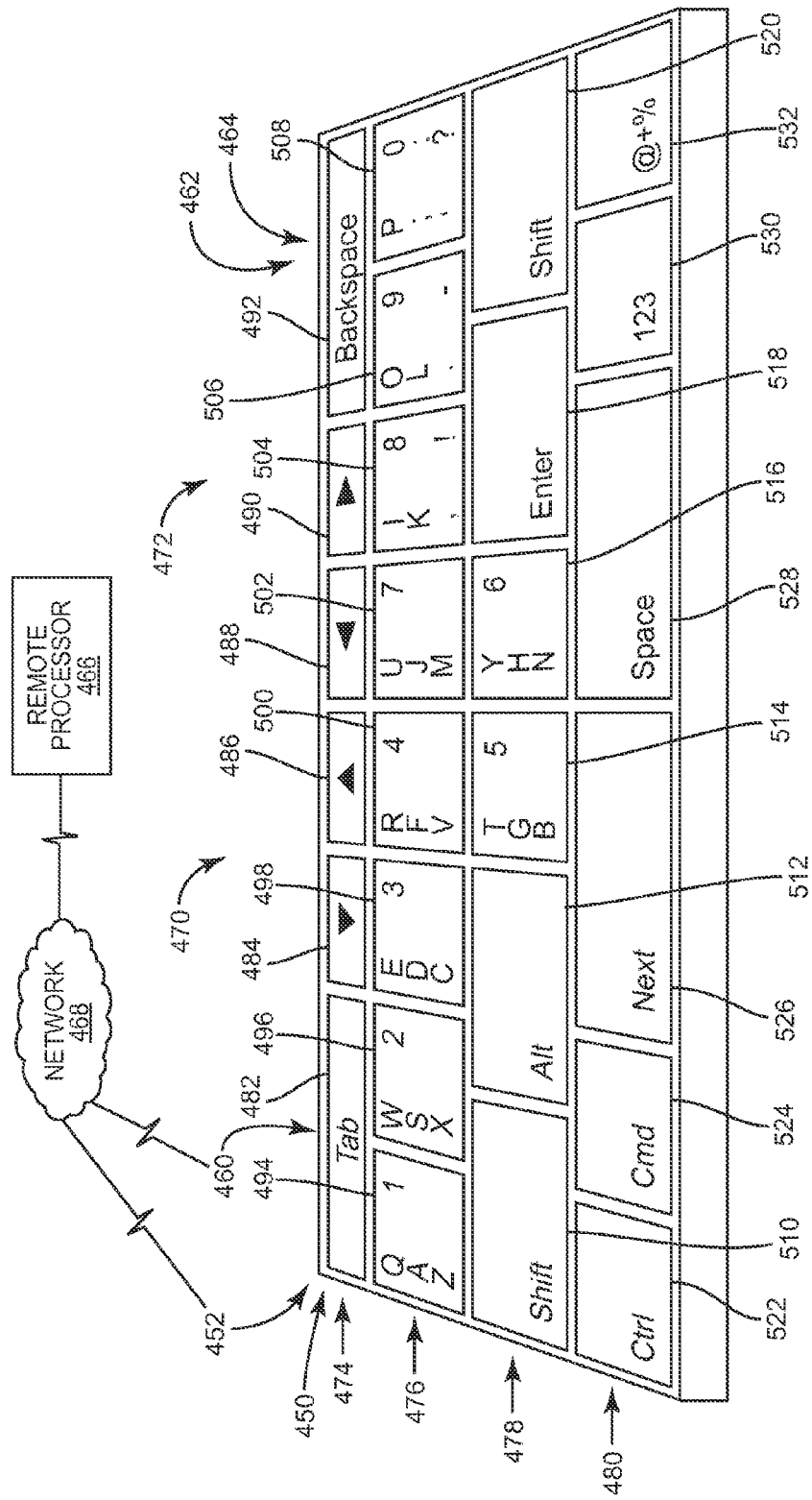
FIG. 18B is a schematic diagram of another embodiment of another exemplary physical keyboard containing overloaded keys.
Figure 18F:
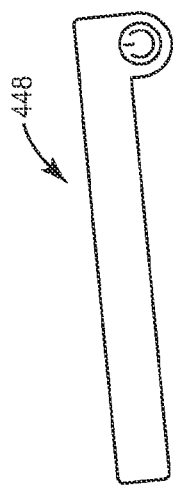
FIG. 18F is a schematic diagram depicting a right side view of the exemplary physical keyboards of FIGS. 18A and 18B with a power button.
Figure 18C:
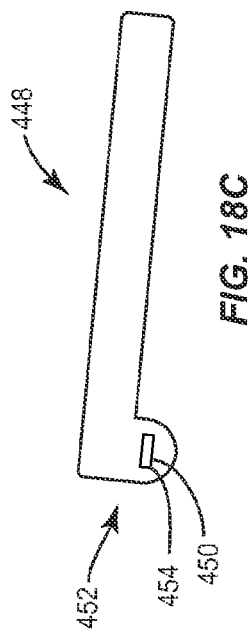
FIG. 18C is a schematic diagram depicting a left side view of the exemplary physical keyboards of FIGS. 18A and 18B incorporating a universal serial bus (USB) connector configured to provide external power to the exemplary physical keyboard.
Figure 18D:
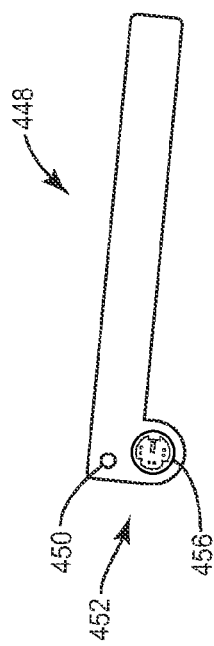
FIG. 18D is a schematic diagram depicting a left side view of the exemplary physical keyboards of FIGS. 18A and 18B incorporating a PS/2 connector.
Figure 18E:
FIG. 18E is a schematic diagram depicting a left side view of the exemplary physical keyboards of FIGS. 18A and 18B incorporating a 9-pin D-type serial connector.

FIG. 18A is a schematic diagram of an embodiment of an exemplary physical keyboard 448 containing overloaded keys. FIG. 18A provides an overloaded key layout corresponding to the key layout 250 of FIG. 6. FIG. 18B is a schematic diagram of another embodiment of an exemplary physical keyboard 470 containing overloaded keys. FIG. 18B also provides an overloaded key layout 472 corresponding to the key layout 250 of FIG. 6. FIG. 18B also provides for additional characters. The keys of FIG. 18B are arranged as follows. A first non-home row 474 may provide a Tab key 482, a down-arrow key 484, an up-arrow key 486, a left-arrow key 488, a right-arrow key 490, and a Backspace key 492. A home row 476 includes a plurality of overloaded keys. The home row 476 provides a first overloaded key 494 overloading "Q", "A", and "Z" characters. The first overloaded key 494 may also provide a "1" character which may be selected when a numeric modifier key 530 is concurrently pressed with the first overloaded key 494. The home row 476 further provides a second overloaded key 496 overloading "W", "S", and "X" characters. The second overloaded key 496 also provides a "2" character which may be selected when the numeric modifier key 530 is concurrently pressed with the second overloaded key 496. The home row 476 further provides a third overloaded key 498 overloading "E", "D", and "C" characters. The third overloaded key 498 also provides a "3" character which may be selected when the numeric modifier key 530 is concurrently pressed with the third overloaded key 498. The home row 476 further provides a fourth overloaded key 500 overloading "R", "F", and "V" characters. The fourth overloaded key 500 also provides a "4" character which may be selected when the numeric modifier key 530 is concurrently pressed with the fourth overloaded key 500. The home row 476 further provides a fifth overloaded key 502 overloading "U", "J", and "M" characters. The fifth overloaded key 502 also provides a "7" character which may be selected when the numeric modifier key 530 is concurrently pressed with the fifth overloaded key 502. The home row 476 further provides a sixth overloaded key 504 overloading "I" and "K" characters. The sixth overloaded key 504 also provides an "8" character which may be selected when the numeric modifier key 530 is concurrently pressed with the sixth overloaded key 504. The sixth overloaded key 504 further provides a comma (,) character and an exclamation point (!) character. By concurrently pressing a symbol modifier key 532, disambiguation among (non-alphabetical and non-numerical) symbols (here, e.g., among a comma (,) character and an exclamation point (!) character) may be provided. The home row 476 further provides a seventh overloaded key 506 overloading "O" and "L" characters. The seventh overloaded key 506 also provides a "9" character which may be selected when the numeric modifier key 530 is concurrently pressed with the seventh overloaded key 506. The seventh overloaded key 506 further provides a period (.) character and a dash (-) character. By concurrently pressing the symbol modifier key 532, disambiguation among (non-alphabetical and non-numerical) symbols (here, e.g., among a period (.) character and a dash (-) character) may be provided. The home row 476 further provides an eighth key 508 providing a "P" character. The eighth key 508 also provides a "0" character which may be selected when the numeric modifier key 530 is concurrently pressed with the eighth key 508. The eighth key 508 further provides semicolon (;), colon (:), single quote ('), and question mark (?) characters. By concurrently pressing the symbol modifier key 532, disambiguation among (non-alphabetical and non-numerical) symbols (here, e.g., among semicolon (;), colon (:), single quote ('), and question mark (?) characters) may be provided. A second non-home row 478 comprises a left Shift key 510 and an Alt key 512. The second non-home row 478 further comprises a ninth overloaded key 514 providing "T", "G", and "B" characters. The ninth overloaded key 514 also provides a "5" character which may be selected when the numeric modifier key 530 is concurrently pressed with the ninth overloaded key 514. The second non-home row 478 further comprises a tenth overloaded key 516 overloading "Y", "H", and "N" characters. The tenth overloaded key 516 also provides a "6" character which may be selected when the numeric modifier key 530 is concurrently pressed with the tenth overloaded key 516. The second non-home row 478 further comprises an Enter key 518 and a right Shift key 520. A third non-home row 480 provides a Ctrl key 522, a Cmd key 524, a Next key 526, a Space key 528, the numeric modifier key 530, and the symbolic modifier key 532.

Referring now to FIGS. 18A through 18H, a typing apparatus, e.g., the keyboard 448, 470, may include a power interface 450 disposed inside the keyboard 448, 470. The typing apparatus may also include a wired communication interface 452 disposed inside the keyboard 448, 470 configured to communicate with a remote processor 466. For example, the wired communication interface 452 may be a universal serial bus (USB) interface 454, a PS/2 interface 456, or a serial interface 458. The power interface 450 may be configurable to energize the wired communication interface 452. The wired communication interface 452 may also comprise the power interface 450. For example, the USB interface 454 may be a power interface 450 and may power the keyboard 448, 470. The typing apparatus may be configured to communicate an overloaded key selection across the wired communication interface 452 for interpretation and display.

With continuing reference to FIGS. 18A through 18H, a typing apparatus, e.g., keyboard 448, 470, may include a wireless communication interface 460 for communicating with the remote processor 466 (FIGS. 18A and 18B) across a network 468. For example, the wireless communication interface 460 may be a cellular communication interface (for example, a CDMA communication interface or a GSM communication interface), a broadband wireless communication interface (for example, a 3G or 4G wireless communication interface), a WiMax communication interface, or a wide-area or metropolitan area wireless communication interface. The wireless communication interface 460 may include an 802.11 communication interface (such as an 802.11a, b, g, or n communication interface). The wireless communication interface 460 may include a Bluetooth communication interface. The typing apparatus may include a mobile power source 462 disposed inside the keyboard 448, 470, such as a battery 464. The mobile power source 462 may be configurable to energize the wireless communication interface 460. The typing apparatus may be configured to communicate an overloaded key selection to the remote processor 466 (FIGS. 18A and 18B) for interpretation and display.

With further reference to FIGS. 18A and 18B, overloaded keys may be provided in a variety of sizes. For example, the size of the keys of the overloaded keyboard may be of a size consistent with keys of a represented keyboard. With full-size keys, the keyboard may be used for touch-typing, that is, typing with all fingers without visual cues (or with few visual cues) from markings on the keys. However, the overloaded keys may also be provided in a reduced size consistent with thumb-typing. The overloaded keys may also be provided in a variety of shapes. For example, the overloaded keys may be provided on rectangular, triangular, or hexagonal-shaped keys. Corners of the keys may or may not be rounded. The shape of the keys of the overloaded keyboard may also be of a shape consistent with keys of a represented keyboard.

Figure 19:
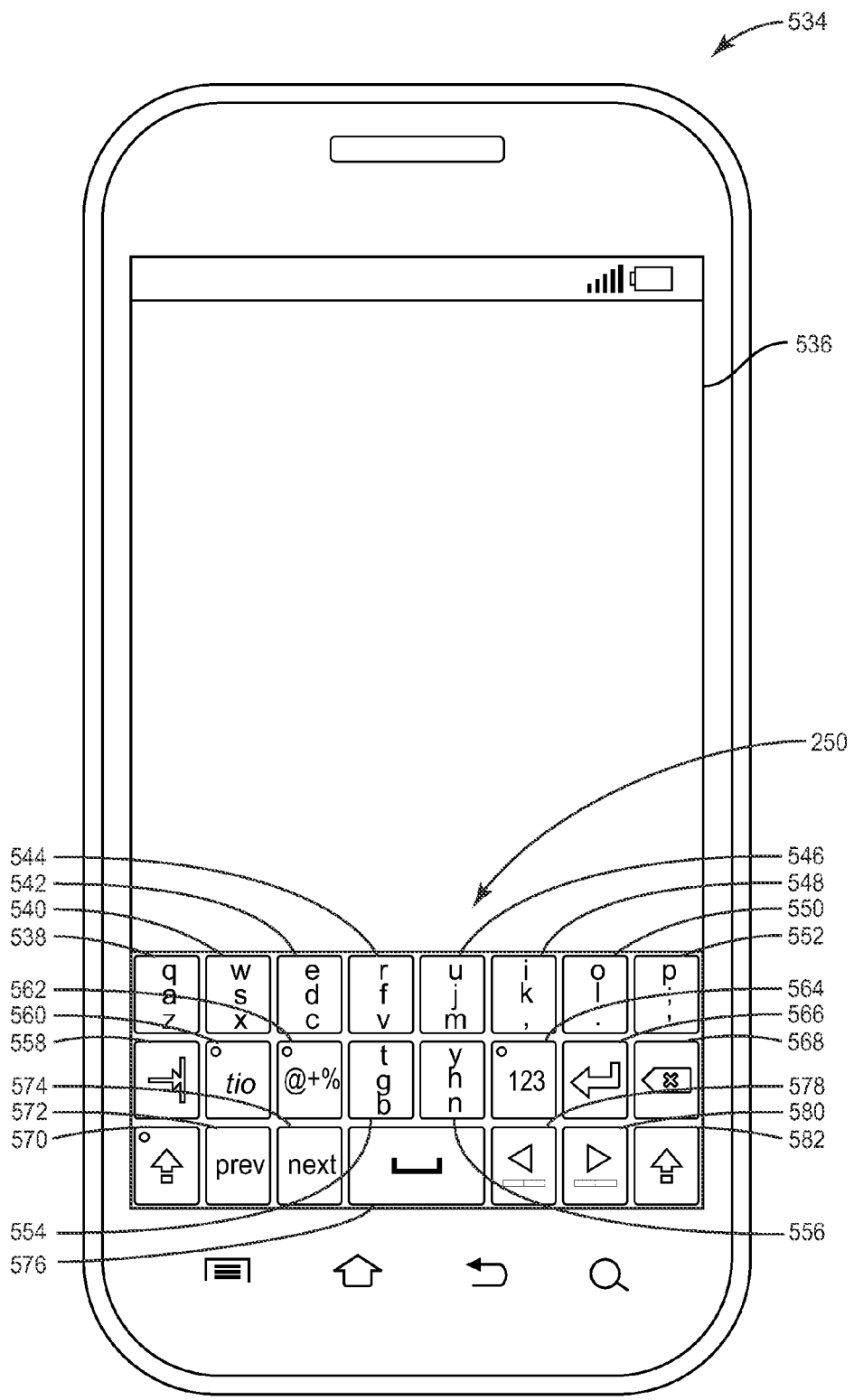
FIG. 19 is a schematic diagram of the exemplary key layout in FIG. 6 displayed on a screen of an exemplary wireless mobile device.

FIG. 19 illustrates the exemplary key layout 250 in FIG. 6 displayed in a keyboard in a portrait orientation on an exemplary screen or display 536 of an exemplary electronic touch-screen device 534. Keys 538-556 are injectively overloaded with characters of a QWERTY keyboard. At least three injectively overloaded keys 538-544 are disposed in a first row. A first injectively overloaded key 544 among the at least three injectively overloaded keys 538-544 is injectively overloaded with a first at least three characters {rfv} assigned to a first finger (a left-hand index finger) in a QWERTY keyboard. A second injectively overloaded key 554 is disposed outside the first row (of keys 538-544). The second injectively overloaded key 554 is injectively overloaded with a second at least three characters {tgb} assigned to the first finger (a left-hand index finger) in a QWERTY keyboard. In addition, at least three injectively overloaded keys 546-552 are disposed in the first row. A third injectively overloaded key 546 among the at least three injectively overloaded keys 546-552 is injectively overloaded with a third at least three characters {ujm} assigned to a second finger (a right-hand index finger) in a QWERTY keyboard. A fourth injectively overloaded key 556 is disposed outside the first row (of keys 546-552). The fourth injectively overloaded key 556 is injectively overloaded with a fourth at least three characters {yhn} assigned to a second finger (a right-hand index finger) in a QWERTY keyboard. In addition to alphabetic characters, keys 548, 550, and 552 are also overloaded with symbol characters {,.;'} (comma, period, semicolon, apostrophe). Key 548 is overloaded with characters {ik,}; key 550 is overloaded with characters {ol.}; and key 552 is overloaded with characters {p;'}. Additional keys are also provided in the key layout of FIG. 19. Key 558 provides a tab character. Pressing key 560 provides an alternative screen providing an alternative key layout that may facilitate the editing of entered text as well as access to a settings menu. Key 562 provides an alternative key layout allowing additional symbol characters to be typed. Key 564 provides an alternative key layout allowing numerical characters to be typed. Key 566 provides an Enter key. Key 568 provides a backspace. Key 570 provides a left shift modifier key. Key 572 provides a "previous word" functionality, which allows a user to cycle backwards through a list of candidate disambiguated word selections. Key 574 provides a "next word" functionality, which allows a user to cycle forwards through a list of candidate disambiguated word selections. Key 576 provides a spacebar. Key 578 provides a left arrow. Key 580 provides a right arrow. Pressing key 578 or key 580 may also cause the disambiguation software of the electronic device 534 to start a new disambiguated word prediction, which may be used for piecing together fragments of words into new words not already present in the dictionary. Key 582 provides a right shift modifier key.

Figure 20:
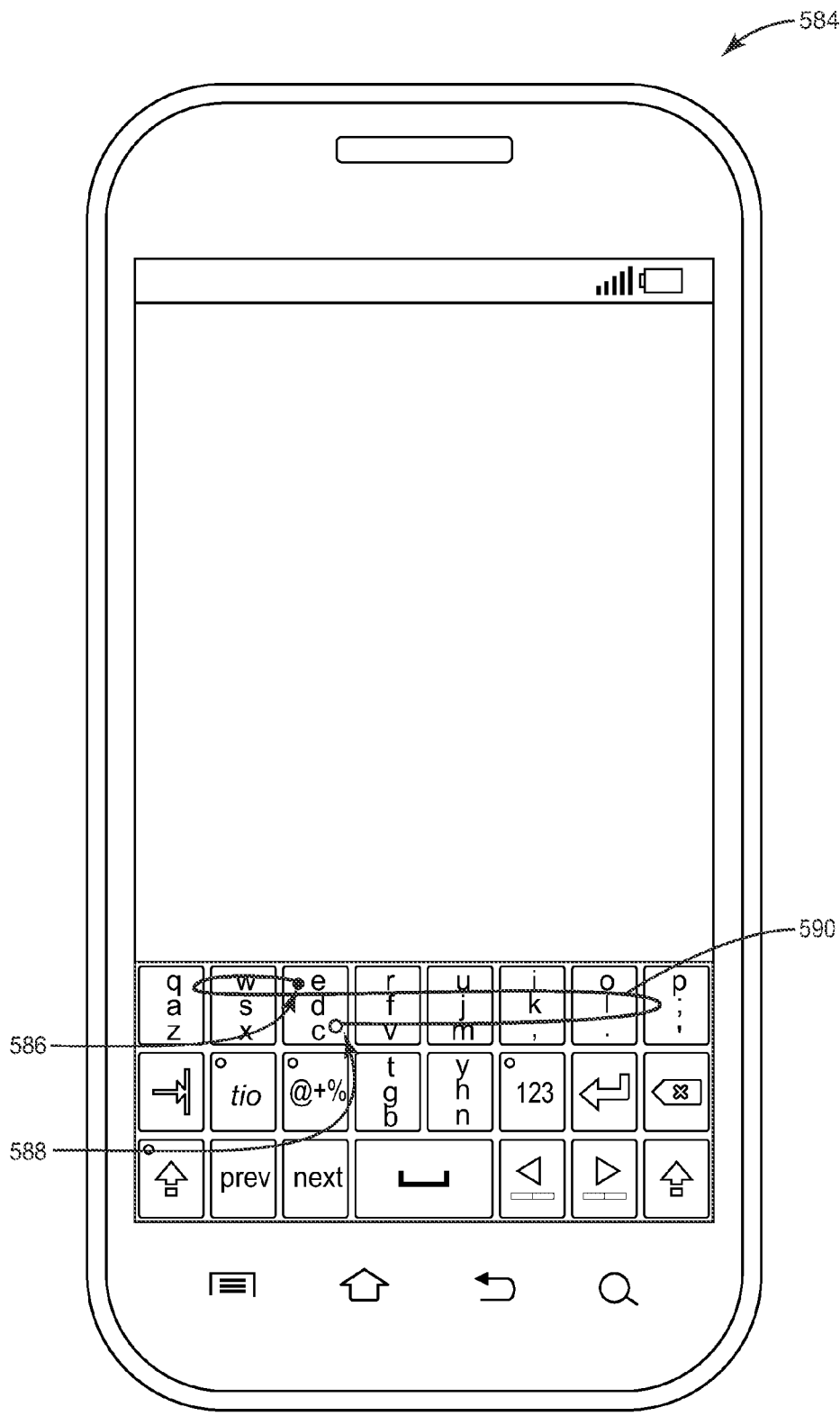
FIG. 20 is a schematic diagram illustrating use of gesture input to enter a word into the exemplary wireless mobile device of FIG. 19.

Referring now to FIG. 20, gestured input may be used to enter text and data into the key layouts provided herein. For example, a typing apparatus (such as electronic device 584) may be configured to receive a vocabulary of words and beginnings of words as gesture input. The gesture input may comprise receiving a word or a beginning of a word as input when a path is traced from an area near an initial injectively overloaded key representing an initial character of the word (for example, the initial character "e" in "example") through subsequent areas near subsequent injectively overloaded keys approximating subsequent characters of the word (for example, a path 590 traced from an initial point 586 (near the "edc" key), through the "wsx" key, the "qaz" key, the "ujm" key, the "p;"' key, the "ol." key, and to a release point 588 (near the "edc" key). The area near the initial injectively overloaded key may be an area within the initial injectively overloaded key, and the subsequent areas near the injectively overloaded keys may be subsequent areas within the subsequent injectively overloaded keys. Areas near a key may include areas within the width of the key as measured from the centerpoint of the key. Areas near a key may also include areas within 110%, 120%, or 130% of the width of the key as measured from the centerpoint of the key. The subsequent injectively overloaded keys approximating subsequent characters of the word may be subsequent injectively overloaded keys representing characters spelling the subsequent characters of the word. Misspellings of the word may also be recognized. For example, a series of keys approximating the characters of a word include the series of keys representing characters spelling the word as well as the series of keys representing known misspellings of the word. Additional information regarding approximate typing may be found in U.S. Pat. No. 7,387,457 to Jawerth et al., filed Aug. 15, 2005, entitled "One-Row Keyboard and Approximate Typing," the entire contents of which are incorporated herein by reference in their entirety; U.S. Pat. No. 7,758,264 to Jawerth et al., filed Nov. 23, 2005, entitled "One-Row Keyboard," the entire contents of which are incorporated herein by reference in their entirety; and U.S. patent application Ser. No. 12/148,539 filed Apr. 18, 2008, by Jawerth et al., entitled "One-Row Keyboard and Approximate Typing," the entire contents of which are incorporated herein by reference in their entirety.

Reduced-width, injectively overloaded keyboards herein provided may allow a typist to rapidly enter data and text, for example, because a typist may use a same finger to type each character on the reduced-width, injectively overloaded keyboard as the typist would have used to type that character on a represented keyboard. Additional benefits may also be realized. For example, a typist may use a smaller subset of motion patterns to type a vocabulary of phrases, words, and characters when typing upon the reduced-width, injectively overloaded keyboards herein provided. In addition, using the reduced-width, injectively overloaded keyboards herein provided, the travel distance which a typist's fingers travel during entry of text or other data may be reduced (for example, as compared to a traditional keyboard, such as a QWERTY keyboard).

Exemplary calculations demonstrating an exemplary reduced travel distance for typing English phrases consisting of the characters {ABCDEFGHIJKLMNOPQRSTUVWXYZ:;,.?} (as well as the corresponding lowercase letters) using the exemplary key layout of FIG. 19 are now provided. These calculations are for ten-finger typing (i.e., typing using all ten fingers). An estimate of the travel distance that fingers travel while typing English phrases may be determined using a table of letter and punctuation mark frequencies. For example, the following table provides character frequencies according to page 181 of E. Stewart Lee's *Essays about Computer Security*, Cambridge, 1999 (also available at http://www.cl.cam.ac.uk/~mgk25/lee-essays.pdf):

TABLE 1

Relative frequency of English characters from a large text.

| Letter (Character) | Frequency |
|---|---|
| Space | 12.17 |
| A | 6.09 |
| B | 1.05 |
| C | 2.84 |
| D | 2.92 |
| E | 11.36 |
| F | 1.79 |
| G | 1.38 |
| H | 3.41 |
| I | 5.44 |
| J | 0.24 |
| K | 0.41 |
| L | 2.92 |
| M | 2.76 |
| N | 5.44 |
| O | 6.00 |
| P | 1.95 |
| Q | 0.24 |
| R | 4.95 |
| S | 5.68 |
| T | 8.03 |
| U | 2.43 |
| V | 0.97 |
| W | 1.38 |
| X | 0.24 |
| Y | 1.30 |
| Z | 0.03 |
| Others (Common punctuations) | 6.57 |

The following calculations presume a travel distance of 0 to type characters on home keys, and a travel distance of 1 to type characters on non-home keys. Thus, for a U.S. QWERTY keyboard, the distance-0 characters are {ASDFJKL:;} including the space character (and corresponding lowercase letters) and the distance-1 characters are {QWERTYUIOPZXCVBNM,.?GH} (and corresponding lowercase letters). Accordingly, the average travel distance for a U.S. QWERTY keyboard is 0.24+1.38+11.36+4.95+8.03+1.30+2.43+5.44+6.00+1.95+0.03+0.24+2.84+0.97+1.05+5.44+2.76+6.57+1.38+3.41=67.77%. Accordingly, for a U.S. QWERTY keyboard, a finger must travel an average distance of 0.6777 units to type each entered character. For a Dvorak keyboard, the distance-0 characters are {AOEUHTNS} including the space character (and corresponding lowercase letters) and the distance-1 characters are {"',.PYFGCRL:;QJKXBMWVZID} (and corresponding lowercase letters). Accordingly, the average travel distance for the Dvorak keyboard is 6.57+1.95+1.30+1.79+1.38+2.84+4.95+2.92+0.24+0.24+0.41+0.24+1.05+2.76+1.38+0.97+0.03+5.44+2.92=39.38%. Accordingly, for a Dvorak keyboard, a finger must travel an average distance of 0.3938 units to type each entered character. For the exemplary key layout of FIG. 19, the distance-0 characters are {QWERUIOPASDFJKL;ZXCVM,.'} including the space character (and corresponding lowercase letters) and the distance-1 characters are {TGBYHN} (and corresponding lowercase letters). Accordingly, the average travel distance for the exemplary key layout of FIG. 19 is 8.03+1.38+1.05+1.30+3.41+5.44=20.61. Accordingly, for the exemplary key layout of FIG. 19, a finger must travel an average distance of 0.2061 units to type each entered character. Relative travel distances among the keyboards may be determined as follows. The average travel distance of a U.S. QWERTY key layout is (67.77/20.61=) 3.29 times that of the FIG. 19 key layout. The average travel distance of a Dvorak keyboard is (39.38/20.61=) 1.91 times that of the FIG. 19 key layout. Thus, the exemplary key layout of FIG. 19 provides a reduced-width, overloaded keyboard providing a reduced average travel distance for typing English phrases.

Figure 21:
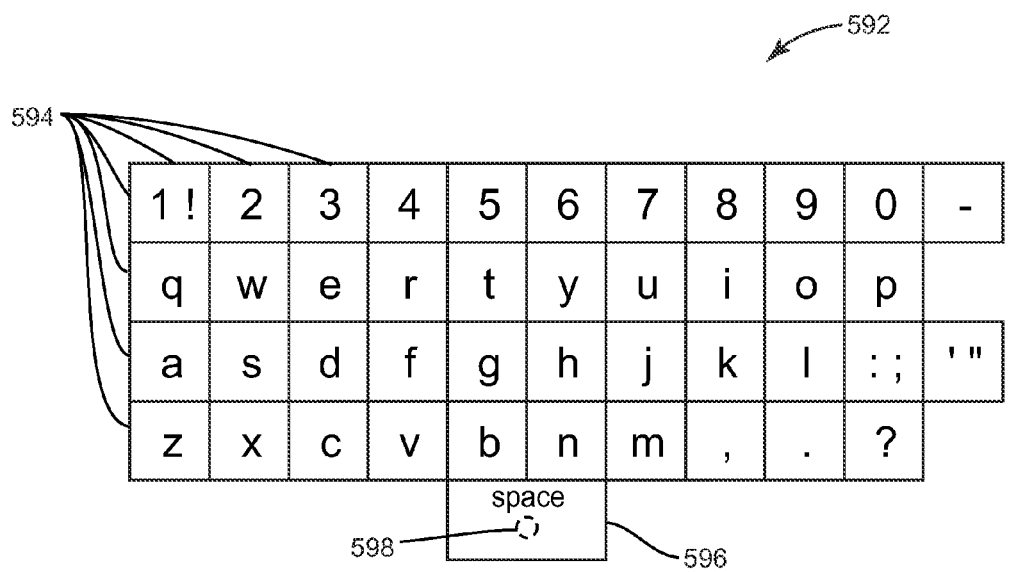
FIG. 21 is a logical diagram depicting a QWERTY key layout.
Figure 22:
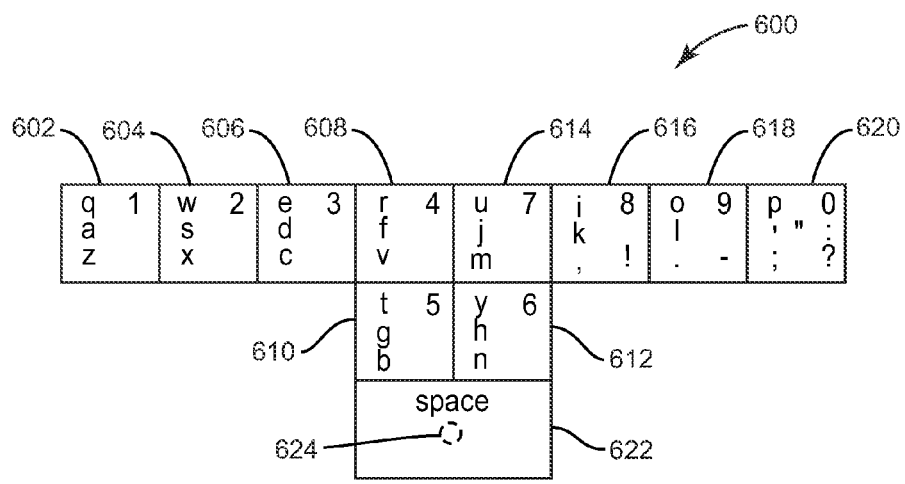
FIG. 22 is logical diagram of an exemplary overloaded key layout.

FIG. 21 illustrates a QWERTY key layout 592 having keys 594, including a space key 596 having a centerpoint 598. FIG. 22 illustrates a reduced key layout 600 providing keys 602-622, including a space key 622 with a centerpoint 624. In FIG. 22, keys 602-620 are injectively overloaded with the alphabetic characters (i.e., characters "a" through "z") of the QWERTY key layout 502 (FIG. 21). Keys 602-620 in key layout 600 (FIG. 22) are also injectively overloaded with the numerical characters (i.e., characters "0" through "9") of the QWERTY key layout 592 (FIG. 21). Keys 602-620 (FIG. 22) are adjacency consistent with the alphabetic characters and the numerical characters of the QWERTY key layout 592 (FIG. 21). Keys 616, 618, and 620 are also overloaded with additional symbols (e.g., punctuation marks) represented in the QWERTY key layout 592 (FIG. 21). For example, key 616 is overloaded with an "i" character, a "k" character, an "8" character, a comma character ",", and an exclamation point character "!". Key 618 is overloaded with an "o" character, an "l" character, a "9" character, a period character "." and a dash character "-". Key 620 is overloaded with a "p" character, an apostrophe character "'", a double quote character """, a semicolon character ";", a colon character ":", and a question mark character "?". Keys 602-608 and 614-620 are disposed in a first row. Keys 610 and 612 are disposed in a second row outside the first row. Space key 622 is provided in a third row. Overloaded keys 610 and 612 are order disruptive of the QWERTY key layout 592. Key layout 600 may be provided within an area sized for thumb-typing.

Figure 23:
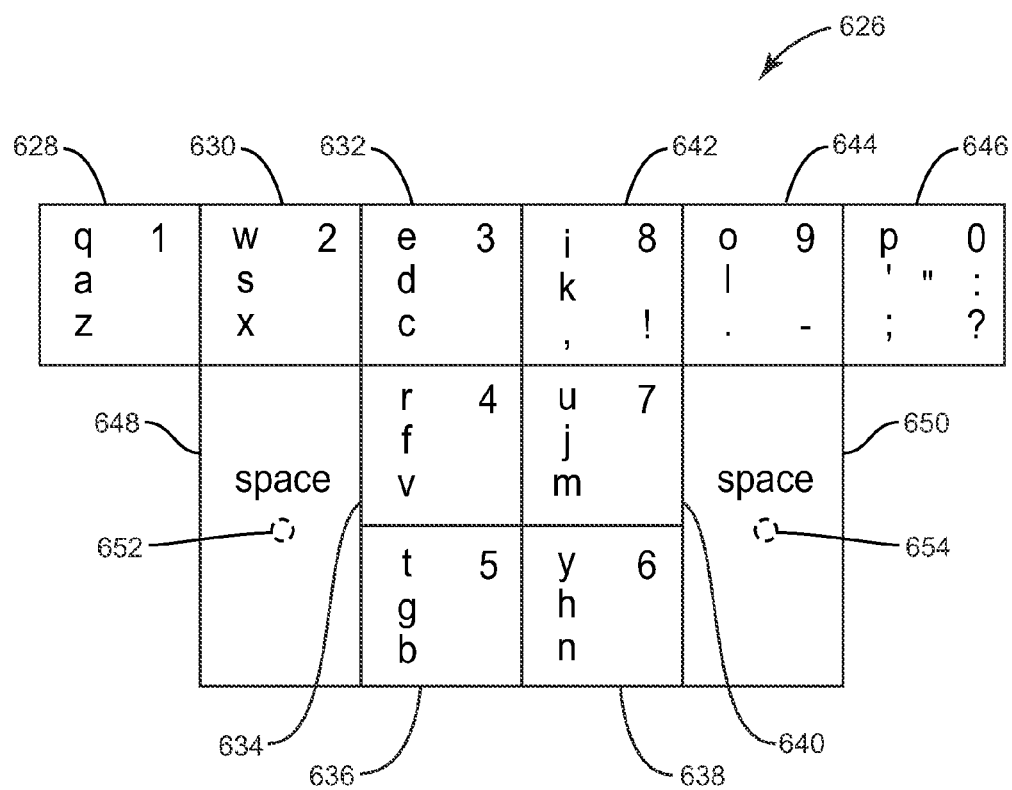
FIG. 23 is logical diagram of an exemplary overloaded key layout.

FIG. 23 illustrates a reduced key layout 626 providing keys 628-650, including a left space key 648 having a centerpoint 652 and a right space key 650 having a centerpoint 654. In FIG. 23, keys 628-646 are injectively overloaded with the alphabetic characters (i.e., characters "a" through "z") of the QWERTY key layout 592 (FIG. 21). Keys 628-646 in key layout 626 (FIG. 23) are also injectively overloaded with numerical characters (i.e., characters "0" through "9") of the QWERTY key layout 592 (FIG. 21). In addition, keys 628-646 (FIG. 23) are adjacency consistent with the alphabetic characters and the numerical characters of the QWERTY key layout 592 (FIG. 21). Alphabetically and numerically injectively overloaded keys 628, 630, 632, 642, 644, and 646 are provided in a first row. Alphabetically and numerically injectively overloaded keys 634, 636, 638, 640 are provided outside the first row. Alphabetically and numerically injectively overloaded keys 634 and 640 are provided in a second row. Alphabetically and numerically injectively overloaded keys 636 and 638 are provided in a third row. As depicted in FIG. 23, left space key 648 and right space key 650 may span the second and third rows. Key layout 626 may be provided within an area sized for thumb-typing.

Exemplary calculations demonstrating an exemplary reduced travel distance for two-thumb typing (i.e., typing using only the left and right thumbs) on an exemplary reduced keyboard are now provided. As an alternative to typing with all ten fingers (ten-finger typing), a user may use two-thumb typing to enter text and/or data on a device with smaller-size keys which is held by the hands in a landscape or portrait orientation without additional support (such as a table). An exemplary calculation providing the distance that the thumbs travel during two-thumb typing using a given key layout is now provided. For this calculation, thumb movements are modeled as follows: 1) the left thumb addresses keys on the left half of the layout, and the right thumb addresses keys on the right half of the layout; 2) the starting point for each thumb is the centerpoint of the spacebar (however, this calculation could also be made using a different starting point for the thumbs); 3) the space bar can be pressed by either thumb; 4) the space bar is pressed by the thumb that was not used to press the previous character (the "free" thumb); 5) each key is a square with a side length of 1; and 6) the distance from one key to another key is the Euclidean distance between the keys' centers in the particular key layout. Using this model, the distance that that thumbs would travel to type any given source text may be calculated by summing the Euclidean distance between centerpoints of successive keys for each character position in the source text.

For this example, a source text containing over 900,000 words was formed from a collection of public domain works. From the Project Gutenberg website (http://www.gutenberg.org/), the texts of the following books were downloaded: Agatha Christie, *Secret Adversary*; Charles Dickens, *David Copperfield*; Charles Dickens, *A Christmas Carol*; Mark Twain, *Adventures of Huckleberry Finn*; and Fyodor Dostoyevsky, *The Brothers Karamazov*. From these files the table of contents, headings, and initial file identifiers were removed. The resulting source text (ST1) consisted of 4,975,146 characters (including space characters).

Using the foregoing model, the total travel distances for two-thumb typing the ST1 source text on the QWERTY key layout 592 (FIG. 21) ("QwertyKeyLayout") and the reduced key layout 600 (FIG. 22) ("ReducedKeyLayout1") were calculated.

TotalTravelDistance(ST1,QwertyKeyLayout)≈ 12,033,744.

TotalTravelDistance(ST1,ReducedKeyLayout1)≈ 8,097,265.

Dividing by the total number of characters in the source text ST1 (4,975,146), the average travel distances between characters on these key layouts may be found.

AverageTravelDistance(ST1,QwertyKeyLayout)≈ 2.418

AverageTravelDistance(ST1,ReducedKeyLayout1)≈ 1.628

Hence, the travel distance of the reduced key layout is approximately 67% of the QWERTY key layout, $$RelativeTravelDistance = \frac{TotalTravelDistance(ST1, ReducedKeyLayout1)}{TotalTravelDistance(ST1, QwertyKeyLayout)} \approx 0.673$$

Accordingly, the above calculation has demonstrated that an exemplary reduced key layout 600 provides a travel distance for two-thumb typing a representative source text (ST1) which is smaller than the travel distance for two-thumb typing with an exemplary QWERTY key layout 592. Thus, an exemplary calculation demonstrating an exemplary reduced travel distance for two-thumb typing (i.e., typing using only the left and right thumbs) on an exemplary reduced key layout 600 has been demonstrated.

FIG. 23 provides a key layout 626 which reduces the travel distance for two-thumb typing even further.

An exemplary calculation demonstrating an exemplary reduced travel distance for ten-finger typing may be demonstrated using character frequencies from the ST1 source text. Table 2 provides the frequencies of characters in source text ST1.

TABLE 2

Relative frequency of English characters from source text ST1

| Character | Frequency (%) |
|---|---|
| Space | 18.42 |
| ! | 0.14 |
| " | 0.46 |
| ' | 0.75 |
| , | 1.64 |
| - | 0.32 |
| . | 1.08 |
| : | 0.03 |
| ; | 0.13 |
| ? | 0.14 |
| 0-9 | 0.00 |
| A | 6.26 |
| B | 1.16 |
| C | 1.66 |
| D | 3.56 |
| E | 9.21 |
| F | 1.61 |
| G | 1.61 |
| H | 4.85 |
| I | 5.38 |
| J | 0.10 |
| K | 0.73 |
| L | 3.05 |
| M | 2.20 |
| N | 5.27 |
| O | 6.08 |
| P | 1.23 |
| Q | 0.07 |
| R | 4.17 |
| S | 4.64 |
| T | 7.03 |
| U | 2.31 |
| V | 0.78 |
| W | 1.93 |
| X | 0.10 |
| Y | 1.85 |
| Z | 0.04 |

A ten-finger travel distance may be recalculated using the ST1 source text character frequencies. For the QWERTY key layout 592, this calculation presumes a travel distance of 0 to type characters on home keys {asdfjkl;:}, the space character, and corresponding uppercase letters; a travel distance of 1 to type characters {ghqwertyuiopzxcvbnm,.?} and corresponding uppercase letters; and a travel distance of 2 to type characters {1234567890!-}. For the reduced key layout 600, this calculation presumes a travel distance of 0 to type characters qaz1wsx2edc3rfv4ujm7ik8,!ol9.-p0'";:?}, the space character, and corresponding uppercase letters; and a travel distance of 1 to type characters {tgb5yhn6} and corresponding uppercase letters. Accordingly, the average travel distance for the QWERTY key layout 592 was found to be approximately 0.555, and the average travel distance for the reduced key layout 600 was found to be approximately 0.218. Hence, the relative advantage in travel distance of the reduced key layout 600 compared to the QWERTY key layout 600 is calculated to be 0.555/0.218~2.55. The differences in the computed relative advantage using the TABLE 1 character frequencies (3.29) and the computed relative advantage using the TABLE 2 character frequencies (2.55) may be largely attributed to a higher frequency occurrence of the space character in the ST1 source text.

Two factors affecting a typist's typing speed are 1) re-use of procedural memory and 2) finger travel distance. A third factor which affects a typist's typing speed is reaction time. Reaction time is the time required for a user to decide and react to a selection among multiple choices, such as pressing one of many keys. Reaction time may be modeled using Hick's law. Hick's law (in its more general form) states that if there are n choices with probabilities $\{p_i\}_{i=1}^n$, then the reaction time T required to choose among these is well approximated by $T=bh$, where b is an experimentally determined constant and h is the modified entropy $$h = \sum_{i=1}^n p_i \log_2\left(1 + \frac{1}{p_i}\right).$$

The regular Shannon entropy H is $$H = \sum_{i=1}^n p_i \log_2\left(\frac{1}{p_i}\right).$$

Hick's law may be used to model the total reaction time as text of a particular source text is entered using a given keyboard layout. Specifically, assume that the character k at position j in the text is known and identified by k=k(j), and a typist is deciding which key to press for position j+1. Applying Hick's law, $$h_{j,k(j)} = \sum_\alpha Prob(j; k, \alpha) \log_2\left(1 + \frac{1}{Prob(j; k, \alpha)}\right)$$

where $Prob(j;k,\alpha) = Prob(key(j+1) = \alpha | character(j) = k)$ is the probability that the key in position j+1 corresponds to a character (or equivalence class of characters) identified by α, given that the character in position j is the character identified by k. The Shannon entropy $H_{j,k(j)}$ at j may also be calculated.

Using the ST1 source text, the total reaction time TotalReactionTime(ST1, QwertyKeyLayout) for the QWERTY key layout 592 and TotalReactionTime(ST1, ReducedKeyLayout1) for the reduced key layout 600 may be calculated by adding all the $k_{j,k(j)}$ for all positions j in the text file (and similarly for $H_{j,k(j)}$). We find TotalReactionTime(ST1,QwertyKeyLayout)≈ 18,157,269 and

TotalReactionTime(ST1,ReducedKeyLayout1)≈ 15,214,140.

Similarly,

TotalEntropy(ST1,QwertyKeyLayout)≈17,171,236, and

TotalEntropy(ST1,ReducedKeyLayout1)≈14,008,441.

Accordingly, the above calculations demonstrate that the reaction time for the reduced key layout 600 (FIG. 22) is smaller than the reaction time for the QWERTY key layout 592 (FIG. 21). Accordingly, a reduced reaction time key layout 600 has been demonstrated.

One might consider whether reducing the size of keys of a given key layout (to achieve closer centerpoint distances among the keys) to reduce the overall travel distance would result in a faster entry speed. This does not appear to be consistent with models of the human psychomotor behavior. According to Fitts' law, the time to move to a target MT of width W at a distance A is a logarithmic function of the spatial relative error A/W:

$$MT = a + b\log_2\left(\frac{2A}{W} + c\right)$$

where a,b are empirically determined, device-independent constants, and c=0, 0.5, or 1. Note, in particular, that this quantity depends on the relative size of the spatial relative error A/W. Fitts' law may be extended to apply to two-dimensional tasks. However, some aspects of a virtual keyboard on a touch-screen may not be accounted for by a Fitts' law model. Small keys may be hidden by a finger used to depress the key, which may result in ambiguous feedback to the user. In addition, the exact area activated by a finger press may not be marked or readily identifiable to a user. Hence, key size and finger size, for example, may play significant roles in the determination of the motion time MT on these devices.

Figure 24A:
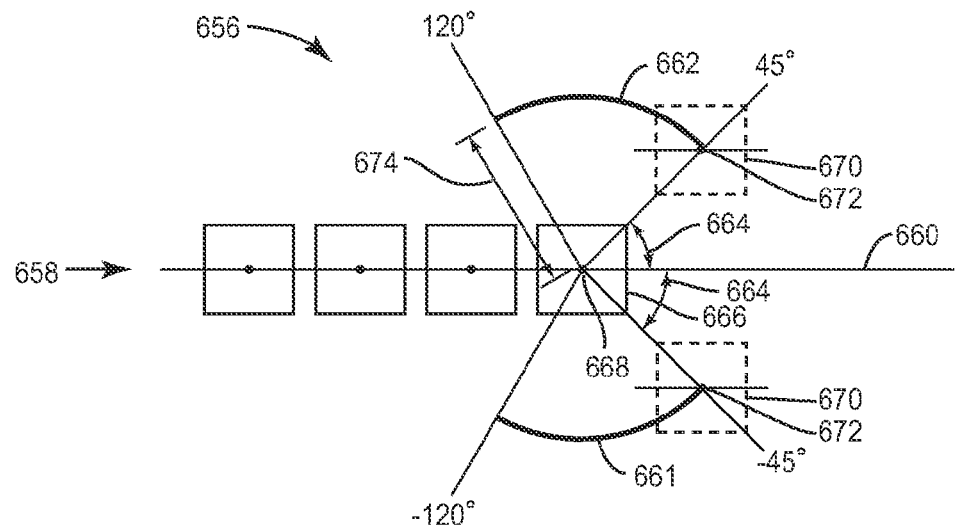
FIG. 24A is schematic diagram illustrating an angular range of positions of a centerpoint of a second key with respect to a centerpoint of a first key above and below a centerline of a row of keys.
Figure 24B:
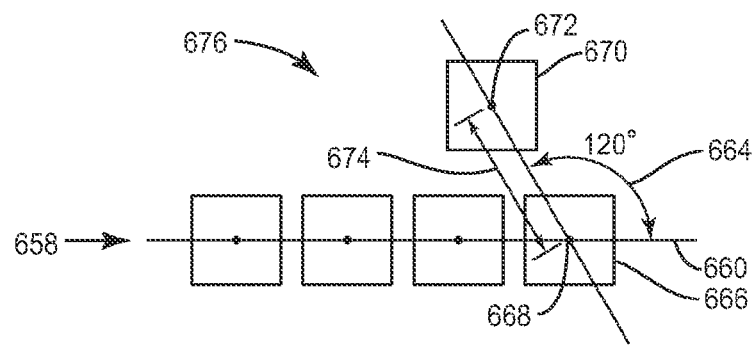
FIGS. 24B-24E are schematic diagrams illustrating various angular positions of a centerpoint of a second key with respect to a centerpoint of a first key above a centerline of a row of keys.
Figure 24C:
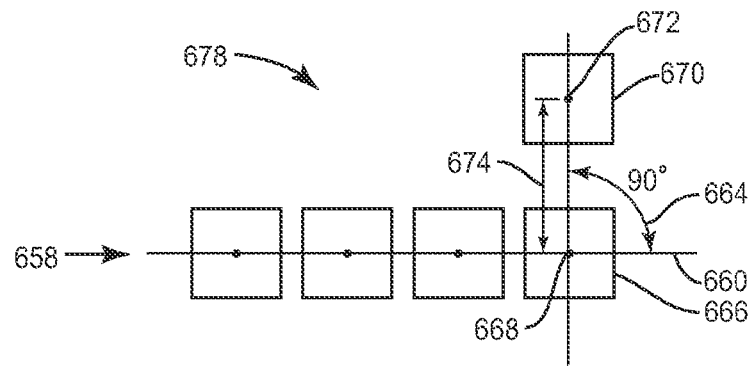
Figure 24D:
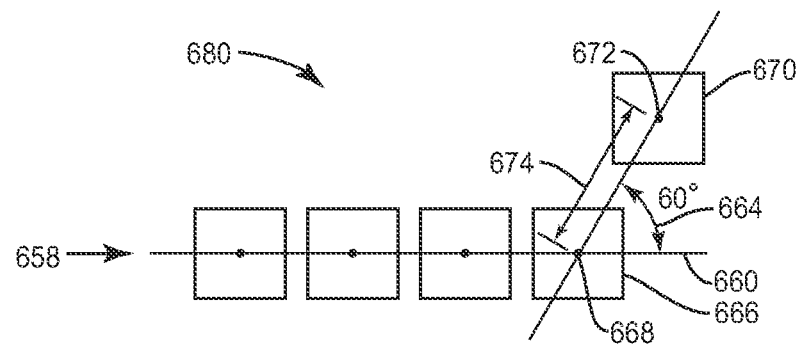
Figure 24E:
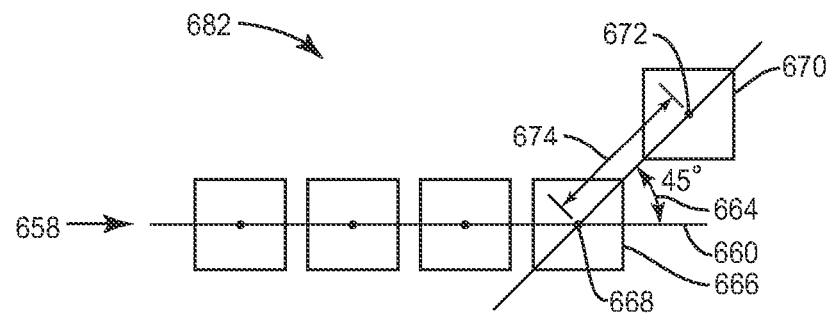

Referring now to FIGS. 24A through 24I, key layouts 656, 676, 678, 680, 682, 684, 686, 688, 690 depict a plurality of positions where a second injectively overloaded key 670 (representing at least three characters assigned to a first finger in a non-represented non-overloaded keyboard) may be located in relation to a first injectively overloaded key 666 (representing at least three characters assigned to the first finger in a non-represented overloaded keyboard). These injectively overloaded key positions may allow a typist to rapidly enter data and text, for example, because a typist may use a same finger to type each character on the reduced-width, injectively overloaded keyboard as the typist would have used to type that character on a represented keyboard. At least three injectively overloaded keys may be disposed in a first row 658. The first injectively overloaded key 666 among the at least three injectively overloaded keys may be injectively overloaded with at least three characters assigned to a first finger in a represented non-overloaded keyboard (for example, a QWERTY keyboard). The second injectively overloaded key 670 may be injectively overloaded with at least three characters assigned to the first finger in a represented non-overloaded keyboard (for example, the QWERTY keyboard). The second injectively overloaded key 670 may be disposed outside the first row 658. The first injectively overloaded key 666 may have a centerpoint 668. The second injectively overloaded key 670 may have a centerpoint 672. The first row 658 of at least three injectively overloaded keys may have a centerline 660. Referring now to FIGS. 24B-24E, the centerpoint 672 of the second injectively overloaded key 670 may be disposed above the first row 658 (FIGS. 24B-24E). The centerpoint 672 of the second injectively overloaded key 670 may be disposed above the first injectively overloaded key 666 (FIGS. 24B-24D). The centerpoint 672 of the second injectively overloaded key 670 may be disposed above the centerpoint 668 of the first injectively overloaded key 666 (FIGS. 24B-24E). The centerpoint 672 of the second injectively overloaded key 670 may be disposed an angular distance 664 above the centerpoint 668 of the first injectively overloaded key 666 from the centerline 660 of the first row 658. For example, the centerpoint 672 of the second injectively overloaded key 670 may be disposed between 45 and 120 degrees (inclusive) above the centerpoint 668 of the first injectively overloaded key 666 from the centerline 660 of the first row 658 (FIG. 24A, 662). The centerpoint 672 of the second injectively overloaded key 670 may be disposed between 60 and 90 degrees (inclusive) above the centerpoint 668 of the first injectively overloaded key 666 from the centerline 660 of the first row 658 (FIG. 24A, 662). FIG. 24B depicts the centerpoint 672 of the second injectively overloaded key 670 disposed 120 degrees above the centerpoint 668 of the first injectively overloaded key 666 from the centerline 660 of the first row 658. FIG. 24C depicts the centerpoint 672 of the second injectively overloaded key 670 disposed 90 degrees above the centerpoint 668 of the first injectively overloaded key 666 from the centerline 660 of the first row 658. FIG. 24D depicts the centerpoint 672 of the second injectively overloaded key 670 disposed 60 degrees above the centerpoint 668 of the first injectively overloaded key 666 from the centerline 660 of the first row 658. FIG. 24E depicts the centerpoint 672 of the second injectively overloaded key 670 disposed 45 degrees above the centerpoint 668 of the first injectively overloaded key 666 from the centerline 660 of the first row 658.

Figure 24F:
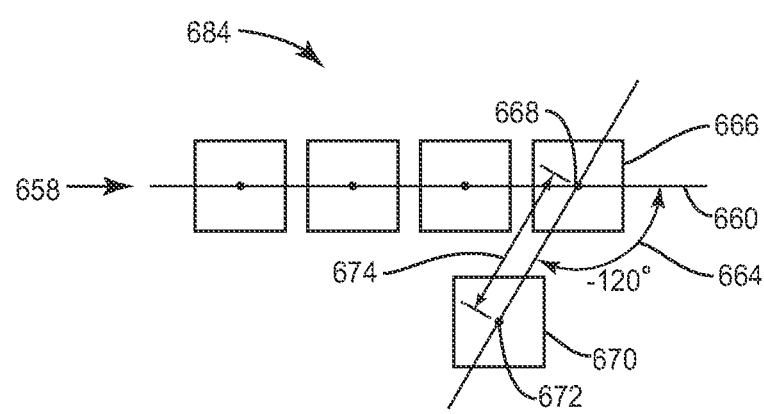
FIGS. 24F-24I are schematic diagrams illustrating various angular positions of a centerpoint of a second key with respect to a centerpoint of a first key below a centerline of a row of keys.
Figure 24G:
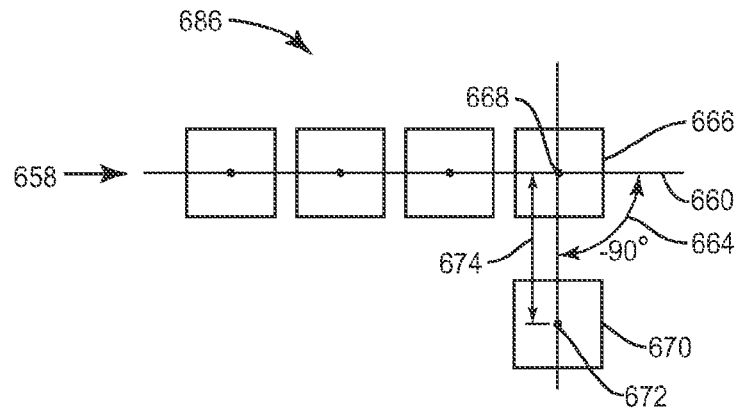
Figure 24H:
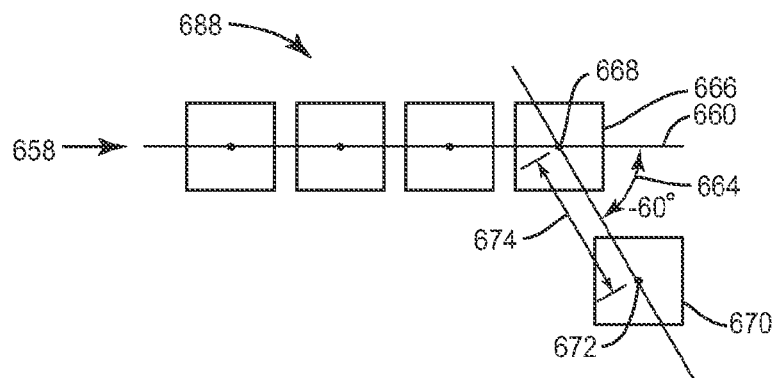
Figure 24I:
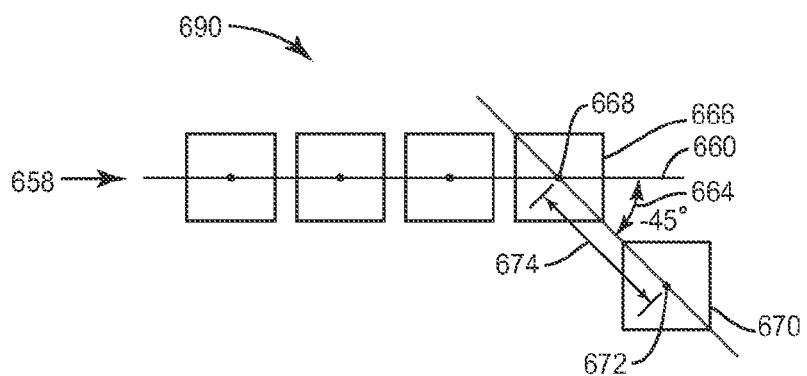

Referring now to FIGS. 24F-24H, the centerpoint 672 of the second injectively overloaded key 670 may be disposed below the first row 658. The centerpoint 672 of the second injectively overloaded key 670 may be disposed below the first injectively overloaded key 666 (FIGS. 24F-24H). The centerpoint 672 of the second injectively overloaded key 670 may be disposed below the centerpoint 668 of the first injectively overloaded key 666 (FIGS. 24F-24H). The centerpoint 672 of the second injectively overloaded key 670 may be disposed an angular distance 664 below the centerpoint 668 of the first injectively overloaded key 666 from the centerline 660 of the first row 658. For example, the centerpoint 672 of the second injectively overloaded key 670 may be disposed between 45 and 120 degrees (inclusive) below the centerpoint 668 of the first injectively overloaded key 666 from the centerline 660 of the first row 658 (FIG. 24A, 663). The centerpoint 672 of the second injectively overloaded key 670 may be disposed between 60 and 90 degrees (inclusive) below the centerpoint 668 of the first injectively overloaded key 666 from the centerline 660 of the first row 658. FIG. 24F depicts the centerpoint 672 of the second injectively overloaded key 670 disposed 120 degrees below the centerpoint 668 of the first injectively overloaded key 666 from the centerline 660 of the first row 658. FIG. 24G depicts the centerpoint 672 of the second injectively overloaded key 670 disposed 90 degrees below the centerpoint 668 of the first injectively overloaded key 666 from the centerline 660 of the first row 658. FIG. 24H depicts the centerpoint 672 of the second injectively overloaded key 670 disposed 60 degrees below the centerpoint 668 of the first injectively overloaded key 666 from the centerline 660 of the first row 658. FIG. 24I depicts the centerpoint 672 of the second injectively overloaded key 670 disposed 45 degrees below the centerpoint 668 of the first injectively overloaded key 666 from the centerline 660 of the first row 658. The centerpoint 672 of the second injectively overloaded key 670 may be disposed a linear distance 674 from the centerpoint 668 of the first injectively overloaded key 666 which is not greater than an ergonomic distance for a finger (e.g., an index finger) to flex and extend, for example, a distance not greater than 31 mm.

Figure 24J:
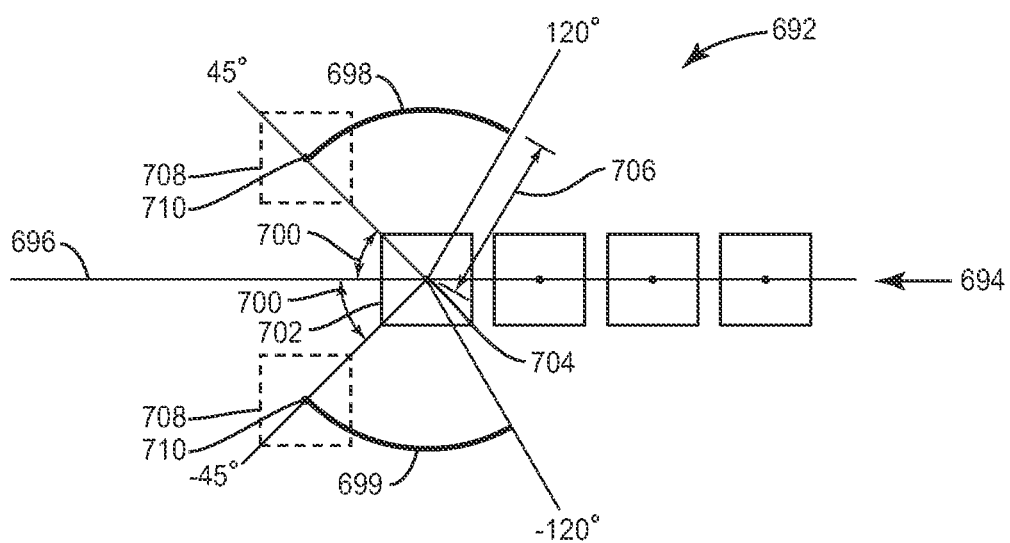
FIG. 24J is a schematic diagram illustrating an angular range of positions of a centerpoint of a second key with respect to a centerpoint of a first key above and below a centerline of a row of keys.

The centerpoint positions 672 indicated in FIGS. 24A through 24I are for left-hand keys. Positions for right-hand keys are mirrored as depicted in FIG. 24J. Referring now to key layout 692 of FIG. 24J, a centerpoint 710 of a second injectively overloaded key 708 may be disposed an angular distance 700 between 45 and 120 degrees (inclusive) above or below (698, 699) a centerpoint 704 of a first injectively overloaded key 702 from a centerline 696 of a first row 694. Within this range, the centerpoint 710 of the second injectively overloaded key 708 may be disposed between 60 and 90 degrees (inclusive) above or below the centerpoint 704 of the first injectively overloaded key 702 from the centerline 696 of the first row 694. For example, the centerpoint 710 of the second injectively overloaded key 708 may be disposed 45 degrees, 60 degrees, 90 degrees, or 120 degrees above or below the centerline 696 of the first row 694. The centerpoint 710 of the second injectively overloaded key 708 may be disposed a linear distance 706 from the centerpoint 704 of the first injectively overloaded key 702 which is not greater than an ergonomic distance for a finger (e.g., an index finger) to flex and extend, for example, a distance not greater than 31 mm.

Figure 25A:
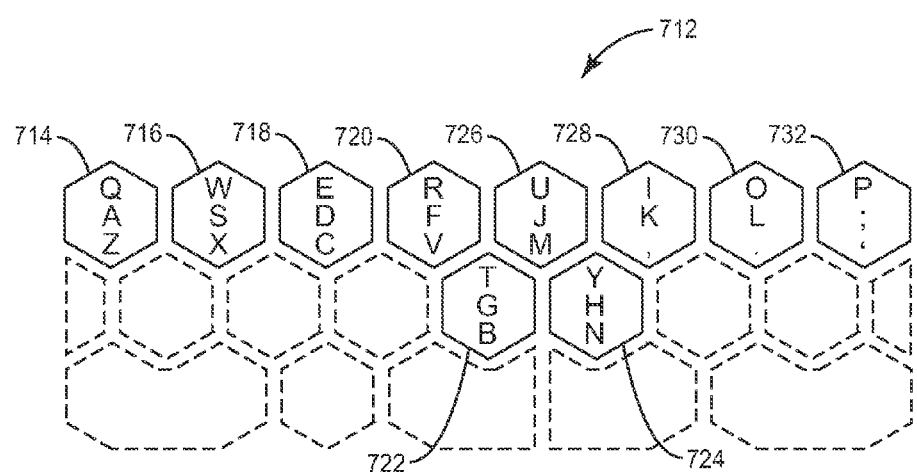
FIG. 25A is a logical diagram of an additional exemplary overloaded key layout.
Figure 25B:
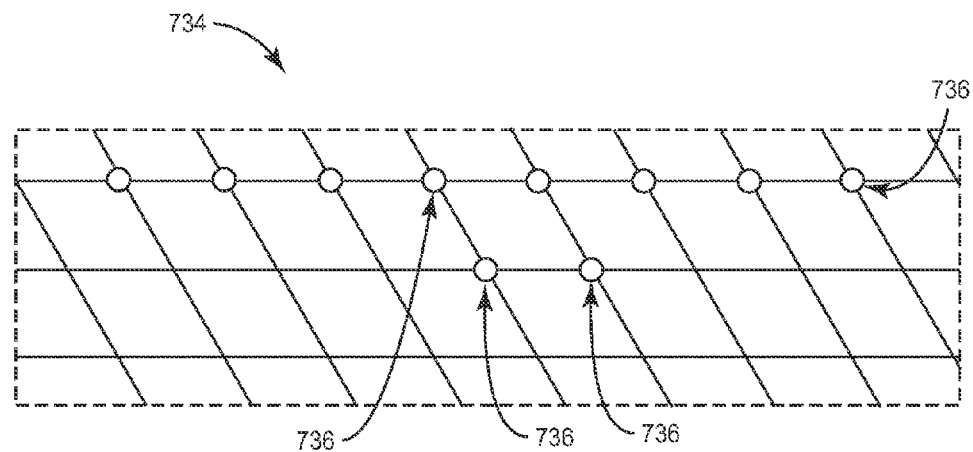
FIG. 25B is a logical diagram of a grid layout corresponding to the overloaded key layout of FIG. 25A.

Injectively overloaded, order-disrupted keys may be disposed upon a variety of grid layouts. For example, FIG. 7A provides a logical diagram having rectangular keys and corresponding to a rectangular grid layout. By way of further example, FIG. 25A provides a logical diagram of an additional exemplary key layout 712 having hexagonal keys 714, 716, 718, 720, 722, 724, 726, 728, 730, 732 and corresponding to a triangular and isometric grid layout 734, illustrated in FIG. 25B. In FIG. 25B, each circled lattice point 736 on the grid layout 734 denotes a centerpoint of a key 714, 716, 718, 720, 722, 724, 726, 728, 730, 732 of FIG. 25A.

Figure 26A:
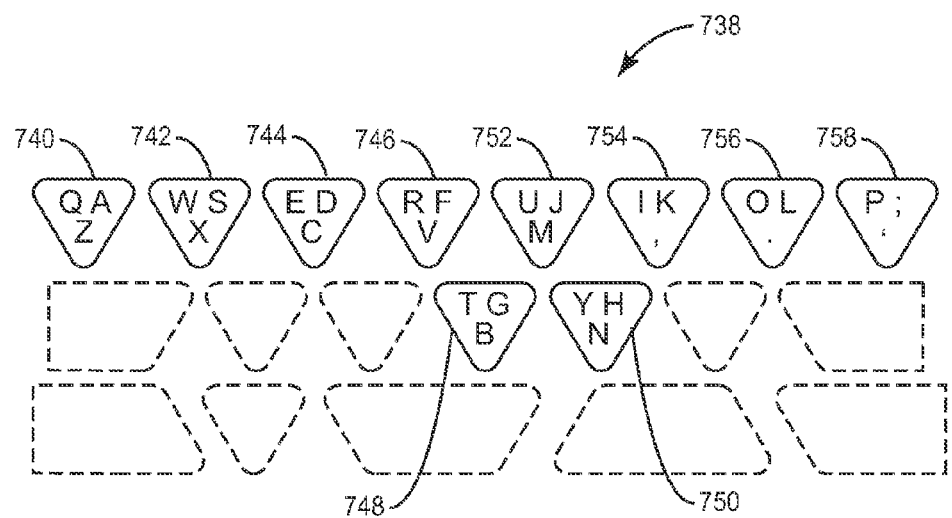
FIG. 26A is a logical diagram of an additional exemplary overloaded key layout.
Figure 26B:
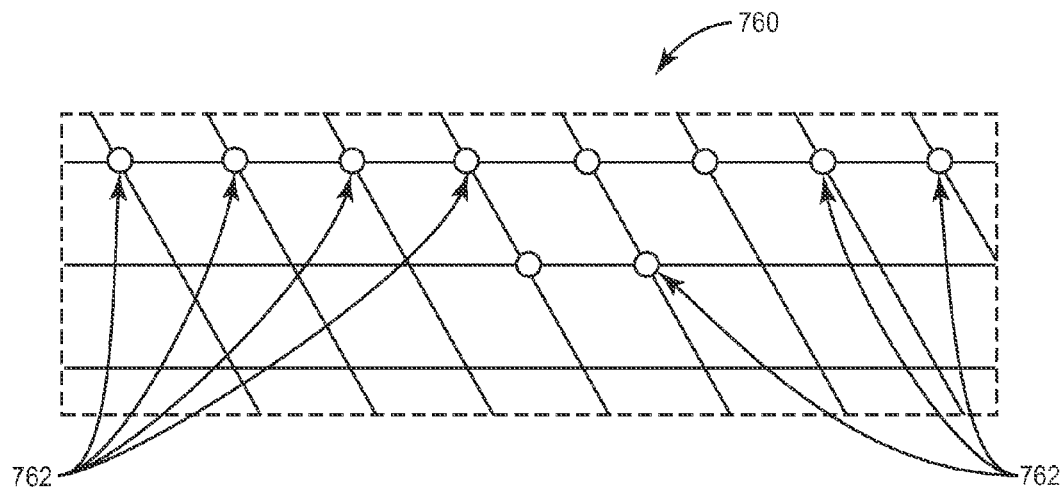
FIG. 26B is a logical diagram of a grid layout corresponding to the overloaded key layout of FIG. 26A.
Figure 27:
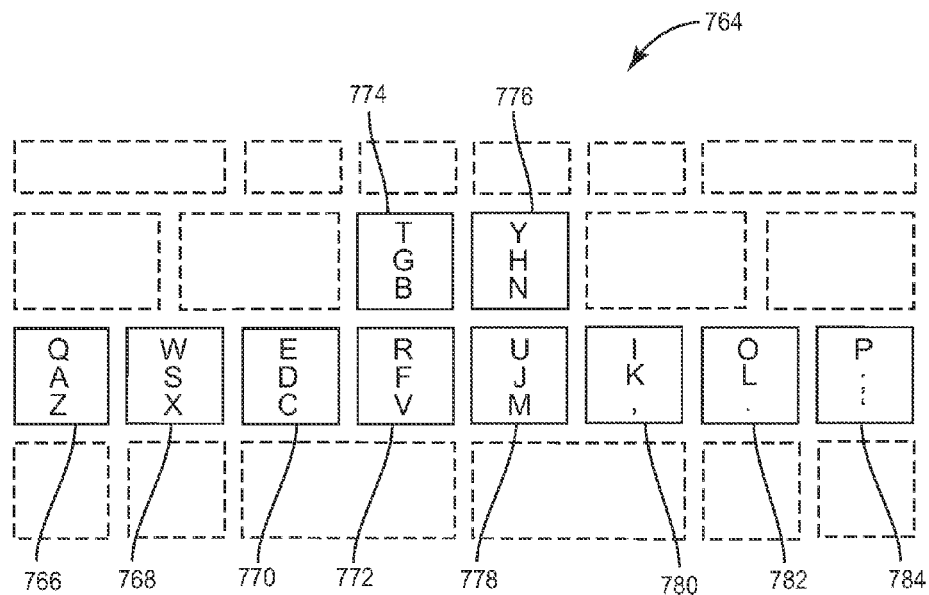
FIGS. 27 and 28 are logical diagrams of additional exemplary key layouts having overloaded key arrangements.

By way of further example, FIG. 26A provides a logical diagram of an additional exemplary key layout 738 with triangular keys 740, 742, 744, 746, 748, 750, 752, 754, 756, 758 and corresponding to a triangular and isometric grid layout 760, illustrated in FIG. 26B. In FIG. 26B, each circled lattice point 762 on the grid layout 760 denotes a centerpoint of a key 740, 742, 744, 746, 748, 750, 752, 754, 756, 758 of FIG. 26A.

To achieve an exemplary reduced-width keyboard, the order of the overloaded keys may be disrupted in a variety of ways. For example, FIG. 7A depicts the injective, order-disrupted key 286 ("T", "G", "B") adjacent to and below the home key 284 in the home column for the left-hand index finger 32 (FIG. 3A). FIG. 7A also depicts the injective, order-disrupted key 288 ("Y", "H", "N") adjacent to and below the home key 290 in a home column for the right-hand index finger 37 (FIG. 3A). By way of further example, FIG. 27 depicts a key layout 764 providing an injective, order-disrupted key 774 ("T", "G", "B") adjacent to and above a home key 772 in the home column for the left-hand index finger 32 (FIG. 3A). Overloaded keys 766, 768, 770, 780, 782, and 784 are provided in a home row of the key layout 764. FIG. 27 also depicts an injective, order-disrupted key 776 ("Y", "H", "N") adjacent to and above a home key 778 in the home column for the right-hand index finger 37 (FIG. 3A).

Figure 28:
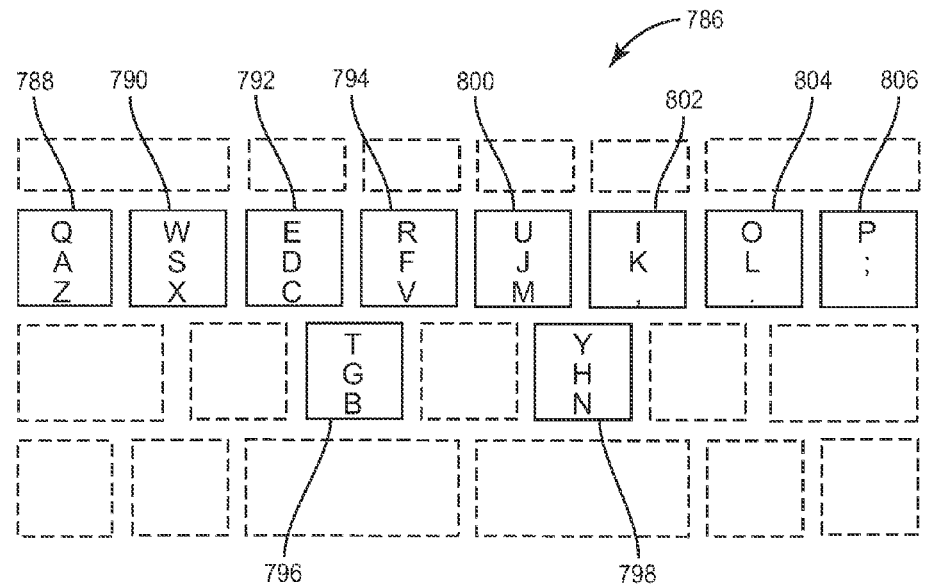

FIG. 28 depicts a key layout 786 providing a first injective, order-disrupted, overloaded key 796 ("T", "G", "B") and a second injective, order-disrupted, overloaded key 798 ("Y", "H", "N") in an alternative grid layout. Overloaded keys 788, 790, 792, 794, 800, 802, 804, 806 are provided in a home row. The overloaded key 796 is adjacent to, offset from, and below the home keys 792 and 794. The overloaded key 798 is adjacent to, offset from, and below the home keys 800 and 802.

Figure 29:
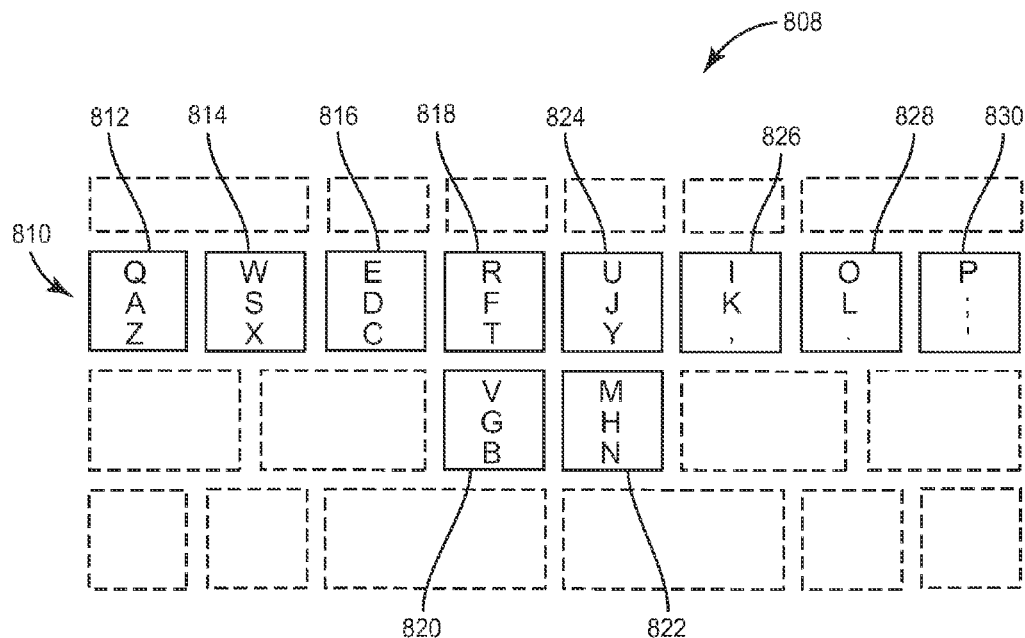
FIGS. 29-37 are logical diagrams of additional exemplary key layouts having overloaded key arrangements.
Figure 30:
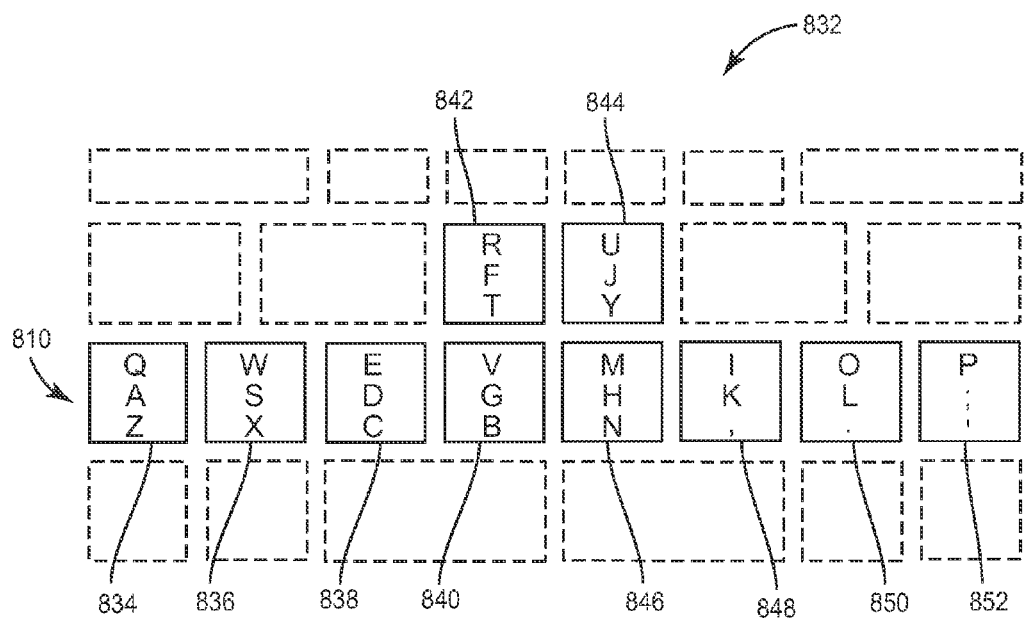
Figure 31:
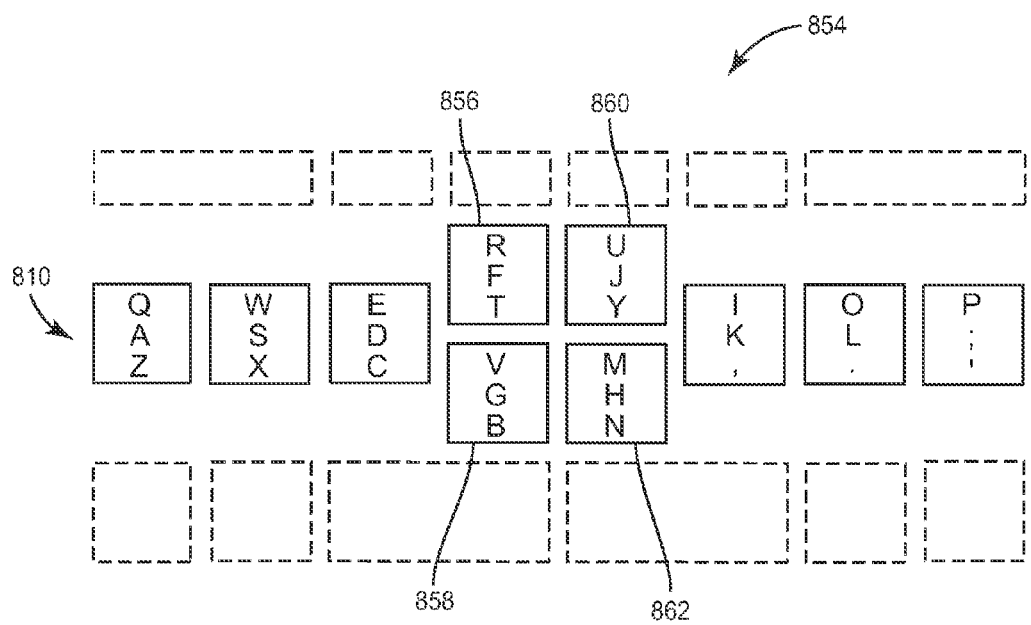

Injectively overloaded keys may also be overloaded with characters associated with a same finger that are not within a same column of the represented keyboard. For example, FIGS. 29 and 30 provide key layouts 808, 832 wherein a key 818, 842 is overloaded with characters ("R", "F", "T") associated with a triangular group of keys of the represented QWERTY keyboard associated with the left-hand index finger 32 (FIG. 3A). Other overloaded keys 812, 814, 816, 826, 828, 830 are provided in a home row 810. A key 820, 840 is overloaded with characters ("V", "G", "B") associated with a further triangular group of keys of the represented QWERTY keyboard. A key 824, 844 is overloaded with characters ("U", "J", "Y") associated with a triangular group of keys associated with the right-hand index finger 37 (FIG. 3A) on a represented QWERTY keyboard. Furthermore, note in FIG. 29, that $F \leq_y G$ in the original layout (in fact, $F =_y G$), but in the deformed layout, $F(F) ! \leq_y F(G)$ (since the key 822, 846 is overloaded with characters ("M", "H", "N") associated with a further triangular group of keys of the represented QWERTY keyboard associated with the right-hand index finger 37 (FIG. 3A)). As depicted in the key layout 808 of FIG. 29, a reduced-width keyboard may be achieved, for example, by disposing the overloaded key 818 in the home row 810 and the overloaded key 820 below the home row 810. Alternatively, as depicted in FIG. 30, a reduced-width keyboard may be achieved, for example, by disposing the overloaded key 840 in the home row 810 and the overloaded key 842 above the home row 810. Other overloaded keys 834, 836, 838, 848, 850, 852 are provided in the home row 810.

Other arrangements are also possible. For example, as depicted in a key layout 854 in FIG. 31, overloaded keys 856, 858 may be disposed so as to each straddle the home row 810. Likewise, as depicted in the key layout 854 in FIG. 31, overloaded keys 860, 862 may be disposed so as to each straddle the home row 810.

Figure 32:
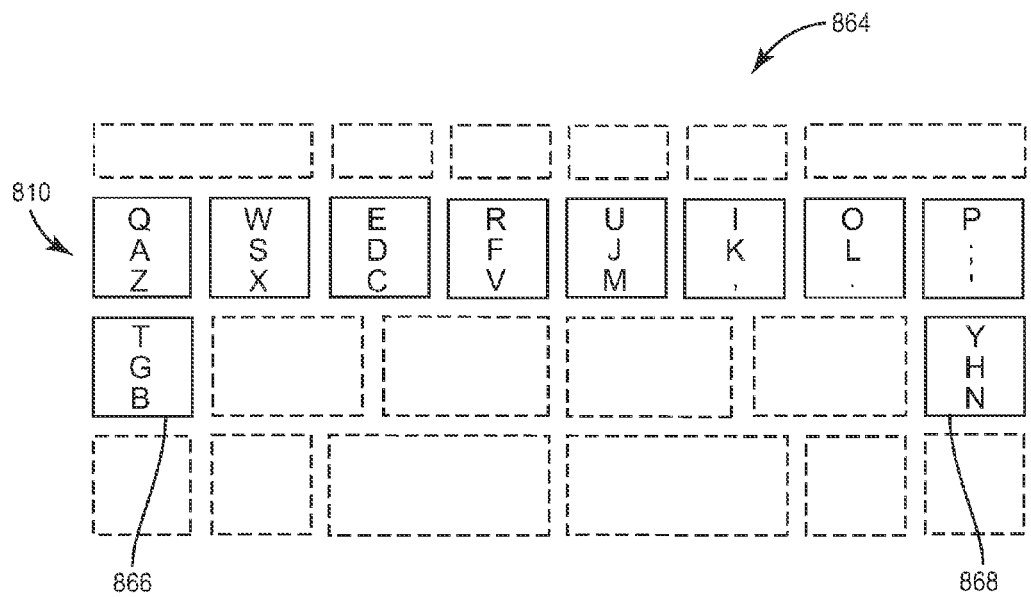

FIGS. 32 through 37 provide additional exemplary logical diagrams of injective and order-disruptive layouts of overloaded keys. FIG. 32 provides a key layout 864 including a first overloaded key 866 representing characters associated with the left-hand index finger 32 (FIG. 3A) on a represented QWERTY keyboard beneath the home row 810. The layout of FIG. 32 further provides a second overloaded key 868 representing characters associated with the right-hand index finger 37 (FIG. 3A) on a represented QWERTY keyboard located beneath the home row 810.

Figure 33:
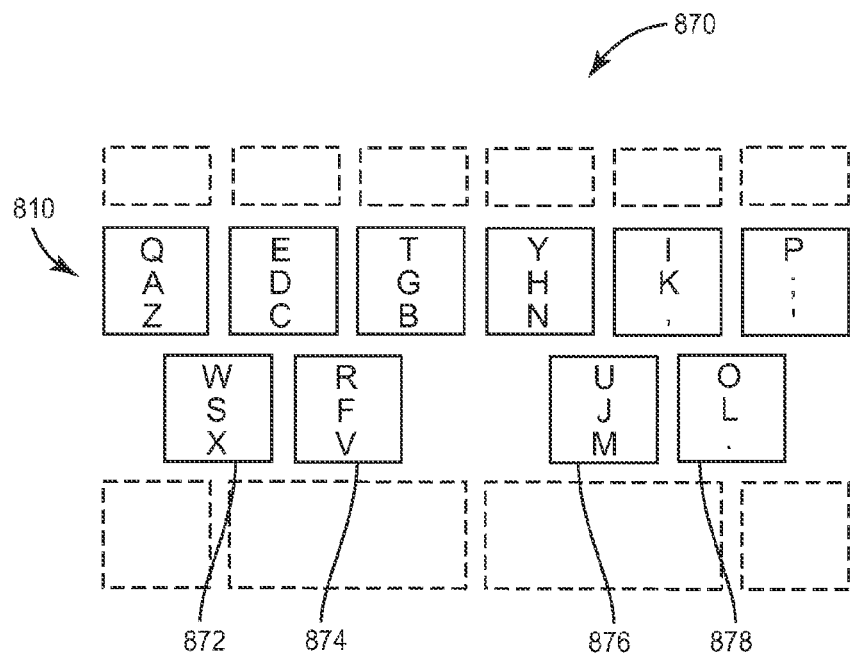

FIG. 33 provides a key layout 870 providing a first overloaded key 872 representing characters associated with the left-hand ring finger 34 (FIG. 3A) on a represented QWERTY keyboard. The key layout 870 provides the first overloaded key 872 beneath the home row 810. The key layout 870 also provides a second overloaded key 874 representing characters associated with the left-hand index finger 32 (FIG. 3A) on a represented QWERTY keyboard. The key layout 870 provides the second overloaded key 874 beneath the home row 810. The key layout 870 further provides a third overloaded key 876 representing characters associated with the right-hand index finger 37 (FIG. 3A) on a represented QWERTY keyboard. The key layout 870 provides the third overloaded key 876 beneath the home row 810. The key layout 870 also provides a fourth overloaded key 878 representing characters associated with the right-hand ring finger 39 (FIG. 3A) on a represented QWERTY keyboard. The key layout 870 provides the fourth overloaded key 878 beneath the home row 810.

Figure 34:
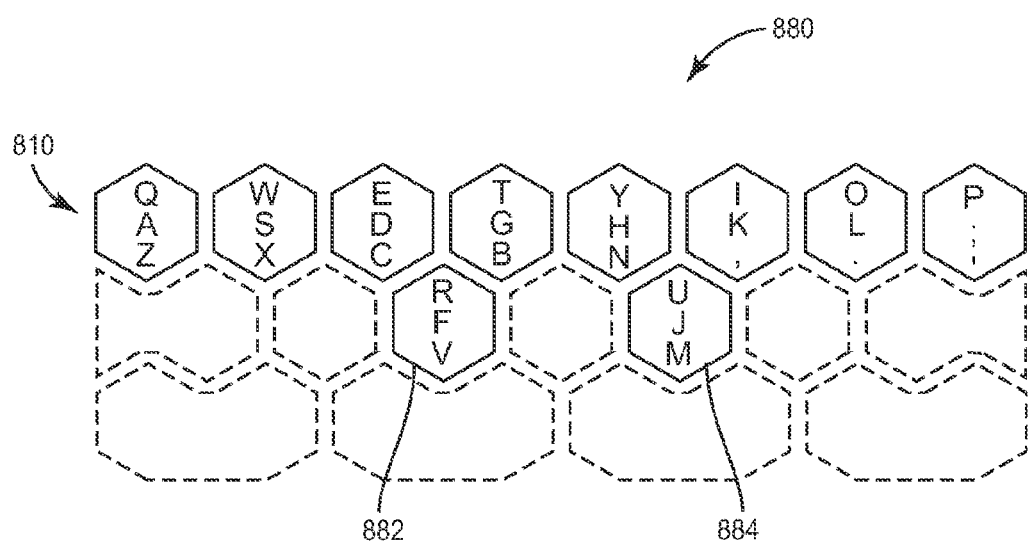

FIG. 34 provides a key layout 880 of injectively overloaded, order-disrupted, hexagonal-shaped keys arranged in a triangular isometric grid layout. The key layout 880 provides a first overloaded key 882 representing characters associated with the left-hand index finger 32 (FIG. 3A) of a represented QWERTY keyboard. The key layout 880 provides the first overloaded key 882 beneath the home row 810. The key layout 880 further provides a second overloaded key 884 representing characters associated with the right-hand index finger 37 (FIG. 3A) of a represented QWERTY keyboard. The key layout 880 provides the second overloaded key 884 beneath the home row 810.

Figure 35:
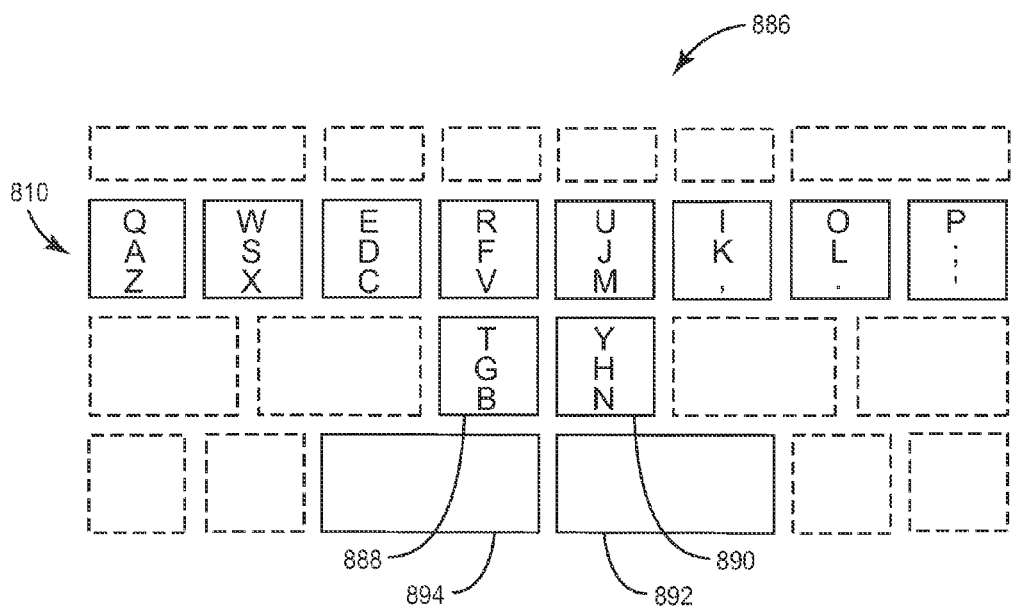

FIG. 35 provides a key layout 886 of injectively overloaded, order-disrupted, rectangular keys arranged in a rectangular grid layout. The key layout 886 provides a first overloaded key 888 representing characters associated with the left-hand index finger 32 (FIG. 3A) of a represented QWERTY keyboard. The key layout 886 further provides a second overloaded key 890 representing characters associated with the right-hand index finger 37 (FIG. 3A) of a represented QWERTY keyboard. The key layout 886 provides the first overloaded key 888 beneath the home row 810. The key layout 886 further provides the second overloaded key 890 beneath the home row 810. The key layout 886 further provides a first non-overloaded key 894. For example, the first non-overloaded key 894 may provide a spacebar. In this regard, upon pressing the spacebar 894, an electronic device may be configured to provide at least one space character between preceding and following data entries. The key layout 886 also provides a second non-overloaded key 892. For example, the second non-overloaded key 892 may provide a "next word" functionality. In this regard, upon typing a plurality of overloaded keys and then a spacebar, for example, the spacebar 894, an electronic device may provide a typist with disambiguated text (such as a character, word, or phrase). The disambiguated text may not be the text that the typist intended. Accordingly, the typist may press the Next key 892 to request the electronic device to propose alternative disambiguated text. A typist may press the Next key 892 one or more additional times to request the electronic device to provide further disambiguated text proposals.

Figure 36:
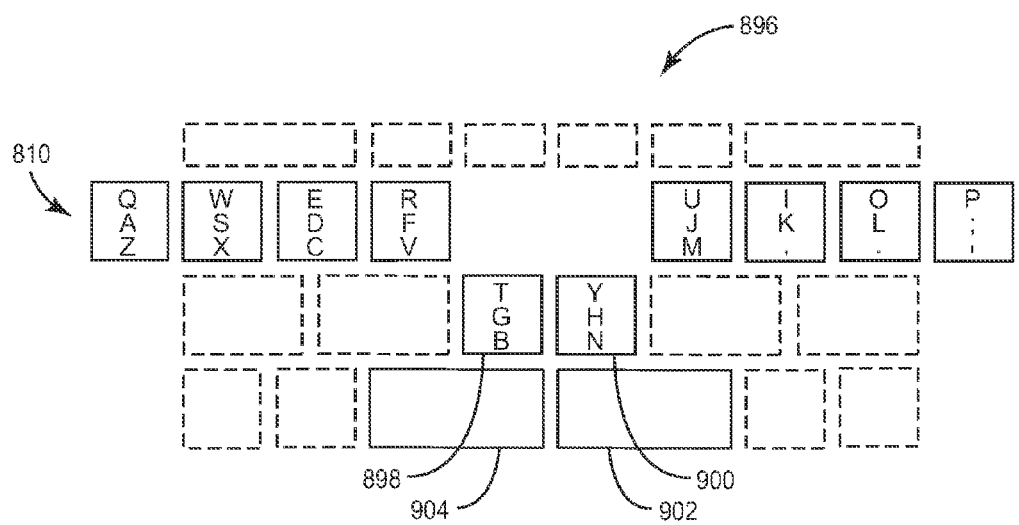
Figure 37:
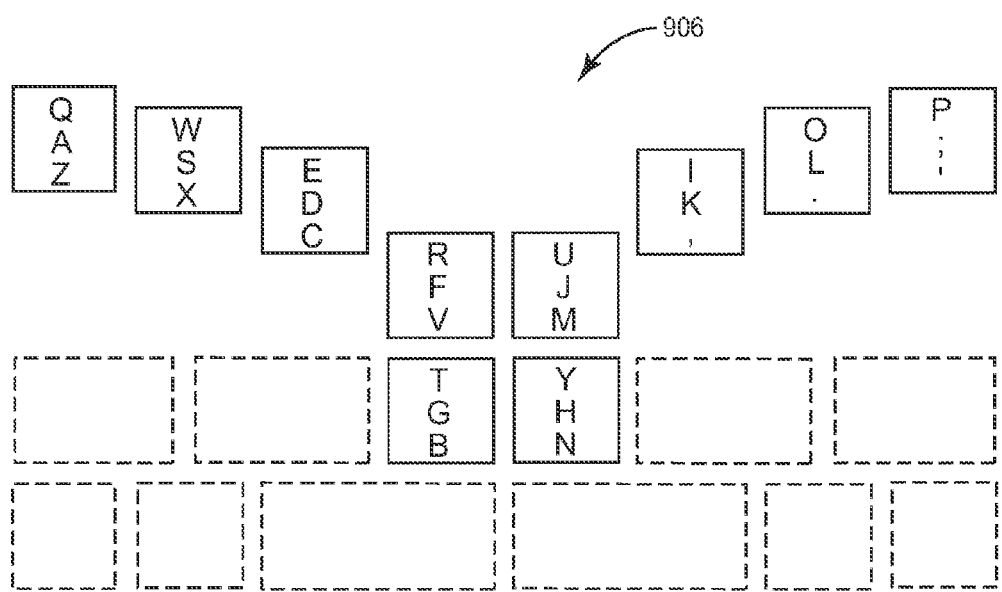

FIG. 36 provides a key layout 896 of injectively overloaded, order-disrupted keys. The key layout 896 provides a first overloaded key 898 representing characters associated with the left-hand index finger 32 (FIG. 3A) of a represented QWERTY keyboard. The key layout 896 provides the first overloaded key 898 below the home row 810. The key layout 896 further provides a second overloaded key 900 representing characters associated with the right-hand index finger 37 (FIG. 3A) on a represented QWERTY keyboard. The key layout 896 provides the second overloaded key 900 below the home row 810. The key layout 896 also provides keys 902 and 904, each of which may be non-overloaded keys. For example, the key 902 may be provided as a spacebar, and the key 904 may be provided as a Next key, as described above in reference to FIG. 35. FIG. 37 provides a further key layout 906 of injectively overloaded, order-disrupted keys.

The overloaded typing apparatus according to embodiments disclosed herein may be provided in or integrated into any processor-based device or system for text and data entry. Examples, without limitation, include a communications device, a personal digital assistant (PDA), a set-top box, a remote control, an entertainment unit, a navigation device, a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, in which the arrangement of overloaded keys is disposed or displayed.

Figure 38:
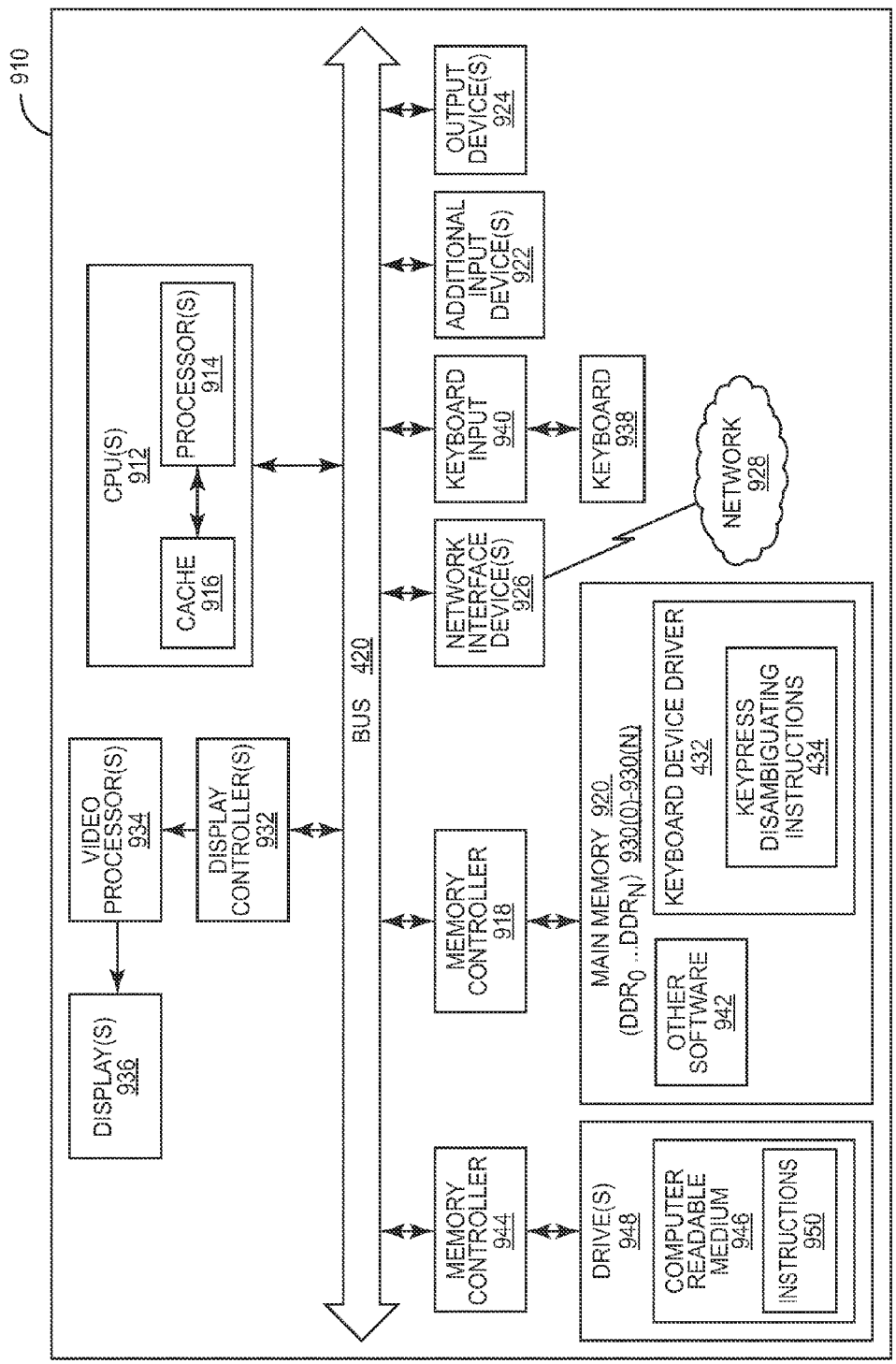
FIG. 38 is a logical diagram of an exemplary processor-based system including an exemplary typing apparatus and corresponding software.

In this regard, FIG. 38 illustrates an example of a processor-based system 910 that may employ components described herein, such as components of the electronic device 428 illustrated in FIG. 17A; components of the electronic device 442 illustrated in FIG. 17B; the key event handler 418 illustrated in FIG. 16; the keyboard generation methods 310, 320 illustrated in FIGS. 9A and 9B; and exemplary key layouts described herein, such as the key layout 250 illustrated in FIG. 6, or other key layouts illustrated in FIGS. 5F, 7A, 8A, 18A, 18B, 25A, 26A, 27, 28, 29, 30, 31, 32, 33, 34, 35, 36, and 37. In this example, the processor-based system 910 includes one or more central processing units (CPUs) 912 each including one or more processors 914. The CPU(s) 912 may be a master device. The CPU(s) 912 may have cache memory 916 coupled to the processor(s) 914 for rapid access to temporarily stored data. The CPU(s) 912 is coupled to a system bus 420, which intercouples other devices included in the processor-based system 910. As is well known, the CPU(s) 912 communicates with these other devices by exchanging address, control, and data information over the system bus 420. For example, the CPU(s) 912 can communicate memory access requests to external memory via communications to a memory controller 918 as a slave device. Although not illustrated in FIG. 38, multiple system buses 420 could be provided, wherein each system bus 420 constitutes a different fabric.

Other master and slave devices can be connected to the system bus 420. As illustrated in FIG. 38, these devices may include a memory system 920, one or more input devices 922, one or more output devices 924, one or more network interface devices 926, and one or more display controllers 932, as examples. The input device(s) 922 can include any type of input device, including but not limited to input keys, switches, voice processors, etc. The output device(s) 924 can include any type of output device, including but not limited to audio, video, other visual indicators, etc. The network interface device(s) 926 can be any device configured to allow exchange of data to and from a network 928. The network 928 can be any type of network, including but not limited to a wired or wireless network, private or public network, a local area network (LAN), a wide local area network (WLAN), and the Internet. The network interface device(s) 926 can be configured to support any type of communication protocol desired. The memory system 920 can include one or more memory units 930(0)-930(N). The CPU(s) 912 may also be configured to access the display controller(s) 932 over the system bus 420 to control information sent to one or more displays 936. The display controller(s) 932 sends information to the display(s) 936 to be displayed via one or more video processors 934, which process the information to be displayed into a format suitable for the display(s) 936. The display(s) 936 can include any type of display, including but not limited to a cathode ray tube (CRT), a liquid crystal display (LCD), a light-emitting diode display (LED), a plasma display, etc.

In continuing reference to FIG. 38, the processor-based system 910 may provide an overloaded keyboard 938 providing keyboard input 940 to the system bus 420 of the electronic device. The memory system 920 may provide the keyboard device driver 432. The keyboard device driver 432 may provide keypress disambiguating instructions 434 for disambiguating overloaded keypresses of the keyboard 938.

The memory system 920 may also provide other software 942. The processor-based system 910 may provide a drive(s) 948 accessible through a memory controller 944 to the system bus 420. The drive(s) 948 may comprise a computer-readable medium 946 that may be removable or non-removable.

The keypress disambiguating instructions 434 may be loadable into the memory system 920 from instructions 950 of the computer-readable medium 946. The processor-based system 910 may provide the one or more network interface device(s) 926 for communicating with the network 928. The processor-based system 910 may provide disambiguated text and data to additional devices on the network 928 for display and/or further processing.

The processor-based system 910 may also provide the overloaded keyboard input 940 to additional devices on the network 928 to remotely execute the keypress disambiguating instructions 434. The CPU(s) 912 and the display controller(s) 932 may act as master devices to receive interrupts or events from the keyboard 938 over the system bus 420. Different processes or threads within the CPU(s) 912 and the display controller(s) 932 may receive interrupts or events from the keyboard 938. One of ordinary skill in the art will recognize other components that may be provided by the processor-based system 910 in accordance with FIG. 38.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The memory controllers, master devices, and sub-master devices described herein may be employed in any circuit, hardware component, integrated circuit (IC), or IC chip, as examples. The memory may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flowchart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A typing apparatus, comprising:
    a plurality of overloaded keys in a key layout each representing at least two characters disposed in a QWERTY keyboard;
    a first overloaded key among plurality of overloaded keys assigned to a first row of keys comprising,
        an input key overloaded with at least an "r" character, an "f" character, and a "v" character; and
        a second overloaded key among the plurality of overloaded keys assigned outside the first row of keys, comprising
        an input key overloaded with at least a "t" character, a "g" character, and a character;
    wherein
    the first overloaded key is assigned to a first column of keys; and
    the second overloaded key is assigned to the first column of keys.

2. The typing apparatus of claim 1, wherein the first row of keys is a first linear row.

3. The typing apparatus of claim 1, wherein the plurality of overloaded keys are disposable upon a device selected from the group consisting of a touch-screen, a touch-pad, and a touch-sensitive surface.

4. The typing apparatus of claim 1, configured to receive a vocabulary of words as gesture input, wherein the gesture input comprises receiving a word as input when a path is traced from an area near an initial injectively overloaded key representing an initial character of the word through subsequent areas near subsequent injectively overloaded keys approximating subsequent characters of the word.

5. The typing apparatus of claim 4, wherein the area near the initial injectively overloaded key is an area within the initial injectively overloaded key, and wherein the subsequent areas near the subsequent injectively overloaded keys are subsequent areas within the subsequent injectively overloaded keys.

6. The typing apparatus of claim 4, wherein the subsequent injectively overloaded keys approximating subsequent characters of the word are subsequent injectively overloaded keys representing characters spelling the subsequent characters of the word.

7. The typing apparatus of claim 1, wherein the plurality of overloaded keys are disposed upon a flexible membrane.

8. The typing apparatus of claim 1, further comprising a projector configured to project a projectable keyboard upon a surface, the projectable keyboard comprising the plurality of overloaded keys.

9. The typing apparatus of claim 1, wherein the plurality of overloaded keys are disposed upon a reduced area consistent with thumb-typing.

10. The typing apparatus of claim 1, wherein the plurality of overloaded keys are disposed upon a plurality of foldable keyboard sections.

11. The typing apparatus of claim 1,
    wherein the plurality of overloaded keys comprise keys of a size consistent with keys of the represented non-overloaded keyboard; and
    wherein the plurality of overloaded keys comprise keys of a shape consistent with the keys of the represented non-overloaded keyboard.

12. The typing apparatus of claim 1 disposed in a mobile device, comprising:
    a mobile power source; and
    a wireless communication interface,
    wherein the mobile power source is configurable to energize the wireless communication interface; and
    wherein the wireless communication interface is configured to communicate an overloaded key selection for interpretation and display.

13. The typing apparatus of claim 12, wherein the wireless communication interface is selected from the group consisting of a Bluetooth communication interface, an 802.11 communication interface, and a WiMax communication interface.

14. The typing apparatus of claim 1, further comprising:
    a power interface; and
    a wired communication interface,
    wherein the power interface is configurable to energize the wired communication interface; and
    wherein the wired communication interface is configured to communicate an overloaded key selection for interpretation and display.

15. The typing apparatus of claim 14, wherein the wired communication interface is selected from the group consisting of a universal serial bus (USB) interface, a PS/2 interface, and a serial interface.

16. The typing apparatus of claim 1, further comprising a display, wherein the display is configured to render characters corresponding to interpreted overloaded-key keystrokes.

17. The typing apparatus of claim 1, further comprising a device selected from the group consisting of a communications device, a personal digital assistant (PDA), a set-top box, a remote control, an entertainment unit, a navigation device, a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, in which the plurality of overloaded keys are disposed or displayed.

18. The typing apparatus of claim 1, further comprising:
a third overloaded key among the plurality of overloaded keys assigned to the first row of keys, comprising an input key overloaded with at least a "u" character, a "j" character, and an "m" character;
a fourth overloaded key among the plurality of overloaded keys assigned outside the first row of keys, comprising an input key overloaded with at least a "y" character, an "h" character, and an "n" character;
wherein the third overloaded key is assigned to a second column of keys; and
the fourth overloaded key is assigned to the second column of keys.

19. A typing apparatus, comprising:
a plurality of overloaded keys in a key layout each representing at least two characters disposed in a QWERTY keyboard;
a first overloaded key among the plurality of overloaded keys assigned to a first row of keys, comprising
an input key overloaded with at least a "u" character, a "j" character, and an "m" character; and
a second overloaded key among the plurality of overloaded keys assigned outside the first row of keys, comprising
an input key overloaded with at least a "y" character, an "h" character, and an "n" character;
wherein
the first overloaded key is assigned to a first column of keys; and
the second overloaded key is assigned to the first column of keys.

20. The typing apparatus of claim 19, wherein the first row of keys is a first linear row.

21. The typing apparatus of claim 19, wherein the plurality of overloaded keys are disposable upon a device selected from the group consisting of a touch-screen, a touch-pad, and a touch-sensitive surface.

22. The typing apparatus of claim 19, configured to receive a vocabulary of words as gesture input, wherein the gesture input comprises receiving a word as input when a path is traced from an area near an initial injectively overloaded key representing an initial character of the word through subsequent areas near subsequent injectively overloaded keys approximating subsequent characters of the word.

23. The typing apparatus of claim 22, wherein the area near the initial injectively overloaded key is an area within the initial injectively overloaded key, and wherein the subsequent areas near the subsequent injectively overloaded keys are subsequent areas within the subsequent injectively overloaded keys.

24. The typing apparatus of claim 22, wherein the subsequent injectively overloaded keys approximating subsequent characters of the word are subsequent injectively overloaded keys representing characters spelling the subsequent characters of the word.

25. The typing apparatus of claim 19, wherein the plurality of overloaded keys are disposed upon a flexible membrane.

26. The typing apparatus of claim 19, further comprising a projector configured to project a projectable keyboard upon a surface, the projectable keyboard comprising the plurality of overloaded keys.

27. The typing apparatus of claim 19, wherein the plurality of overloaded keys are disposed upon a reduced area consistent with thumb-typing.

28. The typing apparatus of claim 19, wherein the plurality of overloaded keys are disposed upon a plurality of foldable keyboard sections.

29. The typing apparatus of claim 19,
wherein the plurality of overloaded keys comprise keys of a size consistent with keys of the represented non-overloaded keyboard; and
wherein the plurality of overloaded keys comprise keys of a shape consistent with the keys of the represented non-overloaded keyboard.

30. The typing apparatus of claim 29, wherein the wireless communication interface is selected from the group consisting of a Bluetooth communication interface, an 802.11 communication interface, and a WiMax communication interface.

31. The typing apparatus of claim 30, wherein the wired communication interface is selected from the group consisting of a universal serial bus (USB) interface, a PS/2 interface, and a serial interface.

32. The typing apparatus of claim 19 disposed in a mobile device, comprising:
a mobile power source; and
a wireless communication interface,
wherein the mobile power source is configurable to energize the wireless communication interface; and
wherein the wireless communication interface is configured to communicate an overloaded key selection for interpretation and display.

33. The typing apparatus of claim 19, further comprising:
a power interface; and
a wired communication interface,
wherein the power interface is configurable to energize the wired communication interface; and
wherein the wired communication interface is configured to communicate an overloaded key selection for interpretation and display.

34. The typing apparatus of claim 19, further comprising a display, wherein the display is configured to render characters corresponding to interpreted overloaded-key keystrokes.

35. The typing apparatus of claim 19, further comprising a device selected from the group consisting of a communications device, a personal digital assistant (PDA), a set-top box, a remote control, an entertainment unit, a navigation device, a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, in which the plurality of overloaded keys are disposed or displayed.

\* \* \* \* \*

UNITED STATES PATENT AND TRADEMARK OFFICE
CERTIFICATE OF CORRECTION

PATENT NO. : 8,911,165 B2  
APPLICATION NO. : 13/012650  
DATED : December 16, 2014  
INVENTOR(S) : Bjorn Jawerth et al.

It is certified that error appears in the above-identified patent and that said Letters Patent is hereby corrected as shown below:

In the Claims

Claim 1 at column 39 line 56, change "among plurality" to "among the plurality."

Claim 1 at column 39 line 64, change "and a character;" to "and a "b" character;"

Signed and Sealed this  
Ninth Day of June, 2015

Michelle K. Lee  
*Director of the United States Patent and Trademark Office*